(12) United States Patent
Takashima et al.

(10) Patent No.: US 7,223,453 B2
(45) Date of Patent: May 29, 2007

(54) INK JET RECORDING MEDIUM AND INK JET RECORDING METHOD

(75) Inventors: Masanobu Takashima, Shizuoka-ken (JP); Shigetomo Tsujihata, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 213 days.

(21) Appl. No.: 10/727,996

(22) Filed: Dec. 5, 2003

(65) Prior Publication Data

US 2004/0166252 A1     Aug. 26, 2004

(30) Foreign Application Priority Data

| Dec. 6, 2002 | (JP) | ............................. 2002-354723 |
| Aug. 27, 2003 | (JP) | ............................. 2003-303071 |
| Oct. 7, 2003 | (JP) | ............................. 2003-348308 |

(51) Int. Cl.
     *B41M 5/40*     (2006.01)
(52) U.S. Cl. .................. 428/32.3; 347/105; 428/32.26; 428/32.34
(58) Field of Classification Search ..... 428/32.1–32.38
     See application file for complete search history.

(56) References Cited

U.S. PATENT DOCUMENTS 4,877,819 A  * 10/1989  Kiyohara et al. ........... 523/200

6,505,929 B1 * 1/2003 Chow .......................... 347/105
2002/0115773 A1   8/2002 Katoh et al.

FOREIGN PATENT DOCUMENTS

| EP | 0 730 201 A | 9/1996 |
| EP | 1 253 021 A2 | 10/2002 |
| EP | 1 260 379 A | 11/2002 |
| EP | 1 352 754 A | 10/2003 |
| JP | 07-168293 | * 4/1995 |
| JP | 8-337049 A | 12/1996 |
| JP | 9-314985 A | 12/1997 |
| JP | 2000-309157 A | 11/2000 |

* cited by examiner

*Primary Examiner*—Bruce Hess
(74) *Attorney, Agent, or Firm*—Sughrue Mion, PLLC

(57) ABSTRACT

An ink jet recording medium containing a support and an ink receiving layer on the support, in which the ink receiving layer includes at least a complex formed from a metal with a valence of two or more and an acidic group-containing compound having a substituent group containing a nitrogen atom, an oxygen atom or a sulfur atom. The acidic group-containing compound is preferably a compound represented by the following general formula (I).

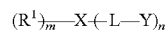

General Formula (I)

16 Claims, No Drawings

INK JET RECORDING MEDIUM AND INK JET RECORDING METHOD

CROSS-REFERENCE TO RELATED APPLICATION

This application claims priority under 35 USC 119 from Japanese Patent Application Nos. 2002-354723, 2003-303071, and 2003-348308, the disclosures of which are incorporated by reference herein.

BACKGROUND OF THE INVENTION

1. Field of the Invention

The present invention relates to a recording material used in ink jet recording with a liquid ink such as aqueous ink and oil ink, or a solid ink which in a solid form at ordinary temperatures, is liquefied by melting and subjected to recording and to a recording method using the same. In particular, the invention relates to an ink jet recording medium excellent in light fastness with less blurring in recorded images and to an ink jet recording method using the same.

2. Description of the Related Art

As information technology (IT) industry advances rapidly in recent years, various information processing systems have been developed, and recording methods and recording devices suitable for the information systems have also been developed and practically used.

In the recording methods, an ink jet recording method is used widely not only in offices but also in homes because various kinds of recording materials can be used in recording, the hardware (device) used therein is relatively inexpensive, compact and excellent in quietness with low noise.

Higher resolutions attained by ink jet printers in recent years have realized photorealistic high-quality prints. As the hardware (device) is developed, various kinds of recording sheets for ink jet recording have also been developed.

The characteristics required of the recording sheet for ink jet recording are generally (1) rapid drying (high rate of absorption of ink), (2) correct and uniform diameter of ink dots (no blurring), (3) good graininess, (4) high circularity of dots, (5) high color density, (6) high coloration (without darkening), (7) excellent water resistance, light fastness and ozone resistance of prints, (8) high whiteness of the recording sheet, (9) excellent shelf stability of the recording sheet (no yellowing during long-term storage, no blurring in the image during long-term storage, no blurring with time), (10) good deformation resistance and dimensional stability (a sufficiently low degree of curling), and (11) good hardware (device) running.

Further, glossiness, surface smoothness, photographic paper-like feeling similar to that of a silver salt photograph, etc. are also required in addition to the above-described characteristics in application to photo glossy paper used for the purpose of obtaining photorealistic high-quality prints.

For the purpose of improving these characteristics, an ink jet recording medium having a porous structure in an ink receiving layer has been developed in recent years and practically used. By virtue of the porous structure, the ink jet recording medium has an excellent ink receiving ability (rapid drying) and high glossiness.

For example, an ink jet recording medium having a support provided with an ink receiving layer of high porosity containing fine particles of an inorganic pigment and a water-soluble resin has been proposed (for example, see Japanese Patent Application Laid-Open (JP-A) No. 10-119423 or 10-217601).

The recording medium, particularly the ink jet recording medium provided with an ink receiving layer having a porous structure using silica as the fine particles of an inorganic pigment, is excellent in ink absorptivity to the porous structure, has a high ink receiving ability to form an image of high resolution, and can show high gloss.

JP-A No. 2000-309157 discloses an ink jet recording medium having a porous ink receiving layer containing fine silica particles and water-soluble aluminum. It is described therein that while gloss and ink absorptivity are maintained, water resistance and light fastness are improved and surface cracking is prevented. JP-A No. 2000-351269 discloses an ink jet recording medium having a porous ink receiving layer containing fumed silica and an amphoteric or nonionic surfactant. It is described therein that while gloss and ink absorptivity are maintained, aggregation and surface cracking are prevented. JP-A No. 2001-246838 discloses an ink jet recording medium having a porous ink receiving layer containing fine inorganic particles and an amphoteric surfactant. It is described therein that while ink absorptivity is maintained, coating cissing, surface cracking and image blurring are prevented.

JP-A No. 8-337049 discloses an ink jet recording medium provided with an ink receiving layer containing a pigment in a chelating agent-containing substrate. It is described therein that a recording medium of coating type with high image density, less strike-through, less cockling and reduced smearing in layered colors can be provided.

JP-A No. 9-314985 discloses an ink jet recording medium comprising alumina hydrate, a chelating agent and a cationic substance as active ingredients contained on the surface and in the inside of a support. It is described therein that the ink jet recording medium is excellent in ink absorptivity, has high density and vividness of recorded images and is excellent in water resistance of the images.

The ink jet recording mediums described above can maintain gloss and ink absorptivity, but cannot be said to solve image blurring and have excellent light fastness simultaneously at sufficiently satisfactory levels for a long time.

SUMMARY OF THE INVENTION

At present, there is not provided an ink jet recording medium, or a recording method, having an ink receiving layer excellent in ink absorptivity to form an image of high resolution with ink receiving performance excellent in water resistance and gloss while preventing image blurring with excellent light fastness for a sufficiently long time.

Accordingly, the object of the present invention is to provide an ink jet recording medium and a recording method having improved light fastness while preventing image blurring.

The above-described problems attended to by the invention are solved by the following ink jet recording medium and ink jet recording method.

A first aspect of the invention is to provide an ink jet recording medium comprising a support and an ink receiving layer disposed on the support, wherein the ink receiving layer comprises a complex formed from a metal with a valence of two or more and an acidic group-containing compound having a substituent group containing a nitrogen atom, an oxygen atom or a sulfur atom.

A second aspect of the invention is to provide an ink jet recording method comprising forming an image with an ink set comprising, as minimum constituent elements, a yellow ink containing at least one yellow dye, a magenta ink containing at least one magenta dye, and a cyan ink containing at least one cyan dye, on the ink jet recording medium of the first aspect, wherein an oxidation potential of at least one of the magenta dye and the cyan dye is higher than 0.8 V (vs SCE).

Accordingly, the invention provides a recording medium of high gloss excellent in ink receiving performance, which inhibits image blurring for a long time and improves light fastness and ozone resistance, as well as an ink jet recording method using the same.

DETAILED DESCRIPTION OF THE INVENTION

The ink jet recording medium of the present invention is an ink jet recording medium comprising a support and an ink receiving layer on the support, wherein the ink receiving layer comprises at least a complex formed from a metal with a valence of two or more and an acidic group-containing compound having a substituent group containing a nitrogen atom, an oxygen atom or a sulfur atom.

By incorporating the complex into the ink receiving layer, the ink jet recording medium of the invention has excellent gloss and ink absorptivity, prevents blurring of a recorded image for a satisfactorily long time, and significantly improves the light fastness of the image.

Hereinafter, the major constitution of the ink jet recording medium of the invention is described in detail, but the invention is not limited thereto.

(Acidic Group-containing Compound)

Examples of the acidic group-containing compound, which is one of the components forming the complex of the invention, include any compound which has a substituent group containing at least one of a nitrogen atom, an oxygen atom and a sulfur atom and which contains an acidic group (for example, a carboxyl group, sulfo group, hydroxyl group or phosphono group). In particular, an acidic group-containing compound having a substituent group containing a nitrogen atom or an oxygen atom is preferable.

The acidic group-containing compound having a substituent group containing a nitrogen atom, an oxygen atom or a sulfur atom is preferably a compound represented by the following general formula (I):

General Formula (I)

In the general formula (I), $R^1$ represents one selected from the group consisting of a hydrogen atom, an aliphatic group, an aromatic group, a heterocyclic group, —$COR^2$ and —$SO_2R^3$ wherein $R^2$ and $R^3$ each independently represent an aliphatic group, an aromatic group or a heterocyclic group.

When any one of $R^1$ to $R^3$ represents an aliphatic group, examples of the aliphatic group include an alkyl group, alkenyl group, alkynyl group and aralkyl group, each of which may further have a substituent group. The aliphatic group is preferably an alkyl group, substituted alkyl group, alkenyl group, substituted alkenyl group, aralkyl group or substituted aralkyl group, particularly preferably an alkyl group and substituted alkyl group. The aliphatic group may be a linear aliphatic group or an alicyclic group, and the linear aliphatic group may further have a branched group.

The alkyl group represented by $R^1$ to $R^3$ includes a linear, branched or cyclic alkyl group which may have a substituent group, and the number of carbon atoms in the alkyl group is preferably 1 to 30, and more preferably 1 to 20. The number of carbon atoms in the alkyl moiety of the substituted alkyl group is preferably in the same range as above. Examples of the alkyl group include a methyl group, ethyl group, propyl group, butyl group, pentyl group, hexyl group, octyl group, 2-ethylhexyl group, t-octyl group, decyl group, dodecyl group, octadecyl group, cyclohexyl group, cyclopentyl group, neopentyl group, isopropyl group and isobutyl group.

When any one of $R^1$ to $R^3$ represents a substituted alkyl group, examples of the substituent group thereof include a carboxyl group, a sulfo group, a cyno group, a halogen atom (for example, a fluorine atom, chlorine atom and bromine atom), a hydroxyl group, an alkoxycarbonyl group containing 30 or less carbon atoms (for example, a methoxycarbonyl group, ethoxycarbonyl group and benzyloxycarbonyl group), an aryloxycarbonyl group containing 30 or less carbon atoms (for example, a phenoxycarbonyl group), an alkylsulfonylaminocarbonyl group containing 30 or less carbon atoms (for example, a methylsulfonylaminocarbonyl group and an octylsulfonylaminocarbonyl group), an arylsulfonylaminocarbonyl group (for example, a toluenesulfonylaminocarbonyl group), an acylaminosulfonyl group containing 30 or less carbon atoms (for example, a benzoylaminosulfonyl group, acetylaminosulfonyl group and pivaloylaminosulfonyl group);

an alkoxy group containing 30 or less carbon atoms (for example, a methoxy group, ethoxy group, benzyloxy group, phenoxyethoxy group and phenethyloxy group), an arylthio group containing 30 or less carbon atoms, an alkylthio group (for example, a phenylthio group, methylthio group, ethylthio group, dodecylthio group, etc.), an aryloxy group containing 30 or less carbon atoms (for example, a phenoxy group, p-tolyloxy group, 1-naphthoxy group, 2-naphthoxy group, etc.), a nitro group, an alkyl group containing 30 or less carbon atoms, an alkoxycarbonyloxy group (for example, a methoxycarbonyloxy group, stearyloxycarbonyloxy group and phenoxyethoxycarbonyloxy group), an aryloxycarbonyloxy group (for example, a phenoxycarbonyloxy group and chlorophenoxycarbonyloxy group);

an acyloxy group containing 30 or less carbon atoms (for example, an acetyloxy group, propionyloxy group, etc.), an acyl group containing 30 or less carbon atoms (for example, an acetyl group, propionyl group, benzoyl group, etc.), a carbamoyl group (for example, a carbamoyl group, N,N-dimethylcarbamoyl group, morpholinocarbonyl group, piperidinocarbonyl group, etc.), a sulfamoyl group (for example, a sulfamoyl group, N,N-dimethylsulfamoyl group, morpholinosulfonyl group, piperidinosulfonyl group, etc.), an alkylsulfonyl group containing 30 or less carbon atoms (for example, a methylsulfonyl group, trifluoromethylsulfonyl group, ethylsulfonyl group, butylsulfonyl group and dodecylsulfonyl group), an arylsulfonyl group (for example, a benzenesulfonyl group, toluenesulfonyl group, naphthalenesulfonyl group, pyridinesulfonyl group and quinolinesulfonyl group), an aryl group containing 30 or less carbon atoms (for example, a phenyl group, dichlorophenyl group, toluyl group, methoxyphenyl group, diethylaminophenyl group, acetylaminophenyl group, methoxycarbonylphenyl group, hydroxyphenyl group, t-octylphenyl group and naphthyl group);

a substituted amino group (for example, an amino group, alkylamino group, dialkylamino group, arylamino group, diarylamino group, acylamino group, etc.), a substituted phosphono group (for example, a phosphono group, diethylphosphono group and diphenylphosphono group), a heterocyclic group (for example, a pyridyl group, quinolyl group, furyl group, thienyl group, tetrahydrofurfuryl group, pyrazolyl group, isoxazolyl group, isothiazolyl group, imidazolyl group, oxazolyl group, thiazolyl group, pyridazyl group, pyrimidyl group, pyrazyl group, triazolyl group, tetrazolyl group, benzoxazolyl group, benzoimidazolyl group, isoquinolyl group, thiadiazolyl group, morpholino group, piperidino group, piperazino group, indolyl group, isoindolyl group and thiomorpholino group), an ureido group (for example, a methylureido group, dimethylureido group, phenylureido group, etc.);

a sulfamoylamino group (for example, a dipropylsulfamoylamino group, etc.), an alkoxycarbonylamino group (for example, an ethoxycarbonylamino group, etc.), an aryloxycarbonylamino group (for example, a phenyloxycarbonylamino group, etc.), an alkylsulfinyl group (for example, a methylsulfinyl group, etc.), an arylsulfinyl group (for example, a phenylsulfinyl group, etc.), a silyl group (for example, a trimethoxysilyl group, triethoxysilyl group, etc.) and a silyloxy group (for example, a trimethylsilyloxy group, etc.).

The carboxyl group, sulfo group, hydroxyl group or phosphono group as a substituent group on the alkyl group may, together with a cation ($M^+$), form a salt in the form of —COO$^-$M$^+$, —SO$_3$$^-$M$^+$, —O$^-$M$^+$, —PO(OH)O$^-$M$^+$ or —PO(O$^-$M$^+$)$_2$. The salt-forming cation is preferably an organic cationic compound and a transition metal-coordinated complex cation (for example, compounds described in JP Patent No. 2791143) or a metallic cation (for example, Na$^+$, K$^+$, Li$^+$, Ag$^+$, Fe$^{2+}$, Fe$^{3+}$, Cu$^+$, Cu$^{2+}$, Zn$^{2+}$, Al$^{3+}$ and Ca$^{2+}$).

The organic cationic compound includes, for example, a quaternary ammonium cation, quaternary pyridinium cation, quaternary quinolinium cation, phosphonium cation, iodonium cation, sulfonium cation, colorant cation, etc.

Specific examples of the quaternary ammonium cation include tetraalkyl ammonium cation (for example, tetramethyl ammonium cation and tetrabutyl ammonium cation), tetraaryl ammonium cation (for example, tetraphenyl ammonium cation), etc.

The quaternary pyridinium cation includes N-alkyl pyridinium cation (for example, N-methyl pyridinium cation), N-aryl pyridinium cation (for example, N-phenyl pyridinium cation), N-alkoxy pyridinium cation (for example, 4-phenyl-N-methoxy-pyridinium cation), N-benzoyl pyridinium cation, etc.

The quaternary quinolinium cation includes N-alkyl quinolinium cation (for example, N-methyl quinolinium cation), N-aryl quinolinium cation (for example, N-phenyl quinolinium cation), etc.

The phosphonium cation includes tetraaryl phosphonium cation (for example, tetraphenyl phosphonium cation), etc. The iodonium cation includes diaryl iodonium cation (for example, diphenyl iodonium cation), etc. The sulfonium cation includes triaryl sulfonium cation (for example, triphenyl sulfonium cation), etc.

The iodonium cation includes diaryl iodonium cation (for example, diphenyl iodonium cation), etc. The sulfonium cation includes triaryl sulfonium cation (for example, triphenyl sulfonium cation), etc.

The salt-forming cation also includes compounds described in columns [0020] to [0038] in JP-A No. 9-188686.

The alkenyl group represented by $R^1$ to $R^3$ includes a linear, branched or cyclic alkenyl group which may have a substituent group, and the number of carbon atoms in the alkenyl group is preferably 2 to 30, and more preferably 2 to 20. The number of carbon atoms in the alkenyl moiety of the substituted alkenyl group is also preferably in the same range as above. Specific examples of the alkenyl group include a vinyl group, allyl group, prenyl group, geranyl group, oleyl group, cycloalkenyl group (for example, a 2-cyclopenten-1-yl group and 2-cyclohexen-1-yl group), bicyclo[2,2,1]hept-2-en-1-yl, bicyclo[2,2,2]oct-2-en-4-yl, etc.

When any one of $R^1$ to $R^3$ represents a substituted alkenyl group, examples of the substituent group thereof include the same substituent groups as those on the substituted alkyl group described above.

The alkynyl group represented by $R^1$ to $R^3$ includes a linear, branched or cyclic alkynyl group which may have a substituent group, and the number of carbon groups in the alkynyl group is preferably 2 to 30, and more preferably 2 to 20. The number of carbon atoms in the alkynyl moiety of the substituted alkynyl group is also preferably in the same range as above. Specific examples of the alkynyl group include an ethynyl group, propargyl group, trimethylsilylethynyl group, etc.

When any one of $R^1$ to $R^3$ represents a substituted alkynyl group, examples of the substituent group thereof include the same substituent groups as those on the substituted alkyl group described above.

The aralkyl group represented by $R^1$ to $R^3$ includes a linear, branched or cyclic aralkyl group which may have a substituent group, and the number of carbon atoms in the aralkyl group is preferably 7 to 35, and more preferably 7 to 25. The number of carbon atoms in the aralkyl moiety of the substituted aralkyl group is also preferably in the same range as above. Specific examples of the aralkyl group include a benzyl group, methylbenzyl group, octylbenzyl group, dodecylbenzyl group, hexadecylbenzyl group, dimethylbenzyl group, octyloxybenzyl group, octadecylaminocarbonylbenzyl group, chlorobenzyl group, etc.

When any one of $R^1$ to $R^3$ represents a substituted aralkyl group, examples of the substituent group thereof include the same substituent groups as those on the substituted alkyl group described above.

When any one of $R^1$ to $R^3$ represents an aromatic group, examples of the aromatic group include an aryl group and a substituted aryl group. The number of carbon atoms in the aryl group is preferably 6 to 30, and more preferably 6 to 20. The number of carbon atoms in the aryl moiety of the substituted aryl group is also preferably in the same range as above. Specific examples of the aryl group include a phenyl group, α-naphthyl group, β-naphthyl group, etc.

When any one of $R^1$ to $R^3$ represents a substituted aryl group, examples of the substituent group thereof include the same substituent groups as those on the substituted alkyl group described above.

When any one of $R^1$ to $R^3$ represents a heterocyclic group, examples of the heterocyclic group include an optionally substituted heterocyclic group containing a nitrogen atom, an oxygen atom and/or a sulfur atom. Specific examples of the heterocyclic group include, for example, a furyl group, thienyl group, pyridyl group, pyrazolyl group, isoxazolyl group, isothiazolyl group, imidazolyl group, oxazolyl group, thiazolyl group, pyridazinyl group, pyrimidyl group, pyrazyl group, triazolyl group, tetrazolyl group, quinolyl group, benzothiazolyl group, benzoxazolyl group, benzoimidazolyl group, isoquinolyl group, thiadiazolyl group, morpholino group, piperidino group, thiomorpholino group, tetrahydrofurfuryl group, piperazino group, indolyl group, isoindolyl group, etc.

When any one of $R^1$ to $R^3$ represents a substituted heterocyclic group, examples of the substituent group thereof include the same substituent groups as those on the substituted alkyl group described above.

In the general formula (I), L represents a divalent linking group.

Specifically, the divalent linking group represented by L includes an alkylene group (for example, methylene, ethylene, propylene, butylene, pentylene, etc.), an arylene group (for example, phenylene, naphthalene, etc.), an alkenylene group (for example, ethenylene, propenylene, etc.) and an alkynylene group (for example, propynylene, etc.), each of which may contain (1) a heteroatom such as an oxygen atom, sulfur atom and nitrogen atom or (2) a hetero-linkage such as an ether linkage, ester linkage, amino linkage, amido linkage, sulfonyl linkage or urethane linkage, and may further have a substituent group. The divalent linking group is preferably a $C_{1-12}$ alkylene group, a $C_{6-18}$ arylene group or a $C_{2-12}$ alkenylene or alkynylene group.

When L is substituted with a substituent group, examples of the substituent group include the same substituent groups as those on the substituted alkyl group described above.

In the general formula (I), Y represents an acidic group.

Specifically, examples of the acidic group represented by Y include —COOH, —$SO_3H$, —$SO_2H$, —OH, —$SO^\flat NHR^4$ and —$PO_3H_2$ wherein $R^4$ represents the same substituent groups as those on $R^1$ in the general formula (I).

The acidic group is preferably —COOH, —$SO_3H$ or —$PO_3H_2$, and particularly preferably —COOH.

In the general formula (I), X represents one selected from the group consisting of —N<, —O—, —S—, —SO— and —$SO_2$—, and m and n each independently denote an integer.

When X is —N<, (m+n) is 3 or 4, and when X is —O—, —S—, —SO— or —$SO_2$—, (m+n) is 2. When (m+n) is 4, the nitrogen atom in general formula (I) is a quaternary ammonium cation, and one of acidic groups in general formula (I) is an anion in a dissociated state, or one of $R^1$ to $R^3$ has an anionic group such as a carboxyl group, sulfo group, hydroxy group or phosphono group as a substituent group on the above alkyl groups ($R^1$ to $R^3$).

From the viewpoint of preventing image blurring and simultaneously improving light fastness, the acidic group-containing compound represented by the general formula (I) in the invention is particularly preferably a compound represented by the general formulae (II) to (IV):

General Formula (II)

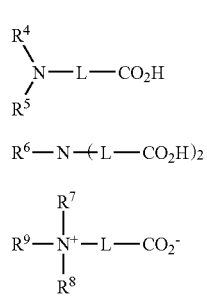

General Formula (III)

$R^6$—N—($L$—$CO_2H$)$_2$

General Formula (IV)

$$R^9-\overset{R^7}{\underset{R^8}{N^+}}-L-CO_2^-$$

Similar to $R^1$ in the general formula (I), $R^4$ to $R^6$ in the general formulae (II) to (IV) each independently represent one selected from the group consisting of a hydrogen atom, an aliphatic group, an aromatic group, a heterocyclic group, —$COR^2$ and —$SO_2R^3$, among which a hydrogen atom and an aliphatic group are particularly preferable. $R^7$ to $R^9$ each independently represent an aliphatic group, an aromatic group or a heterocyclic group. L has the same meaning as that of L in the general formula (I), and preferable groups of L are the same as those of L in general formula (I).

The number of carbon atoms in the acidic group-containing compound represented by the general formula (I) is preferably 2 or more, more preferably 4 or more, and still more preferably 6 or more.

When the acidic group-containing compound represented by the general formula (I) represents a tertiary amine, the compound may bind to an acid to form a salt.

The acidic group-containing compound represented by the general formula (I) includes, but is not limited to, the following compounds:

Glycine, iminodiacetic acid, ethylenediamine-N,N'-diacetic acid, N-(2-hydroxyethyl)-iminodiacetic acid, nitrilotriacetic acid, sarcosine, dimethyl glycine, tricin, alanine, β-alanine, valine, leucine, norvaline, isoleucine, aminobutyric acid, aminododecanoic acid, serine, isoserine, homoserine, threonine, proline, pipecolinic acid, lysine, aspartic acid, glutamic acid, cysteine, homocysteine, methionine, s-carboxymethyl cysteine, cystine, N-acetylglycine, methionine sulfoxide, glycolic acid, citric acid, tartaric acid, mercaptopropionic acid, ethylenediaminediacetic acid, ethylenediaminetetraacetic acid, ethylenediaminediacetic acid dipropionic acid, ethylenediaminedisuccinic acid, glutamine acid diacetic acid, aspartic acid diacetic acid, iminodisuccinic acid, benzoic acid iminodiacetic acid, anthranilic acid diacetic acid, diethylenetriaminepentaacetic acid, ethylenediaminediacetic acid diacetic acid amide, propylenediaminetetraacetic acid, imidazolecarboxylic acid, quinolinic acid, pyrazinedicarboxylic acid, $C_2H_5N(CH_2CO_2H)_2$     (1)

$C_4H_9N(CH_2CO_2H)_2$     (2)

$C_8H_{17}N(CH_2CO_2H)_2$     (3)

$C_{12}H_{25}N(CH_2CO_2H)_2$     (4)

$C_{14}H_{25}N(CH_2CO_2H)_2$     (5)

$C_{18}H_{37}N(CH_2CO_2H)_2$     (6)

$C_{12}H_{25}NHCH_2CO_2H$     (7)

$(CH_3)_3N^+ \ (CH_2)_3CO_2^-$     (8)

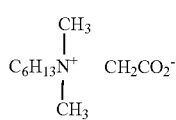
(9)

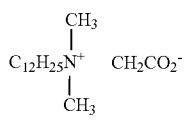
(10)

$$\underset{\underset{CH_3}{|}}{\overset{\overset{CH_3}{|}}{C_{16}H_{33}N^+}} \ CH_2CO_2^-$$
(11)

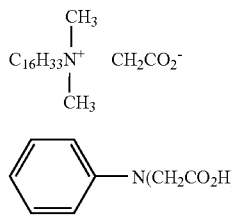
(12)

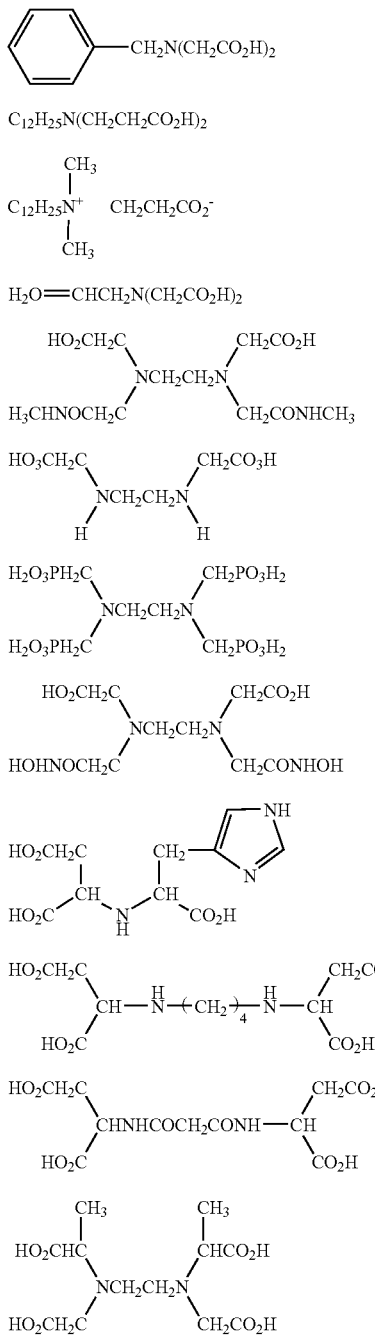

(Metal with a Valence of Two or More and Formation of the Complex)

A metal with a valence of two or more which reacts with the acidic group-containing compound having a substituent group containing a nitrogen atom, an oxygen atom or a sulfur atom to form the complex used in the invention is described in detail.

Examples of the metal with a valence of two or more include bivalent or more metals such as magnesium, aluminum, calcium, scandium, titanium, vanadium, manganese, iron, nickel, chromium, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth. Among these metals, the metal having a valence of two or more of the invention is preferably a trivalent or more metal, more preferably aluminum, titanium and zirconium, and most preferably aluminum and zirconium.

The metal with a valence of two or more may be in the form of a salt with a strong or weak acid or in the form of a hydroxide, a halohydroxide or a complex, and can be reacted with the acidic group-containing compound to form a complex to be contained in the ink receiving layer in the ink jet recording medium of the invention. Specific examples of such metal salt, halohydroxide and complex are as follows:

calcium acetate, calcium chloride, calcium formate, calcium sulfate, barium acetate, barium sulfate, barium phosphate, manganese chloride, manganese acetate, manganese formate.$2H_2O$, ammonium manganese sulfate.$6H_2O$, cupper (II) chloride, cupper(II) ammonium chloride.$2H_2O$, copper sulfate, cobalt chloride, cobalt thiocyanate, cobalt sulfate, nickel sulfate.$6H_2O$, nickel chloride.$6H_2O$, nickel acetate.$4H_2O$, ammonium nickel sulfate.$6H_2O$, nickel amidosulfate.$4H_2O$, aluminum sulfate, aluminum alum, aluminum sulfite, aluminum thiosulfate, aluminium chloro hydrate, aluminum nitrate.$9H_2O$, aluminum chloride.$6H_2O$, ferrous bromide, ferrous chloride, ferric chloride, ferrous sulfate, ferric sulfate, zinc phenolsulfonate, zinc bromide, zinc chloride, zinc nitrate.$6H_2O$, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl stearate, zirconyl octylate, zirconyl nitrate, zirconium oxychloride, zirconium hydroxychloride, chromium acetate, chromium sulfate, magnesium sulfate, magnesium chloride.$6H_2O$, magnesium citrate.$9H_2O$, sodium phosphorus tungstic acid, tungsten sodium citrate, 12-tungstophosphoric acid.$nH_2O$, 12-tungstosilicic acid.$26H_2O$, molybdenum chloride, 12-molybdophoshoric acid.$nH_2O$, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

Preferable among those described above are aluminum-containing compounds such as aluminum sulfate, aluminum alum, aluminum sulfite, aluminum thiosulfate, aluminium chloro hydrate, aluminum nitrate.$9H_2O$ and aluminum chloride.$6H_2O$; titanium-containing compounds such as titanium tetrachloride, tetraisopropyl titanate, titanium acetylacetonate and titanium lactate; and zirconium-containing compounds such as zirconium acetylacetonate, zirconyl acetate, zirconyl sulfate, ammonium zirconium carbonate, zirconyl stearate, zirconyl octylate, zirconyl nitrate, zirconium oxychloride and zirconium hydroxychloride, particularly preferably aluminium chloro hydrate and zirconium oxychloride.

In preparation of the ink jet recording medium of the invention, the acidic group-containing compound is reacted with the metal with a valence of two or more to form a complex which may then be added to a coating solution for the ink receiving layer. Alternatively, the acidic group-containing compound and the metal with a valence of two or more may be added simultaneously or separately in a coating solution for the ink receiving layer and/or a coating solution including mordant during preparing the solution, and the complex formed in the course of preparing the coating solution may be used.

In the invention, the complex formed from the acidic group-containing compound and the metal with a valence of two or more may be water-soluble, oil-soluble, or solid. The oil-soluble complex can be added as an emulsified dispersion or as a solution in an organic solvent. The complex in a solid form can be grained into fine particles and added as an emulsified dispersion.

In the ink receiving layer in the ink jet recording medium of the invention, the content of the complex formed from the acidic group-containing compound and the metal with a valence of two or more is preferably 0.01 g/m$^2$ to 20 g/m$^2$, more preferably 0.1 g/m$^2$ to 7 g/m$^2$, and most preferably 0.5 g/m$^2$ to 5 g/m$^2$, to prevent image blurring and improve light fastness. If the content of the complex is less than 0.01 g/m$^2$, the effect on image blurring and light fastness may be insufficient, while if the content is higher than 20 g/m$^2$, fine particles may be aggregated to deteriorate the gloss of the recording medium.

The ink receiving layer in the ink jet recording medium of the invention comprises a complex formed from the acidic group-containing compound and the metal with a valence of two or more. In the reaction in forming the complex, the molar ratio of the acidic group-containing compound to the metal with a valence of two or more is preferably 1:100 to 100:1, more preferably 1:20 to 20:1, and still more preferably 1:10 to 10:1.

The content of the acidic group-containing compound in the ink receiving layer of the ink jet recording medium of the invention is preferably 0.01 g/m$^2$ to 5 g/m$^2$, more preferably 0.05 g/m$^2$ to 4 g/m$^2$, and most preferably 0.07 g/m$^2$ to 3 g/m$^2$.

The content of the metal with a valence of two or more in the ink receiving layer of the ink jet recording medium of the invention is preferably 0.1 g/m$^2$ to 20 g/m$^2$, more preferably 0.4 g/m$^2$ to 10 g/m$^2$, and still more preferably 0.8 g/m$^2$ to 5 g/m$^2$.

(Water-soluble Resin)

In the ink jet recording medium of the invention, the ink receiving layer preferably comprises a water-soluble resin together with the complex formed from the acidic group-containing compound and the metal with a valence of two or more.

Examples of the water-soluble resin include polyvinyl alcohol resin that is a resin having a hydroxy group as a hydrophilic structural unit (polyvinyl alcohol [PVA], acetoacetyl-modified polyvinyl alcohol, cation-modified polyvinyl alcohol, anion-modified polyvinyl alcohol, silanol-modified polyvinyl alcohol, polyvinyl acetal, etc.), cellulose resin (methyl cellulose [MC], ethyl cellulose [EC], hydroxyethyl cellulose [HEC], carboxymethyl cellulose [CMC], hydroxypropyl cellulose [HPC], carboxyethylmethyl cellulose, hydroxypropylmethyl cellulose, etc.), chitin, chitosan, starch, ether linkage-containing resin (polyethylene oxide [PEO], polypropylene oxide [PPO], polyethylene glycol [PEG], polyvinyl ether [PVE], etc.), and carbamoyl group-containing resin (polyacrylamide [PAAM], polyvinylpyrrolidone [PVP], polyacrylate hydrazide, etc.).

Other examples of the water-soluble resin include resins containing a carboxyl group as a dissociable group, such as polyacrylate, maleic resin, alginate and gelatin.

Among those described above, the water-soluble resin used in the invention is preferably at least one selected from the group consisting of polyvinyl alcohol resin, cellulose resin, ether linkage-containing resin, carbamoyl group-containing resin, carboxyl group-containing resin, and gelatin, among which polyvinyl alcohol (PVA) resin is particularly preferable.

Examples of the polyvinyl alcohol include those described in Japanese Patent Application Publication (JP-B) Nos. 4-52786, 5-67432, 7-29479, JP Patent No. 2537827, JP-B No. 7-57553, JP Patent Nos. 2502998, 3053231, JP-A No. 63-176173, JP Patent No. 2604367, JP-A Nos. 7-276787, 9-207425, 11-58941, 2000-135858, 2001-205924, 2001-287444, 62-278080, 9-39373, JP Patent No. 2750433, JP-A Nos. 2000-158801, 2001-213045, 2001-328345, 8-324105, 11-348417, 58-181687, 10-259213, 2001-72711, 2002-103805, 2000-63427, 2002-308928, 2001-205919, 2002-264489, etc.

Examples of water-soluble resins other than the polyvinyl alcohol resin include compounds described in [0011] to [0012] in JP-A No. 11-165461 and compounds described in JP-A Nos. 2001-205919 and 2002-264489.

These water-soluble resins may be used singly or in combination thereof. In the ink jet recording medium of the invention, the content of the water-soluble resin is preferably 9 to 40% by mass, and more preferably 12 to 33% by mass, based on the total solid content of the ink receiving layer.

The polyvinyl alcohol resin may be used in combination with the other water-soluble resin. When the polyvinyl alcohol resin and the other water-soluble resin are simultaneously used, the content of the polyvinyl alcohol resin is preferably 50% by mass or more, and more preferably 70% by mass or more, based on the total water-soluble resins.

(Fine Particles)

In the ink jet recording medium of the invention, the ink receiving layer preferably comprises fine particles together with the complex formed from the acidic group-containing compound and the metal with a valence of two or more. It is more preferable to comprise fine particles and the above-described water-soluble resin together with the complex.

By incorporation of the fine particles, the ink receiving layer forms a porous structure to improve ink absorptivity. When the solid content of the fine particles in the ink receiving layer is 50% by mass or higher, particularly higher than 60% by mass, a further excellent porous structure can be formed to provide the ink jet recording medium with sufficient ink absorptivity. The solid content of the fine particles in the ink receiving layer is a content based on non-water components in the composition constituting the ink receiving layer.

Organic particles or inorganic particles may be used as the fine particles in the invention, and inorganic particles are preferably used in respect of ink absorptivity and image stability.

The fine organic particles are preferably polymer particles obtained by, for example, emulsion polymerization, polymerization in a microemulsion system, soap-free polymerization, seed polymerization, dispersion suspension or suspension polymerization. Examples of polymer particles include particles of polymers such as polyethylene, polypropylene, polystyrene, polyacrylate, polyamide, silicon resin, phenol resin and naturally occurring polymers in the form of powder, latex or emulsion.

Examples of the fine inorganic particles include fine particles of silica, colloidal silica, titanium dioxide, barium sulfate, calcium silicate, zeolite, kaolinite, halloysite, mica, talc, calcium carbonate, magnesium carbonate, calcium sulfate, pseudo-boehmite, zinc oxide, zinc hydroxide, alumina, aluminum silicate, calcium silicate, magnesium silicate, zirconium oxide, zirconium hydroxide, cerium oxide, lanthanum oxide and yttrium oxide. Among these, fine particles of silica, colloidal silica, fine particles of alumina, and pseudo-boehmite are preferable from the viewpoint of formation of an excellent porous structure. The fine particles may be used as primary particles or in the form of secondary particles formed. The average primary particle diameter of the fine particles is preferably 2 µm or less, and more preferably 200 nm or less.

The fine particles are preferably fine particles of silica having an average primary particle diameter of 30 nm or less, colloidal silica having an average primary particle diameter of 30 nm or less, fine particles of alumina having an average primary particle diameter of 20 nm or less or pseudo-boehmite having an average pore radius of 2 to 15 nm, particularly preferably fine particles of silica, fine particles of alumina or pseudo-boehmite.

The fine silica particles can be classified roughly into wet process particles and dry process (vapor phase process) particles, depending on the process for producing silica. As the wet process, a process wherein silicates are decomposed with an acid to form activated silica which is then suitably polymerized, aggregated and precipitated to provide hydrous silica is mainly used. As the vapor phase process, a process involving decomposition of silicon halides in a vapor phase at high temperatures (flame hydrolysis process) and a process involving heating, reducing and gasifying borax and coke by an arc in an electric oven and oxidizing the resulting gas with air (arc process) to form anhydrous silica are mainly used. "Fumed silica" refers to anhydrous silica particles obtained by the vapor phase process. Particularly, the fine particles of silica used in the invention are preferably fine particles of fumed silica.

The fumed silica is different from the hydrous silica in the density of silanol groups on the surface, in the presence of pores, etc. to show different properties, and is suitable for formation of a 3-dimensional structure of high porosity. The reason for this is not evident, but is possibly because the hydrous silica has a high density of 5 to 8 silanol groups/$nm^2$ on the surface of the fine particles, and thus the fine silica particles are easily densely aggregated, while the fumed silica has a low density of 2 to 3 silanol groups/$nm^2$ on the surface of the fine particles, and is thus sparsely flocculated to form a structure of high porosity.

The fumed silica has a particularly large specific surface area, and is thus characterized by high ink absorptivity, high retention efficiency and low refractive index, thus endowing the receiving layer with transparency upon being dispersed to a suitable particle diameter and attaining high color density and excellent color property. The fact that the receiving layer is transparent is important for attaining high color density and excellent coloring gloss not only for use in e.g. OHP requiring high transparency but also for use in recording sheets such as photo gloss paper.

The average primary particle diameter of the fumed silica is preferably 30 nm or less, more preferably 20 nm or less, still more preferably 10 nm or less, and most preferably 3 to 10 nm. Particles of the fumed silica easily adhere to one another via hydrogen bonds between silanol groups so that when the average primary particle diameter is 30 nm or less, the fumed silica can form a structure of high porosity to improve ink absorptivity effectively.

The fine silica particles may be used in combination with other particles described above. When fumed silica is used with other fine particles together, the content of the fumed silica in the whole fine particles is preferably 30% by mass or more, and more preferably 50% by mass or more.

The inorganic fine particles of the invention are preferably fine alumina particles, alumina hydride, a mixture thereof or a complex thereof. Among these, the alumina hydride is preferable because of good ink absorption and fixation, and particularly pseudo-boehmite ($Al_2O_3 \cdot nH_2O$) is preferable. The alumina hydride can be used in various forms, and particularly boehmite in a sol form is preferably used as a starting material to easily form a smooth layer.

The average pore radius in the pore structure of pseudo-boehmite is preferably 1 to 30 nm, and more preferably 2 to 15 nm. The void volume is preferably 0.3 to 2.0 cc/g, and more preferably 0.5 to 1.5 cc/g. The pore radius and void volume are measured by a nitrogen absorption/desorption method, for example by using a gas absorption/desorption analyzer (for example, trade name: Omunisorp 369 manufactured by Beckman Coulter, Inc.).

Among the alumina particles, fumed alumina particles are preferable because of higher specific surface area. The average primary particle diameter of the fumed alumina is preferably 30 nm or less, and more preferably 20 nm or less.

When the fine particles are used in the ink jet recording medium, the particles can also be preferably used in embodiments described in, for example, JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314.

The water-soluble resin and the fine particles as major components in the ink receiving layer of the invention may be a single material respectively or a mixture of plural materials.

The type of the water-soluble resin used in combination with the fine particles, particularly the silica particles, is important from the viewpoint of maintaining transparency. When the fumed silica is used, the water-soluble resin is preferably polyvinyl alcohol resin among which polyvinyl alcohol resin having a saponification degree of preferably 70 to 100%, and more preferably 80 to 99.5% is used.

The polyvinyl alcohol resin has a hydroxyl group in its structural unit, and this hydroxyl group forms a hydrogen bond with a silanol group on the surface of the fine silica particle, thus facilitating formation of a 3-dimensional network comprising secondary fine silica particles as chain units. It is estimated that the ink receiving layer having a porous structure of high porosity and sufficient strength can be formed by formation of the 3-dimensional network.

In ink jet recording, the porous ink receiving layer obtained in the manner as described above can absorb ink rapidly by the capillary phenomenon to form dots excellent in circularity without ink smearing.

When the polyvinyl alcohol resin and another water-soluble resin are used together, the content of the polyvinyl alcohol resin is preferably 50% by mass or more, and more preferably 70% by mass or more, based on the total content of the water-soluble resins.

(Ratio of the Fine Particles to the Water-Soluble Resin)

The ratio of the fine particles (x) to the water-soluble resin (y) [PB ratio (x:y)] affects a significant influence on the structure and strength of the ink receiving layer. That is, when the weight ratio [PB ratio] is increased, the porosity, void volume and surface area (per unit area) increase, but the density and strength tend to decrease.

If the weight ratio [PB ratio (x:y)] is too high, the strength of the resulting coating is deteriorated, and cracking occurs, while if the PB ratio is too small, the pores are easily clogged with the resin to reduce porosity thereby reducing ink absorptivity. From the viewpoint of preventing these problems, the PB ratio is preferably 1.5:1 to 10:1.

Because the recording medium passing through a transfer system in an ink jet printer, etc. may be subject to stress, the ink receiving layer should have sufficient strength. To prevent cracking and removal of the ink receiving layer upon being cut into sheets, the ink receiving layer should have sufficient strength. In this respect, the weight ratio (x:y) is preferably 5:1 or less, and more preferably 2:1 or more from the viewpoint of securing high-speed ink absorption in an ink jet printer, etc.

For example, when a coating solution wherein the fine particles of fumed silica having an average primary particle diameter of 20 nm or less and the water-soluble resin were completely dispersed in a weight ratio (x:y) of 2:1 to 5:1 in an aqueous solution is applied onto a support and the coating layer is dried, a 3-dimensional network having secondary particles of the fine silica particles as chain units can be formed to facilitate formation of a light-permeable porous coating having an average pore diameter of 30 nm or less, a porosity of 50 to 80%, a void volume of at least 0.5 ml/g and a specific surface area of at least 100 m$^2$/g.

(Crosslinking Agent)

The ink receiving layer in the ink jet recording medium of the invention preferably comprises the water-soluble resin and a crosslinking agent capable of crosslinking the water-soluble resin. More preferably, the ink receiving layer comprises the fine particles, the water-soluble resin, and a crosslinking agent, and the ink receiving layer is cured by being crosslinked with the crosslinking agent to form a porous structure.

A boron compound is preferably used to crosslink the water-soluble resin, particularly polyvinyl alcohol. Examples of the boron compound include borax, boric acid, borate (for example, orthoborate, InBO$_3$, ScBO$_3$, YBO$_3$, LaBO$_3$, Mg$_3$(BO$_3$)$_2$, Co$_3$(BO$_3$)$_2$, diborate (for example, Mg$_2$B$_2$O$_5$, Co$_2$B$_2$O$_5$), metaborate (for example, LiBO$_2$, Ca(BO$_2$)$_2$, NaBO$_2$, KBO$_2$), tetraborate (for example, Na$_2$B$_4$O$_7$·10OH$_2$O), pentaborate (for example, KB$_5$O$_8$·4H$_2$O, Ca$_2$B$_6$O$_{11}$·7H$_2$O, CsB$_5$O$_5$), etc. Among these compounds, borax, boric acid and borate are preferable, and boric acid is particularly preferable to cause the crosslinking reaction rapidly.

As the crosslinking agent for the water-soluble resin, compounds other than the boron compound can also be used. Example of such compounds include aldehyde compounds such as formaldehyde, glyoxal, succinaldehyde, glutaraldehyde, dialdehyde starch and plant gum; ketone compounds such as diacetyl, 1,2-cyclopentanedione and 3-hexene-2,5-dione; activate halogenated compounds such as bis(2-chloroethyl)urea, bis(2-chloroethyl)sulfone and 2,4-dichloro-6-hydroxy-s-triazine sodium salt; activate vinyl compounds such as divinylsulfone, 1,3-bis(vinylsulfonyl)-2-propanol, N,N'-ethylenebis(vinylsulfonylacetamide), divinyl ketone, 1,3-bis(acryloyl)urea and 1,3,5-triacryloyl-hexahydro-s-triazine; N-methylol compounds such as dimethylol urea and methylol dimethyl hydantoin; melamine compounds such as trimethylol melamine, alkylated methylol melamine, melamine, benzoguanamine and melamine resin; epoxy compounds such as ethylene glycol diglycidyl ether, propylene glycol diglycidyl ether, polyethylene glycol diglycidyl ether, diglycerin polyglycidyl ether, spiroglycol diglycidyl ether, and phenol resin polyglycidyl ether;

isocyanate type compounds such as 1,6-hexamethylene diisocyanate and xylylene diisocyanate; aziridine compounds described in U.S. Pat. Nos. 3,017,280 and 2,983,611; carboxyimide compounds described in U.S. Pat. No. 3,100,704; ethyleneimino compounds such as 1,6-hexamethylene-N,N'-bis-ethyleneurea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chrome alum, potassium alum, zirconium acetate and chrome acetate; polyamine compounds such as tetraethylene pentamine; hydrazide compounds such as adipate dihydrazide; a low molecule or a polymer having two or more oxazoline groups; polyvalent acid anhydride, acid chloride and bissulfonate compounds described in U.S. Pat. Nos. 2,725,294, 2,725,295, 2,726,162 and 3,834,902; and activate ester compounds described in U.S. Pat. Nos. 3,542,558 and 3,251,972.

These crosslinking agents can be used alone or as a mixture of two or more.

Curing by crosslinking is carried out preferably by adding a crosslinking agent to a coating solution containing the fine particles and the water-soluble resin (hereinafter sometimes referred to as "coating solution A") and/or to a basic solution described below; and (1) while a coating layer is formed by applying the coating solution or (2) during drying a coating layer formed by applying the coating solution and before the coating layer exhibits a decreasing rate of drying, by applying a basic solution having pH of more than 7 (hereinafter sometimes referred to as "coating solution B") onto the coating layer. The pH of the basic solution is more preferably 7.5 or more, and still more preferably 8 or more.

When the crosslinking agent is a boron compound, the boron compound is applied in the following manner. That is, when the ink receiving layer is a layer produced by applying the coating solution (coating solution A) containing the fine particles and the water-soluble resin and then curing by crosslinking of the resulting coating layer, this curing by crosslinking is carried out by applying the basic solution having pH of more than 7 (coating solution B) onto the coating layer (1) while the coating layer is formed by applying the coating solution or (2) during drying the coating layer formed by applying the coating solution and before the coating layer exhibits a decreasing rate of drying. As the crosslinking agent, the boron compound may be contained in the coating solution A and/or the coating solution B.

The amount of the crosslinking agent used is preferably 1 to 50% by mass, and more preferably 5 to 40% by mass, based on the water-soluble resin.

(Mordant)

The ink receiving layer in the ink jet recording medium of the invention preferably comprises a mordant to improve the water resistance of a formed image and to prevent the image from smearing with time.

The mordant is preferably an organic mordant such as a cationic polymer (cationic mordant) or an inorganic mordant. The mordant is contained in the ink receiving layer to interact with a liquid ink having an anionic dye as a colorant thereby stabilizing the colorant, improving water resistance and preventing smearing with time. Either or both of the organic and inorganic mordants may be used.

The mordant can be used by adding it to the coating solution A containing the fine particles and the water-soluble resin, or by adding it to the coating solution B when the mordant may be precipitated with the fine particles.

As the cationic mordant, a polymer mordant having a primary to tertiary amino group or a quaternary ammonium base as a cationic group is preferably used, but a cationic non-polymer mordant can also be used. From the viewpoint of improving the ink absorptivity of the ink receiving layer, these mordants are preferably compounds having a weight-average molecular weight of 500 to 100,000.

The polymer mordant is preferably a homopolymer of a monomer (mordant monomer) having a primary to tertiary amino group or a salt thereof or a quaternary ammonium base or a copolymer of the mordant monomer and another monomer (referred to hereinafter as "non-mordant monomer") or a polycondensate thereof. These polymer mordants can be used in the form of a water-soluble polymer or water-dispersible latex particles.

The monomer (mordant monomer) includes, for example, trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride;

trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate; and quaternary products, with methyl chloride, ethyl chloride, methyl bromide, ethyl bromide, methyl iodide or ethyl iodide, of N,N-dimethylamonoethyl (meth)acrylate, N,N-diethylaminoethyl (meth)acrylate, N,N-dimethylamonopropyl (meth)acrylate, N,N-diethylaminopropyl (meth)acrylate, N,N-dimethylaminoethyl (meth)acrylamide, N,N-diethylamionoethyl (meth)acrylamide, N,N-dimethylaminopropyl (meth)acrylamide or N,N-diethylaminopropyl (meth)acrylamide, as well as their sulfonates, alkyl sulfonates, acetates or alkyl carboxylates whose anions are substituted.

Specific examples of the mordant include monomethyl-diallyl ammonium chloride, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy)ethylammonium chloride, trimethyl-3-(methacryloyloxy)propyl ammonium chloride, triethyl-3-(methacryloyloxy)propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamino)ethyl ammonium chloride, trimethyl-3-(methacryloylamino)propyl ammonium chloride, triethyl-3-(methacryloylamino) propyl ammonium chloride, trimethyl-3-(acryloylamino) propyl ammonium chloride, triethyl-3-(acryloylamino) propyl ammonium chloride;

N,N-dimethyl-N-ethyl-2-(methacryloyloxy)ethyl ammonium chloride, diethyl-N-methyl-2-(methacryloylox)ethyl ammonium chloride, N,N-dimethyl-N-ethyl-3-(acryloyloxylamino)propyl ammonium chloride, trimethyl-2-(methacryloyloxy)ethyl ammonium bromide, trimethyl-3-(acryloyloxylamino)propyl ammonium bromide, trimethyl-2-(methacryloyloxy)ethyl ammonium sulfonate, trimethyl-3-(acryloylamino)propyl ammonium acetate, etc.

Other copolymerizable monomers such as N-vinylimidazole, N-vinyl-2-methylimidazole, etc. can also be mentioned.

Allyl amine, diallyl amine and derivatives thereof and salts thereof can also be used. Examples of such compounds include allyl amine, allylamine hydrochloride, allylamine acetate, allylamine sulfate, diallyl amine, diallylamine hydrochloride, diallylamine acetate, diallylamine sulfate, diallyl methylamine and salts thereof (for example, hydrochloride, acetate, sulfate, etc.), diallyl ethylamine and salts thereof (for example, hydrochloride, acetate, sulfate, etc.) and diallyldimethyl ammonium salts (whose counter-anions are chloride, acetate ion, sulfate ion, etc.). These allyl amine and diallyl amine derivatives in an amine form are inferior in polymerizability, and are thus polymerized generally in a salt form and then desalted if necessary.

A mordant obtained by polymerizing a monomer such as N-vinyl acetamide or N-vinyl formamide and then hydrolyzing the resulting polymer to form a vinyl amine structure, or a salt thereof, can also be used.

The non-mordant monomer refers to a monomer not containing a basic or cationic moiety such as a primary to tertiary amino group or a salt thereof or a quaternary ammonium base and not interacting or substantially not interacting with a dye in an ink for ink jetting.

Examples of the non-mordant monomer include alkyl (meth)acrylates; cycloalkyl (meth)acrylates such as cyclohexyl (meth)acrylate; aryl (meth)acrylates such as phenyl (meth)acrylate; aralkyl esters such as benzyl (meth)acrylate; aromatic vinyls such as styrene, vinyl toluene and α-methyl styrene; vinyl esters such as vinyl acetate and vinyl propionate; allyl esters such as allyl acetate; halogen-containing monomers such as vinylidene chloride and vinyl chloride; vinyl cyanides such as (meth)acrylonitrile; and olefins such as ethylene and propylene.

The alkyl (meth)acrylates are preferably alk (meth)acrylates whose alkyl moiety contains 1 to 18 carbon atoms, such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate.

In particular, methyl acrylate, ethyl acrylate, methyl methacrylate, ethyl methacrylate and hydroxyethyl methacrylate are preferable.

The non-mordant monomers can be used alone or as a mixture of two or more thereof.

The polymer mordant includes cyclic amine resin such as polydiallyldimethyl ammonium chloride, a diallyldimethyl ammonium chloride/other monomer (mordant monomer or non-mordant monomer) copolymer, a diallyldimethyl ammonium chloride/$SO_2$ copolymer, polydiallyl methylamine hydrochloride and polydiallyl hydrochloride, or derivatives thereof (including copolymers thereof); alkyl (meth)acrylate polymers substituted with secondary, tertiary or quaternary ammonium, such as polydiethylmethacryloyloxy ethylamine, polytrimethylmethacryloyloxyethyl ammonium chloride, polydimethylbenzylmethacryloyloxyethyl ammonium chloride and polydimethylhydroxyethylacryloyloxyethyl ammonium chloride or copolymers thereof with other monomers; polyamine resin such as polyethylene imine and derivatives thereof, polyallyl amine and derivatives thereof, and polyvinyl amine and derivatives thereof; polyamide resin such as polyamide-polyamine resin and polyamide epichlorohydrin resin; polysaccharides such as cationic starch, chitosan and chitosan derivatives; dicyandiamide derivatives such as dicyandiamide/formalin polycondensates and dicyandiamide diethylene triamine polycondensates; polyamidine and polyamidine derivatives; dialkylamine epichlorohydrin addition polymers such as dimethylamine epichlorohydrin addition polymers, and derivatives thereof; and styrene polymers having an alkyl group substituted with a quaternary ammonium salt and copolymers thereof with other monomers.

Specifically, the polymer mordant includes those described in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, U.S. Pat. Nos. 2,484,430, 2,548,564, 3,148,061, 3,309,690, 4,115,124, 4,124,386, 4,193,800, 4,273,853, 4,282,305, 4,450,224, JP-A Nos. 1-161236, 10-81064, 10-157277, 10-217601, 2001-138621, 2000-211235, 2001-138627, 8-174992, JP-B Nos. 5-35162, 5-35163, 5-35164, 5-88846, and JP Patent Nos. 2648847 and 2661677.

An inorganic mordant can also be used as the mordant in the invention, and includes polyvalent water-soluble metal salts and hydrophobic metal salts.

Specific examples of the inorganic mordant include salts or complexes of a metal selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

Specific examples of such compounds include calcium acetate, calcium chloride, calcium formate, calcium sulfate, barium acetate, barium sulfate, barium phosphate, manganese chloride, manganese acetate, manganese formate.$2H_2O$, ammonium manganese sulfate.$6H_2O$, cupper (II) chloride, cupper(II) ammonium chloride.$2H_2O$, copper sulfate, cobalt chloride, cobalt thiocyanate, cobalt sulfate, nickel sulfate.$6H_2O$, nickel chloride.$6H_2O$, nickel acetate.$4H_2O$, ammonium nickel sulfate.$6H_2O$), nickel amidosulfate.$4H_2O$, aluminum sulfate, aluminum alum, aluminum sulfite, aluminum thiosulfate, aluminium chloro hydrate, basic aluminum lactate, basic aluminum sulfate, basic aluminum nitrate, basic aluminum sulfaminate, basic aluminum formate, basic aluminum acetate, basic aluminum glycinate, aluminum nitrate.$9H_2O$, aluminum chloride.$6H_2O$, ferrous bromide, ferrous chloride, ferric chloride, ferrous sulfate, ferric sulfate, zinc phenolsulfonate, zinc bromide, zinc chloride, zinc nitrate.$6H_2O$, zinc sulfate, titanium tetrachloride, tetraisopropyl titanate, titanium acetylacetonate, titanium lactate, zirconium acetylacetonate, zirconyl acetate, zirconyl sulfate, ammonium zirconium carbonate, zirconyl stearate, zirconyl octylate, zirconyl nitrate, zirconyl lactate, zirconyl succinate, zirconyl oxalate, ammonium zirconium acetate, potassium zirconium carbonate, sodium zirconium lactate, basic zirconium glycinate, zirconium oxychloride, zirconium hydroxychloride, chrome acetate, chrome sulfate, magnesium sulfate, magnesium chloride.$6H_2O$, magnesium citrate.$9H_2O$, sodium phosphotungstate, tungsten sodium citrate, 12-tungustophosphoric acid.$nH_2O$, 12-tungstosilicic acid.$26H_2O$, molybdenum chloride, 12-molybdophoshoric acid.$nH_2O$, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

Preferable among those described above are aluminum-containing compounds such as aluminum sulfate, aluminum alum, aluminum sulfite, aluminum thiosulfate, aluminium chloro hydrate, basic aluminum lactate, basic aluminum sulfate, basic aluminum nitrate, basic aluminum sulfaminate, basic aluminum formate, basic aluminum acetate, basic aluminum glycinate, aluminum nitrate.$9H_2O$ and aluminum chloride.$6H_2O$; titanium-containing compounds such as titanium tetrachloride, tetraisopropyl titanate, titanium acetylacetonate and titanium lactate; and zirconium-containing compounds such as zirconium acetylacetonate, zirconyl acetate, zirconyl sulfate, ammonium zirconium carbonate, zirconyl stearate, zirconyl octylate, zirconyl nitrate, zirconium lactate, zirconium succinate, zirconium oxalate, ammonium zirconium acetate, potassium zirconium carbonate, sodium zirconium lactate, basic zirconium glycinate, zirconium oxychloride and zirconium hydroxychloride, particularly preferably basic zirconium and/or basic aluminum salts.

The inorganic mordant used in the invention is preferably an aluminum-containing compound, a titanium-containing compound, a zirconium-containing compound, or a compound (salt or complex) of the group IIIB metals in the periodic table.

The content of the mordant in the ink receiving layer in the invention is preferably 0.01 to 20 $g/m^2$, more preferably 0.1 to 15 $g/m^2$, and still more preferably 0.5 to 10 $g/m^2$.

(Other Components)

If necessary, the ink jet recording medium of the invention can further contain a wide variety of known additives such as an acid, a UV absorber, an antioxidant, a fluorescent brightener, a monomer, a polymerization initiator, a polymerization inhibitor, a blurring inhibitor, a preservative, a viscosity stabilizer, a defoaming agent, a surfactant, an antistatic agent, a matting agent, a curling inhibitor and a water resistance-conferring agent.

In the invention, the acid is added to the ink receiving layer to control the surface pH of the ink receiving layer in the range of pH 3 to 7, preferably pH 4 to 6 thereby improving the yellowing resistance of a white background portion. The surface pH is measured by method A (coating method) for measurement of surface pH stipulated by Japanese Technical Association of Paper Pulp Technical Institution (J. TAPPI). For example, a paper pH measurement set "type MPC" (KYORITSU CHEMICAL-CHECK Lab., Corp.) corresponding to the method A can be used in this measurement.

Specific examples of the acid include formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, metal salicylate (Zn, Al, Ca or Mg salicylate), methanesulfonic acid, itaconic acid, benzenesulfonic acid, toluenesulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, sulfanilic acid, sulfamic acid, α-resorcin acid, β-resorcin acid, γ-resorcin acid, gallic acid, fluoroglycine, sulfosalicylic acid, ascorbic acid, erysorbic acid, bisphenolic acid, hydrochloric acid, nitric acid, sulfuric acid, phosphoric acid, polyphosphoric acid, boric acid and boronic acid. The amount of these acids may be determined such that the pH of the surface of the ink receiving layer is reduced to 3 to 7.

The acid may be used in the form of a metal salt (for example, a salt of sodium, potassium, calcium, cesium, zinc, copper, iron, aluminum, titanium, zirconium, lanthanum, yttrium, magnesium, strontium or cerium) or an amine salt (for example, ammonia, triethylamine, tributylamine, piperazine, 2-methylpiperazine or polyallylamine).

The above-described polyvalent metal salt in the invention can be used to control the surface pH of the ink receiving layer in the range of pH 3 to 7 by reacting with the acid.

In the invention, the ink receiving layer preferably contains shelf-stability improvers such as a UV absorber, an antioxidant and a blurring inhibitor.

The UV absorber, antioxidant and blurring inhibitor include alkylated phenol compounds (including hindered phenol compounds), alkylthiomethyl phenol compounds, hydroquinone compounds, alkylated hydroquinone compounds, tocopherol compounds, aliphatic, aromatic and/or heterocyclic compounds having thioether linkages, bisphenol compounds, O—, N— and S-benzyl compounds, hydroxybenzyl compounds, triazine compounds, phosphonate compounds, acylaminophenol compounds, ester compounds, amide compounds, ascorbic acid, amine antioxidants, 2-(2-hydroxyphenyl)benzotriazole compounds, 2-hydroxybenzophenone compounds, acrylate, water-soluble or hydrophobic metal salts, organic metal compounds, metal complexes, hindered amine compounds (including TEMPO compound), 2-(2-hydroxyphenyl)-1,3,5-triazine compound, metal inactivating agents, phosphite compounds, phosphonite compounds, hydroxyamine compounds, nitron compounds, peroxide scavengers, polyamide stabilizers, polyether compounds, basic assistant stabilizers, nucleating agents, benzofuranone compounds, indolinone compounds, phosphine compounds, polyamine compounds, thiourea compounds, urea compounds, hydrazide compounds, amidine compounds, sugar compounds, hydroxybenzoic acid compounds, dihydroxybenzoic acid compounds and trihydroxybenzoic acid compounds.

Preferable among these compounds are alkylated phenol compounds, aliphatic, aromatic and/or heterocyclic compounds having thioether linkages, bisphenol compounds, ascorbic acid, amine antioxidants, water-soluble or hydrophobic metal salts, organometallic compounds, metal complexes, hindered amine compounds, hydroxyamine compounds, polyamine compounds, thiourea compounds, hydrazide compounds, hydroxybenzoic acid compounds, dihydroxybenzoic acid compounds and trihydroxybenzoic acid compounds.

Examples of such compounds include those described in JP-A Nos. 2002-36717, 2002-86904, 2002-307822, 10-182621, 2001-260519, JP-B Nos. 4-34953, 4-34513, JP-A No. 11-170686, JP-B No. 4-34512, EP1138509, JP-A Nos. 60-67190, 7-276808, 2001-94829, 47-10537, 58-111942, 58-212844, 59-19945, 59-46646, 59-109055, 63-53544, JP-B Nos. 36-10466, 42-26187, 48-30492, 48-31255, 48-41572, 48-54965, 50-10726, U.S. Pat. Nos. 2,719,086, 3,707,375, 3,754,919, 4,220,711, JP-B Nos. 45-4699, 54-5324, European Patent Laid-Open Nos. 223739, 309401, 309402, 310551, 310552 and 459416, German Patent Laid-Open No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-170361, JP-B Nos. 48-43295, 48-33212, U.S. Pat. Nos. 4,814,262 and 4,980,275.

The other components described above may be used alone or as a mixture of two or more thereof. The other components may be added after being rendered water-soluble or dispersible, or may be formed into a polymer dispersion, an emulsion or droplets, or encapsulated in microcapsules. The amount of the other components added to the ink jet recording medium of the invention is preferably 0.01 to 10 g/m$^2$.

For the purpose of improving the dispersibility of the fine inorganic particles, the surface of the inorganic particles may be treated with a silane coupling agent. The silane coupling agent is preferably the one having organic functional groups (for example, a vinyl group, amino group (primary to tertiary amino group, quaternary ammonium base), epoxy group, mercapto group, chloro group, alkyl group, phenyl group, ester group, thioether group, etc.) in addition to a site for coupling treatment.

In the invention, the ink receiving layer coating solution preferably contains a surfactant. The surfactant used may be a cationic, anionic, nonionic, amphoteric, fluorine or silicon surfactant.

The nonionic surfactant includes polyoxyalkylene alkyl ethers and polyoxyalkylene alkyl phenyl ethers (for example, diethylene glycol monoethyl ether, diethylene glycol diethyl ether, polyoxyethylene lauryl ether, polyoxyethylene stearyl ether, polyoxyethylene nonyl phenyl ether, etc.), oxyethylene-oxypropylene block copolymers, sorbitan fatty esters (for example, sorbitan monolaurate, sorbitan monooleate, sorbitan trioleate, etc.), polyoxyethylene sorbitan fatty esters (for example, polyoxyethylene sorbitan monolaurate, polyoxyethylene sorbitan monooleate, polyoxyethylene sorbitan trioleate, etc.), polyoxyethylene sorbitol fatty esters (for example, polyoxyethylene sorbitol tetraoleate, etc.), glycerin fatty esters (for example, glycerol monooleate, etc.), polyoxyethylene glycerin fatty esters (polyoxyethylene glycerin monostearate, polyoxyethylene glycerin monooleate, etc.), polyoxyethylene fatty esters (polyethylene glycol monolaurate, polyethylene glycol monooleate, etc.) and polyoxyethylene alkyl amines, acetylene glycols (for example, 2,4,7,9-tetramethyl-5-decyn-4,7-diol, and other diol ethylene oxide addition products, propylene oxide addition products), etc., among which polyoxyalkylene alkyl ethers are preferable. The nonionic surfactant can be used in both the first and second coating solutions. The nonionic surfactants may be used singly or in combination thereof.

The amphoteric surfactant includes those of amino acid type, carboxy ammonium betaine type, sulfone ammonium betaine type, ammonium sulfate betaine type and imidazolium betaine type, and for example, those surfactants described in U.S. Pat. No. 3,843,368, JP-A Nos. 59-49535, 63-236546, 5-303205, 8-262742, 10-282619, JP Patent Nos. 2514194, 2759795 and JP-A No. 2000-351269 can be preferably used. The amphoteric surfactants are preferably those of amino acid type, carboxy ammonium betaine type and sulfone ammonium betaine type. The amphoteric surfactants may be used singly or in combination thereof.

The anionic surfactant includes aliphatic acid salts (for example, sodium stearate and potassium oleate), alkyl sulfates (for example, sodium laurylsulfate and lauryl sulfate triethanolamine), sulfonates (for example, sodium dodecylbenzenesulfonate), alkylsulfosuccinates (for example, sodium dioctylsulfosuccinate), alkyl diphenyl ether disulfonates, alkyl phosphates, etc.

The cationic surfactant includes alkylamine salts, quaternary ammonium salts, pyridinium salts, imidazolium salts, etc.

The fluorine surfactant includes compounds derived from intermediates having a perfluoroalkyl group by a method such as electrolytic fluorination, telomerization or oligomerization.

For example, mention is made of perfluoroalkyl sulfonates, perfluoroalkyl carboxylates, perfluoroalkyl ethylene oxide addition products, perfluoroalkyl trialkyl ammonium salts, perfluoroalkyl group-containing oligomers, perfluoroalkyl phosphates, etc.

The silicon surfactant is preferably an organic group-modified silicon oil which can have a siloxane structure modified at side chains, both ends or one end with organic groups. The organic group-modified group includes an amino-, polyether-, epoxy-, carboxyl-, carbinol-, alkyl-, aralkyl-, phenol- or fluorine-modified groups.

In the invention, the content of the surfactant is preferably 0.001 to 2.0%, and more preferably 0.01 to 1.0%, based on the ink receiving layer coating solution. When two or more solutions are used as the ink receiving layer coating solution, the surfactant is added preferably to both the coating solutions.

In the invention, the ink receiving layer contains a high-boiling organic solvent for prevention of curling. The high-boiling organic solvent is a water-soluble or hydrophobic organic compound having a boiling point of 150° C. or more at normal pressures. The high-boiling organic compound may be a low molecule or a polymer in the form of liquid or solid at room temperature.

Specifically, mention is made of aromatic carboxylates (for example, dibutyl phthalate, diphenyl phthalate, phenyl benzoate, etc.), aliphatic carboxylates (for example, dioctyl adipate, dibutyl sebacate, methyl stearate, dibutyl maleate, dibutyl fumarate, triethyl acetylcitrate, etc.), phosphates (for example, trioctyl phosphate, tricresyl phosphate, etc.), epoxy derivatives (for example, epoxylated soybean oil, epoxylated methyl fatty ester, etc.), alcohols (for example, stearyl alcohol, ethylene glycol, propylene glycol, diethylene glycol, triethylene glycol, glycerin, diethylene glycol monobutyl ether (DEGMBE), triethylene glycol monobutyl ether, glycerin monomethyl ether, 1,2,3-butane triol, 1,2,4-butane triol, 1,2,4-pentane triol, 1,2,6-hexane triol, thiodiglycol, triethanol amine, polyethylene glycol, etc.), vegetable oils (for example, soybean oil, sunflower oil, etc.) and higher aliphatic carboxylic acids (for example, linolic acid, oleic acid, etc.).

(Support)

As the support used in the invention, either a transparent sup port made of a transparent material such as plastics or an opaque s upport made of an opaque material such as paper can be used. A tr ansparent support or a highly glossy opaque support is preferably us ed in order to sufficiently utilize the transparency of the ink receiving layer. A read only optical disk such as CD-ROM and DVD-ROM, a write-once optical disk such as CD-R and DVD-R, or a rewritable opti cal disk is used as the support to provide the label surface with the ink receiving layer.

The material usable in the transparent support is preferably a material which is transparent and endurable against radiation heat when used in OHP or backlight displays. Examples of the material include polyesters such as polyethylene terephthalate (PET), or polysulfone, polyphenylene oxide, polyimide, polycarbonate, polyamide, etc. In particular, polyesters are preferable, and polyethylene terephthalate (PET) is particularly preferable.

The thickness of the transparent support is not particularly limited, but is preferably 50 to 200 µm for easier handling.

The highly glossy opaque support is preferably the one whose surface has 40% or more glossiness at the side where the ink receiving layer is to be arranged. The glossiness is a value determined according to a method described in JIS P-8142 (test method for 75° mirror surface glossiness of paper and plate paper). Specifically, the following support can be mentioned.

For example, highly glossy paper supports such as art paper, coated paper, cast-coated paper, and baryta paper used for silver salt photograph; highly glossy films (which may be subjected to surface calendering) rendered opaque by adding a white pigment, etc. to plastic films made of polyesters such as polyethylene terephthalate (PET), cellulose esters such as nitrocellulose, cellulose acetate and cellulose acetate butyrate, as well as polysulfone, polyphenylene oxide, polyimide, polycarbonate and polyamide; and supports provided with a polyolefin coating layer containing or not containing a white pigment on the surface of the above paper supports, transparent supports, or highly glossy film containing a white pigment, etc.

White pigment-containing foamed polyester films (for example, foamed PET containing fine polyolefin particles and having voids formed by stretching) are also preferable. A resin-coated paper used as a photographic paper for silver salt photograph is also preferable.

The thickness of the opaque support is not particularly limited either, but is preferably 50 to 300 µm for easier handling.

The surface of the support may have been subjected to corona discharge treatment, glow discharge treatment, flame treatment, UV irradiation treatment, etc. in order to improve wetting properties and adhesion.

The base paper used in the paper support is described in detail.

The base paper is produced from wood pulp as the main mate rial, if necessary from synthetic pulp such as polypropylene or synthe tic fibers such as nylon or polyester, in addition to wood pulp. As t he wood pulp, LBKP, LBSP, NBKP, NBSP, LDP, NDP, LUKP and NUK P can be used, but LBKP, NBSP, LBSP, NDP and LDP containing a l arger amount of short fibers are preferably used in a larger amount. The content of LBSP and/or LDP is preferably 10 to 70% by mass.

As the pulp, chemical pulp (sulfate pulp and sulfite pulp) of less impurity is preferably used, and pulp whose whiteness was improved by bleaching is also useful. The base paper can incorporate sizing agents such as higher fatty acids and alkyl ketine dimers, white pigments such as calcium carbonate, talc and titanium oxide, paper strength enhancers such as starch, polyacrylamide and polyvinyl alcohol, fluorescent whitening agents, water retainers such as polyethylene glycol, dispersants, and softeners such as quaternary ammonium if necessary.

The freeness of the pulp used in paper manufacturing is preferably 200 to 500 ml according to provisions of CSF, and the fiber length after beating is preferably 30 to 70% in terms of % by mass of 24- and 42-mesh residues in total as prescribed in JIS P-8207. 4-Mesh residues are preferably 20% by mass or less.

The basis weight of the base paper is preferably 30 to 250 g, particularly preferably 50 to 200 g. The thickness of the base paper is preferably 40 to 250 μm. The base paper can be endowed with high smoothness by calendering during or after paper manufacturing. The density of the base paper is generally 0.7 to 1.2 g/m$^2$ (in accordance with JIS P-8118).

Further, the rigidity of the base paper is preferably 20 to 200 g under the conditions prescribed in JIS P-8143.

The surface of the base paper may be coated with a surface sizing agent, and the usable surface sizing agent is the one that can be added to the above base paper.

The pH value of the base paper, when measured by a hot water extraction method prescribed in JIS P-8113, is preferably 5 to 9.

The polyethylene with which the obverse surface and reverse surface of the base paper are coated is mainly low-density polyethylene (LDPE) and/or high-density polyethylene (HDPE), but L-LDPE of lower density and polypropylene can also be partially used.

In particular, the polyethylene layer at the side where the ink receiving layer is to be formed is preferably the one whose opaqueness, whiteness and hue have been improved by adding rutile or anatase type titanium oxide, a fluorescent brightener and ultramarine to polyethylene as is widely conducted for photographic paper. The content of titanium oxide is preferably about 3 to 20% by mass, and more preferably 4 to 13% by mass, relative to the polyethylene. The thickness of the polyethylene layer is not particularly limited, but each of the front and reverse layers is preferably 10 to 50 μm. For conferring the adhesion of the polyethylene layer to the ink receiving layer, the polyethylene layer may be provided with an undercoat layer. The undercoat layer is preferably aqueous polyester, gelatin or PVA. The thickness of the undercoat layer is preferably 0.01 to 5 μm.

The polyethylene coating paper can be used not only as glossy paper but also as paper having a matted surface or a knitted silk-like surface such as on usual photographic paper by embossing it upon coating by melt-extrusion of polyethylene onto the surface of the base paper.

The support can be provided with a back coat layer to which components such as a white pigment, a water-soluble binder and other components can be added.

Examples of the white pigment contained in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrous halloysite, magnesium carbonate and magnesium hydroxide, and organic pigments such as styrene plastic pigment, acrylic plastic pigment, polyethylene, microcapsules, urea resin and melamine resin.

Examples of the water-soluble binder used in the back coat layer include water-soluble polymers such as a styrene/maleic acid copolymer, a styrene/acrylate copolymer, polyvinyl alcohol, silanol-modified polyvinyl alcohol, starch, cationic starch, casein, gelatin, carboxymethyl cellulose, hydroxyethyl cellulose and polyvinyl pyrrolidone, and water-dispersible polymers such as styrene butadiene latex and acrylic emulsion.

Other components contained in the back coat layer include a defoaming agent, a foaming inhibitor, a dye, a fluorescent brightener, a preservative, a water-resistance conferring agent, etc.

(Preparation of the Ink Jet Recording Medium)

The ink receiving layer in the ink jet recording medium of the invention is formed preferably by a method (wet-on-wet method) in which a first coating solution containing at least fine particles and a water-soluble resin (hereinafter sometimes referred to as "coating solution (A)") is applied onto the surface of a support, and (1) during this application or (2) before a drying coating layer formed by this application exhibits a decreasing rate of drying, a second coating solution having pH of more than 7, containing at least a mordant (hereinafter sometimes referred to as "coating solution (B)") is applied thereon, and the coating layer having the second coating solution applied thereon is cured by crosslinking. There are several preferably-adopted processes that introduce the complex of the invention to ink receiving layer. (1) The complex of the invention formed from the acidic group-containing compound and the metal with a valence of two or more may be contained in the first coating solution (coating solution (A)) and/or the second coating solution (coating solution (B)). (2) The metal with a valence of two or more may be contained in the first coating solution (coating solution (A)) and the acidic group-containing compound may be contained in the second coating solution (coating solution (B)). (3) The acidic group-containing compound is contained in the first coating solution (coating solution (A)) and the metal with a valence of two or more is contained in the second coating solution (coating solution (B)). The crosslinking agent capable of crosslinking the water-soluble resin is preferably contained in at least one of the coating solution (A) and the coating solution (B).

It is preferable to provide the ink receiving layer thus cured by crosslinking from the viewpoint of improvement of ink absorptivity and prevention of coating cracking.

The above-described production process of the ink receiving layer is preferably used because the mordant is present near the surface of the ink receiving layer, to act effectively on the colorant of the ink jet, thus improving the water resistance of printed letters and images. A part of the mordant may be contained in the coating solution (A), and in this case, the mordant in the coating solution (A) and the mordant in the coating solution (B) may be the same or different.

In the invention, the ink receiving layer coating solution (coating solution (A)) containing at least the fine particles (for example, fumed silica) and the water-soluble resin (for example, polyvinyl alcohol) can be prepared for example in the following manner.

The fine particles of fumed silica and a dispersant are added into water (for example, 10 to 20% by mass fine silica particles in water). Then, the silica particles are dispersed for 20 minutes (preferably 10 to 30 minutes) under the conditions of high-speed rotation for example at 10000 rpm (preferably 5000 to 20000 rpm) with a high-speed rotation wet-system colloid mill (for example, Clear Mix manufactured by M technique Co., Ltd.). A crosslinking agent (boron compound) and an aqueous solution of polyvinyl alcohol (PVA) are added thereto (in such an amount that PVA is about ⅓ by weight relative to the fumed silica). When the complex formed from an acidic group-containing compound and a metal according to the invention is contained in the ink receiving layer coating solution, the acidic group-containing compound and the metal may also be dispersed in the mixture under the same rotational condition as described above. Thus, the coating solution (A) can be obtained. The coating solution is obtained in uniform sol, and is applied onto a support by a coating method described below and then dried, whereby a porous ink receiving layer having a 3-dimensional network structure can be formed.

An aqueous dispersion comprising the fumed silica and the dispersant may be prepared by firstly preparing an aqueous dispersion of the fumed silica and then adding the aqueous dispersion to an aqueous solution of the dispersant or by adding an aqueous solution of the dispersant to an aqueous dispersion of the fumed silica, or by simultaneously mixing the two. Alternatively, the fumed silica in a powdery form in place of an aqueous dispersion of the fumed silica may be added to an aqueous solution of the dispersant.

The fumed silica is preferably used as an aqueous dispersion using a dispersant to further improve the gloss of the ink jet recording medium.

After the fumed silica is mixed with the dispersant, the mixture is finely dispersed with a dispersing machine, whereby an aqueous dispersion having an average particle diameter of 50 to 300 nm can be obtained. Examples of the dispersing machine used in preparing the aqueous dispersion include various dispersing machines known in the art, such as a high-speed rotation dispersing machine, a medium stirring dispersing machine (ball mill, sand mill, etc.), an ultrasonic dispersing machine, a colloid mill dispersing machine and a high-pressure dispersing machine. Among them, the stirring dispersing machine, colloid mill dispersing machine or high-pressure dispersing machine is preferably used from the viewpoint of efficiently dispersing coarse particles formed in the process.

As the solvent in each step, water, an organic solvent or a mixed solvent of these can be used. Examples of the organic solvent that can be used in the coating include alcohols such as methanol, ethanol, n-propanol, i-propanol and methoxypropanol, ketones such as acetone and methyl ethyl ketone, tetrahydrofuran, acetonitrile, ethyl acetate and toluene.

As the dispersant, a cationic polymer can be used. Examples of the cationic polymer include the above-described mordants. As the dispersant, a silane coupling agent is also preferably used.

The amount of the dispersant added to the solution is preferably 0.1 to 30%, and more preferably 1 to 10% based on the amount of the fine particles.

Application of the coating solution for the ink receiving layer in the invention can be carried out by a known coating method with e.g. an extrusion die coater, an air doctor coater, a blade coater, a rod coater, a knife coater, a squeeze coater, a reverse roll coater, or a bar coater.

While or after the ink receiving layer coating solution (coating solution (A)) is applied, the coating solution (B) is applied onto the coating layer. In this case, the coating solution (B) may be applied before the coating layer (A) after being applied exhibits a decreasing rate of drying. That is, after the ink receiving layer coating solution (coating solution (A)) is applied, the coating layer while showing a constant rate of drying is allowed to incorporate the mordant thereby preferably producing the ink receiving layer.

The phrase "before the coating layer exhibits a decreasing rate of drying" refers to a period of several minutes just after application of the ink receiving layer coating solution. During this period, the content of the solvent (dispersing medium) in the coating layer after being coated exhibits the phenomenon "constant rate of drying" in which the content of the solvent in the coating layer decreases in proportion to time. The time during which the "constant rate of drying" is maintained is described, for example, in Handbook of Chemical Engineering (pp.707-712, published by Maruzen Co., Ltd. in Oct. 25, 1980).

As described in the above, after applying the first coating solution, the coating layer is dried until the coating layer exhibits a decreasing rate of drying. This drying is carried out generally at a temperature of 50° C. to 180° C. for 0.5 to 10 minutes (preferably 0.5 to 5 minutes). Usually this drying time, though being varied depending on the amount of the coating solution, is preferably in the above range.

The method of applying the coating solution (B) before the first coating layer exhibits a decreasing rate of drying includes (1) a method of applying the coating solution (B) onto the coating layer, (2) a method of spraying the coating solution (B) onto the coating layer, and (3) a method of dipping a support having the coating layer formed thereon into the coating solution (B).

In the method (1) described above, the coating solution (B) can be applied by a known coating method with e.g. a curtain flow coater, an extrusion die coater, an air doctor coater, a blade coater, a rod coater, a knife coater, a squeeze coater, a reverse roll coater or a bar coater. However, a method of using an extrusion die coater, a curtain flow coater or a bar coater is preferably used so that the coater is not directly contacted with the previously formed first coating layer.

After application of the mordant solution (coating solution (B)), the coating layer is dried and cured by heating generally at a temperature of 40 to 180° C. for 0.5 to 30 minutes. The coating layer is heated particularly preferably at a temperature of 40 to 150° C. for 1 to 20 minutes.

When the mordant solution (coating solution (B)) is applied simultaneously with the ink receiving layer coating solution (coating solution (A), the ink receiving layer coating solution (coating solution (A)) and the mordant solution (coating solution (B)) are simultaneously applied (double-layer application) onto a support so as to contact the ink receiving layer coating solution (coating solution (A)) with the support, then dried and cured to provide the ink receiving layer.

This simultaneous application (double-layer application) can be carried out by a coating method using e.g. an extrusion die coater or a curtain flow coater. The coating layer formed after the simultaneous application is dried by heating the layer generally at a temperature of 40 to 150° C. for 0.5 to 10 minutes, preferably at a temperature of 40 to 100° C. for 0.5 to 5 minutes.

When the simultaneous application (double-layer application) is carried out by using e.g. an extrusion die coater, the simultaneously discharged two coating solutions form a double layer in the vicinity of a discharge orifice of the extrusion die coater, that is, before transfer to a support, and is then applied in the form of a double layer onto the support. The two coating solutions in the form of two layers layered before application onto the support undergo crosslinking reaction easily in the interface between the two solutions during transfer to the support, and thus the discharged two solutions are mixed and thickened easily in the vicinity of the discharge orifice of the extrusion die coater, to cause a hindrance sometimes in the coating operation. In the simultaneous double-layer application described above, therefore, a triple layer is preferably applied by simultaneously applying the ink receiving layer coating solution (coating solution (A)) and the mordant solution (coating solution (B)), together with a barrier layer solution (interlayer solution) sandwiched between the two solutions and made of a material not reacting with the crosslinking agent.

The barrier layer solution can be selected without particular limitation. For example, an aqueous solution containing a very small amount of a water-soluble resin, or water, can be used. The water-soluble resin used for the purpose of thickening, etc. for improving coating properties includes, for example, cellulose resin (for example, hydroxypropylmethyl cellulose, methyl cellulose and hydroxyethylmethyl cellulose) and polymers such as polyvinyl pyrrolidone and gelatin. The barrier layer may also contain the mordant.

After the ink receiving layer is formed on the support, the ink receiving layer can be subjected to calendering through nip rolls under heating and pressure with a supercalender, a gloss calender or the like to improve surface smoothness, gloss, transparency and coating strength. However, calendering can cause a reduction in porosity (that is, a reduction in ink absorptivity), and should thus be conducted under predetermined conditions where the reduction of porosity is small.

The temperature of the rolls in calendering is preferably 30 to 150° C., and more preferably 40 to 100° C. The linear pressure between the rolls in calendering is preferably 50 to 400 kg/cm, and more preferably 100 to 200 kg/cm.

In ink jet recording, the ink receiving layer should have a capacity enough to absorb all droplets, and thus its thickness should be determined in connection with the porosity of the layer. For example, when the amount of ink is 8 nL/mm$^2$ and the porosity is 60%, the layer should have a thickness of about 15 µm or more. From this viewpoint, the thickness of the ink receiving layer in the ink jet recording medium is preferably 10 to 50 µm.

The diameter of the pore in the ink receiving layer is preferably 0.005 to 0.050 µm, and more preferably 0.01 to 0.035 µm, in terms of median diameter. The porosity and pore median diameter can be measured by a mercury porosimeter (trade name: Poresizer 9320-PC2, manufactured by Shimadzu Corporation).

Preferably, the ink receiving layer is excellent in transparency. The transparency of the ink receiving layer formed on a transparent film support is preferably 30% or less, and more preferably 20% or less, in terms of haze. The haze can be measured with a haze meter (HGM-2DP, manufactured by Suga Test Instrument Co., Ltd.).

A dispersion of fine polymer particles may be added to the layer (for example, the ink receiving layer or back layer) constituting the ink jet recording medium of the invention. The dispersion of fine polymer particles is used for the purpose of improving physical properties for dimensional stability, curling prevention, adhesion prevention, cracking prevention, etc. The dispersion of fine polymer particles is described in JP-A Nos. 62-245258 and 10-228076. When a dispersion of fine polymer particles having a low glass transition point (40° C. or less) is added to the mordant-containing layer, the cracking and curling of the layer can be prevented. Curling can also be prevented by adding a dispersion of fine polymer particles having a high glass transition point to the back layer.

The ink jet recording medium of the invention can be prepared by methods described in JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091 and 8-2093.

(Ink Jet Recording Method)

The ink jet recording method of the invention comprises forming an image with an ink set for ink jet recording comprising, as minimum elements, a yellow ink containing at least one yellow dye, a magenta ink containing at least one magenta dye and a cyan ink containing at least one cyan dye, on the ink jet recording medium described above, wherein the oxidation potential of the magenta dye and/or cyan dye is higher than 0.8 V (vs SCE).

The magenta dye and/or cyan dye having an oxidation potential higher than 0.8 V (vs SCE) is used in the invention. The oxidation potential is preferably higher, and the oxidation potential is preferably higher than higher than 1.0 V (vs SCE), more preferably higher than 1.1 V (vs SCE), still more preferably higher than 1.15 V (vs SCE), and most preferably higher than 1.2 V (vs SCE).

The cyan dye having an oxidation potential higher than 0.8 (vs SCE) is preferably used in combination with the magenta dye to atta in good gray balance.

The oxidation potential indicates transferability of electrons from a sample to an electrode, and higher oxidation potential indicates that electron transfer from a sample to an electrode is difficult, that is, the sample is hardly oxidized. With respect to the chemical structure, when an electron-withdrawing group is introduced into a compound, the oxidation potential of the compound is increased; and when an electron-donating group is introduced into a compound, the oxidation potential of the compound is decreased.

The value of the oxidation potential will be described later in more detail. The oxidation potential refers to that potential of a compound by which electrons of the compound are withdrawn in an anode in voltammetry, and this potential is considered to agree approximately with the HOMO energy level of the compound in the ground state.

The present inventors made study on the ozone fastness of a colored image, and as a result they found that the oxidation potential of a compound used in a colored image is correlated with ozone fastness, and that a compound having higher oxidation potential than that of a saturated calomel electrode (SCE) can be used to improve ozone fastness.

The reason for this improvement in the ozone fastness of a colored image can be elucidated in terms of the relationship of HOMO (highest occupied molecular orbital) to LUMO (lowest unoccupied molecular orbital) between the compound and ozone gas. That is, it is estimated that because a colorant is oxidized by reaction of the HOMO of the colorant with the LUMO of ozone gas, resulting in deterioration in the ozone fastness of an colored image, the ozone fastness can be improved by lowering the reactivity of the colorant with ozone gas by lowering the HOMO of the colorant.

The oxidation potential (Eox) can be easily determined by those skilled in the art. The measurement method is described in detail by P. Delahay et al.: New Instrumental Methods in Electrochemistry, Interscience Publishers, 1954, A. J. Bard et al.: Electrochemical Methods, John Wiley & Sons, 1980, and Akira Fujishima et al. Electrochemical Measurement Methods, Gihodo Shuppansha, 1984.

Measurement of oxidation potential is described in more detail. A test sample is dissolved in an amount of $1 \times 10^{-4}$ to $1 \times 10^{-6}$ mol·dm$^{-3}$ in a solvent such as dimethylformamide or acetonitrile containing a supporting electrolyte such as sodium perchlorate or ammonium tetrapropyl perchlorate, and the oxidation potential of the test compound is measured as a value relative to that of SCE (saturated calomel electrode) by cyclic voltammetry or direct current polarography.

The supporting electrolyte and solvent used can be suitably selected depending on the oxidation potential and solubility of the test compound. The support electrolyte and solvent which can be used are described on pp. 101-118 in Electrochemical Measurement Methods authored by Akira Fujioka et al., Gihodo Shuppansha, 1984.

Due to the influence of liquid potential difference and the resistance of a sample solution, the oxidation potential is deviated within several tens milli-volt, but the reproducibility of the determined potential can be guaranteed by correction with a standard sample (for example hydroquinone).

The oxidation potential in the specification was measured by direct current polarography (concentration of a test compound: $1 \times 10^{-3}$ mol·dm$^{-3}$) using SCE (saturated calomel electrode) as a reference electrode, a graphite electrode as a working electrode and a platinum electrode as a counter electrode in N,N-dimethylformamide containing 0.1 mol·dm$^{-3}$ ammonium tetrapropyl perchlorate as a supporting electrolyte.

The dyes used in the invention can be those having any structures insofar as they satisfy the oxidation potential described above. In particular, the yellow dyes inherently have low oxidation potential (low HOMO), and are structurally less limited. Hereinafter, the structures of dyes necessary for satisfying the oxidation potential are described in more detail.

In the invention, it is preferable that the oxidation potential of the dye is made higher by introducing an electron-withdrawing group into the skeleton of the dye in order to lower reactivity with ozone as an electrophilic agent. The oxidation potential can be made higher by introducing a substituent group such as a nitro group, cyano group, sulfinyl group, sulfonyl group and sulfamoyl group whose Hammett's substituent constant $\sigma_p$ value (i.e. an indicator of the electrophilicity or electro-donation of the substituent group) is high.

The Hammett's substituent constant $\sigma_p$ value used in the specification is described. The Hammett's rule is an empirical rule proposed by L. P. Hammett in 1935 to quantitatively discuss the influence of substituent groups on the reaction or equilibrium of benzene derivatives, and nowadays the validity of this rule is recognized. The substituent constant required in the Hammett's rule includes $\sigma_p$ value and $\sigma_m$ value, and these values can be found in many books, and are detailed in, for example, J. A. Dean: Lange's Handbook of Chemistry, 12th ed. (1979), McGraw-Hill, and Area of Chemistry, Extra Issue, No. 122, pp.96-103 (1979), Nankodo.

Generally, oxidation potential can be higher as a chromophore contains highly electronegative atoms besides the above-described substituent groups in a higher amount as constituting atoms. Accordingly, oxidation potential can be higher by using an unsaturated heterocyclic ring rather than an aryl group as the element of the chromophore. The highly electronegative heteroatoms include a nitrogen atom, an oxygen atom and a sulfur atom, among which a nitrogen atom is preferable.

It is therefore preferable that the chromophore in the dye used in the invention comprises heteroatoms or an unsaturated heterocyclic ring or an electron-withdrawing group.

The chromophore comprising heteroatoms is preferably an azo dye, azomethine dye, phthalocyanine dye, etc., among which the azo dye is particularly preferable.

The unsaturated heterocyclic ring is preferably a 5- or 6-memberred unsaturated heterocyclic ring, and examples thereof include a thiophene ring, furan ring, pyrrole ring, thiazole ring, oxazole ring, imidazole ring, isothiazole ring, isoxazole ring, pyrazole ring, thiadiazole ring, oxadiazole ring, triazole ring, pyridine ring, pyridazine ring, pyrimidine ring and pyrazine ring. The unsaturated heterocyclic ring may form a condensed ring with a hydrocarbon ring or a heterocyclic ring. In the case of a nitrogen-containing heterocyclic ring, the nitrogen atom may be quaternarized. The heterocyclic ring which can be a tautomer includes other tautomers even if only one tautomer is mentioned. Preferable among the above-mentioned rings are a thiazole ring, isothiazole ring, pyrazole ring, thiadiazole ring, pyridine ring, pyrimidine ring and pyrazine ring. Particularly preferable are an isothiazole ring, pyrazole ring, 1,2,4-thiadiazole ring, 1,3,4-thiadiazole ring and pyridine ring.

The electron-withdrawing substituent group is preferably a substituent group having a Hammett's $\sigma_p$ value of preferably 0.40 or more, more preferably 0.45 or more, and still more preferably 0.50 or more. When a plurality of electron-withdrawing groups are present as substituent groups on the chromophore, the sum of $\sigma_p$ values of the substituent groups is preferably 0.50 or more, more preferably 0.60 or more, and still more preferably 0.70 or more. Examples of electron-withdrawing groups having a $\sigma_p$ value of 0.40 or more include those described by J. A. Dean: Lange's Handbook of Chemistry, 12th ed. (1979), McGraw-Hill, and Area of Chemistry, Extra Issue, No. 122, pp.96-103 (1979), Nankodo.

The dye preferably used in the invention is a combination of d yes represented by the following general formula (1):

(Ch)—(EWG)$_n$    General Formula (1)

In general formula (1), Ch represents a chromophore containing an unsaturated heterocyclic ring; EWG represents an electron-withdrawing group of a $\sigma_p$ value of 0.40 or more; and n is an integer from 1 to 8.

Ch represents a chromophore such as an azo dye, phthalocyanine dye, azomethine dye, quinone dye (anthraquinone dye, anthrapyridone dye, etc.), carbonium dye (triphenyl methane dye, xanthene dye, acridine dye, etc.) and azine dye (oxazine, thiazine, etc.), each of which have an unsaturated heterocyclic ring in the chromophore. The dye is preferably an azo dye, phthalocyanine dye, azomethine dye and anthrapyridone dye having an unsaturated heterocyclic ring in the chromophore, particularly preferably an azo dye and phthalocyanine dye having an unsaturated heterocyclic ring in the chromophore.

The azo dye which can be used as magenta and yellow dyes is represented by the following general formula (2):

Het(A)—N=N—Het(B)    General Formula (2)

In general formula (2), Het(A) and Het(B) each represent a 5- or 6-memberred unsaturated heterocyclic ring. Examples of the unsaturated heterocyclic ring represented by Het(A) and Het(B) include a thiophene ring, furan ring, pyrrole ring, thiazole ring, oxazole ring, imidazole ring, isothiazole ring, isoxazole ring, pyrazole ring, thiadiazole ring, oxadiazole ring, triazole ring, pyridine ring, pyridazine ring, pyrimidine ring and pyrazine ring. These unsaturated heterocyclic rings may further have substituent groups. The substituent groups on the unsaturated heterocyclic rings may be mutually bonded to form a hydrocarbon ring or a condensed ring with a heterocyclic ring, and the condensed ring may further have a substituent group. In the case of a nitrogen-containing heterocyclic ring, the nitrogen atom may be quaternarized. The heterocyclic ring which can be a tautomer includes other tautomers even if only one tautomer is mentioned.

When the dye is a water-soluble dye, it preferably has an additional ionic hydrophilic group as a substituent group. The ionic hydrophilic group as a substituent group includes a sulfo group, carboxyl group, phosphono group and quaternary ammonium group.

The heterocyclic ring represented by Het(A) and Het(B) is preferably a thiazole ring, isothiazole ring, pyrazole ring, thiadiazole ring, pyridine ring or pyrazine ring. The heterocyclic ring is more preferably an isothiazole ring, pyrazole ring, thiadiazole ring or pyridine ring. The heterocyclic ring is still more preferably a pyrazole ring, 1,2,4-thiadiazole ring or pyridine ring.

Het(A) and Het(B) may have a substituent group. Examples of the substituent group include a halogen atom, alkyl group (including a cycloalkyl group), alkenyl group (including a cycloalkenyl group), alkynyl group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group (including an anilino group), acylamino group, aminocarbonylamino group, alkoxycarbonylamino group, aryloxycarbonylamino group, sulfamoylamino group, alkyl or aryl sulfonylamino group, mercapto group, alkylthio group, arylthio group, heterocyclic thio group, sulfamoyl group, sulfo group, alkyl or aryl sulfinyl group, alkyl or aryl sulfonyl group, acyl group, aryloxycarbonyl group, alkoxycarbonyl group, carbamoyl group, aryl and heterocyclic azo group, imido group, phosphino group, phosphono group, phosphinyl group, phosphinyloxy group, phosphinylamino group and silyl group.

Among these, preferable examples include substituent groups such as a halogen atom, heterocyclic group, cyano group, nitro group, carboxyl group, acyloxy group, carbamoyloxy group, alkoxycarbonyloxy group, aryloxycarbonyloxy, sulfamoyl group, sulfo group, alkyl or aryl sulfinyl group, alkyl or aryl sulfonyl group, acyl group, aryloxycarbonyl group, alkoxycarbonyl group, carbamoyl group, imido group, phosphoryl group, phosphono group, phosphinoyl group, phopsphonyl group, phosphinoyloxy group and phosphinoylamino group, among which electron-withdrawing groups are more preferable, and substituent groups having a $\sigma_p$ value of 0.40 or more are particularly preferable. The substituent groups having a $\sigma_p$ value of 0.40 or more include a cyano group, nitro group, carboxyl group, sulfamoyl group, alkyl or aryl sulfinyl group, alkyl or aryl sulfonyl group, acyl group, aryloxycarbonyl group, alkoxycarbonyl group, carbamoyl group, imido group, phosphono group, phosphoryl group, electron-withdrawing group-substituted alkyl group (trihalomethyl group, perfluoroalkyl group, dicyanomethyl group, iminomethyl group, etc.), electron-withdrawing group-substituted alkenyl group (tricyanovinyl group, etc.), and quaternary salt-substituted group (sulfonium group, ammonium group and phosphonium group). The above functional groups having a hydrogen atom may be substituted with the above-described substituent group in place of the hydrogen atom. Examples of such substituent groups include an alkylcarbonylaminosulfonyl group, arylcarbonylaminosulfonyl group, alkylsulfonylaminocarbonyl group and arylsulfonylaminocarbonyl group.

The substituent groups on the heterocyclic ring may be mutually bonded to form a condensed ring with the heterocyclic ring, and the condensed ring may further have a substituent group.

Preferably, the magenta dye is represented by the following general formula (M-I):

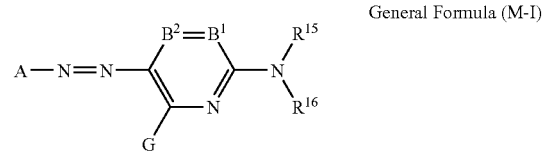

General Formula (M-I)

In the general formula (M-I), A represents a 5-memberred heterocyclic diazo component A—NH$_2$ residue. B$^1$ and B$^2$ each represent —CR$^{11}$= and —CR$^{12}$=, or one of B$^1$ and B$^2$ represents a nitrogen atom and the other represents —CR$^{11}$= and —CR$^{12}$=. R$^{15}$ and R$^{16}$ each independently represent a hydrogen atom, aliphatic group, aromatic group, heterocyclic group, acyl group, alkoxycarbonyl group, aryloxycarbonyl group, carbamoyl group, alkyl or aryl sulfonyl group, or sulfamoyl group, each of which may have a substituent group.

G, R$^{11}$ and R$^{12}$ each independently represent a hydrogen atom, halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group (including a heterocyclic amino group, anilino group), acylamino group, ureido group, sulfamoylamino group, alkoxycarbonylamino group, aryloxycarbonylamino group, alkyl or aryl sulfonylamino group, heterocyclic sulfonylamino group, nitro group, alkyl or aryl thio group, alkyl or aryl sulfonyl group, heterocyclic sulfonyl group, alkyl or aryl sulfinyl group, heterocyclic sulfinyl group, sulfamoyl group, sulfo group, or heterocyclic thio group, each of which may further be substituted. R$^{11}$ and R$^{15}$, or R$^{15}$ and R$^{16}$, may be bonded to form a 5- or 6-memberred ring.

In the general formula (M-I), A represents a 5-memberred heterocyclic diazo component A—NH$_2$ residue. Examples of heteroatoms on the heterocyclic ring include N, O and S. It is preferably a nitrogen-containing 5-memberred heterocyclic ring with which an aliphatic group, aromatic ring or other heterocyclic ring may be condensed. Preferable examples of the heterocyclic group represented by A include a pyrazole ring, imidazole ring, thiazole ring, isothiazole ring, thiadiazole ring, benzothiazole ring, benzoxazole ring and benzoisothiazole ring. Each heterocyclic group may further have a substituent group. In particular, the pyrazole ring, imidazole ring, isothiazole ring, thiadiazole ring and benzothiazole ring represented by the following general formulae (a) to (f) are preferable.

(a)

-continued

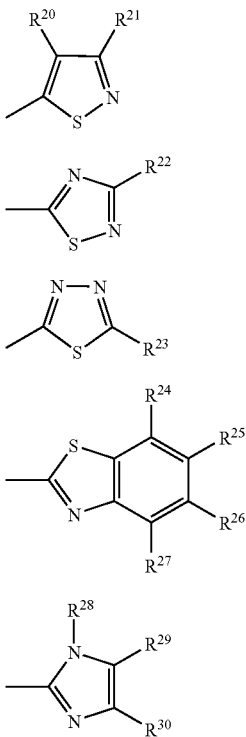

In the general formulae (a) to (f), $R^{17}$ to $R^{30}$ each represent the same substituent groups as those described in G, $R^{11}$ and $R^{12}$. Among those of the general formulae (a) to (f), the pyrazole ring and isothiazole ring represented by the general formulae (a) and (b) are preferable, and the pyrazole ring represented by the general formula (a) is most preferable.

In the general formula (M-I), $B^1$ and $B^2$ each represent —$CR^{11}$= and —$CR^{12}$=; or alternatively one of $B^1$ and $B^2$ represents a nitrogen atom and the other represents —$CR^{11}$= or —$CR^{12}$=. It is more preferable $B^1$ and $B^2$ each represent —$CR^{11}$= and —$CR^{12}$=.

$R^{15}$ and $R^{16}$ each independently represent a hydrogen atom, aliphatic group, aromatic group, heterocyclic group, acyl group, alkoxycarbonyl group, aryloxycarbonyl group, carbamoyl group, alkyl or aryl sulfonyl group, or sulfamoyl group, each of which may have a substituent group. Preferable examples of the substituent group represented by $R^{15}$ and $R^{16}$ include a hydrogen atom, aliphatic group, aromatic group, heterocyclic group, acyl group, and alkyl or aryl sulfonyl group. The substituent group is more preferably a hydrogen atom, aromatic group, heterocyclic group, acyl group, or alkyl or aryl sulfonyl group. The substituent group is most preferably a hydrogen atom, aryl group or heterocyclic group. Each group may further have a substituent group. However, $R^{15}$ and $R^{16}$ cannot simultaneously be hydrogen atoms.

G, $R^{11}$ and $R^{12}$ each independently represent a hydrogen atom, halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group (including an anilino group, heterocyclic amino group), acylamino group, ureido group, sulfamoylamino group, alkoxycarbonylamino group, aryloxycarbonylamino group, alkyl or aryl sulfonylamino group, heterocyclic sulfonylamino group, nitro group, alkyl or aryl thio group, heterocyclic thio group, alkyl or aryl sulfonyl group, heterocyclic sulfonyl group, alkyl or aryl sulfinyl group, heterocyclic sulfinyl group, sulfamoyl group, or sulfo group, each of which may further be substituted.

The substituent group represented by G is preferably a hydrogen atom, halogen atom, aliphatic group, aromatic group, hydroxy group, alkoxy group, aryloxy group, acyloxy group, heterocyclic oxy group, amino group (including an anilino group, heterocyclic amino group), acylamino group, ureido group, sulfamoylamino group, alkoxycarbonylamino group, aryloxycarbonylamino group, alkyl or aryl thio group or heterocyclic thio group, and more preferably a hydrogen atom, halogen atom, alkyl group, hydroxy group, alkoxy group, aryloxy group, acyloxy group, amino group (including an anilino group, heterocyclic amino group) or acylamino group, most preferably a hydrogen atom, anilino group or acylamino group. Each group may further have a substituent group.

Preferable examples of the substituent group represented by $R^{11}$ and $R^{12}$ include a hydrogen atom, alkyl group, halogen atom, alkoxycarbonyl group, carboxyl group, carbamoyl group, hydroxy group, alkoxy group and cyano group. Each group may further have a substituent group. $R^{11}$ and $R^{15}$, or $R^{15}$ and $R^{16}$, may be bonded to form a 5- or 6-memberred ring.

When each substituent group represented by A, $R^{11}$, $R^{12}$, $R^{15}$, $R^{16}$ or G has a substituent group, the substituent group includes the substituent groups mentioned above in G, $R^{11}$ and $R^{12}$.

When the dye in the invention is a water-soluble dye, it preferably has an ionic hydrophilic group as a substituent group at any position on A, $R^{11}$, $R^{12}$, $R^{15}$, $R^{16}$ or G. Examples of the ionic hydrophilic group as a substituent group include a sulfo group, carboxyl group, phosphono group and quaternary ammonium group. The ionic hydrophilic group is preferably a carboxyl group, phosphono group or sulfo group, and more preferably a carboxyl group or sulfo group. The carboxyl group, phosphono group and sulfo group may be in a salt form, and examples of salt-forming counter ions include ammonium ion, alkali metal ion (for example, lithium ion, sodium ion and potassium ion) and organic cation (for example, tetramethyl ammonium ion, tetramethyl guanidium ion and tetramethyl phosphonium).

In the present specification, the aliphatic group means an alkyl group, substituted alkyl group, alkenyl group, substituted alkenyl group, alkynyl group, substituted alkynyl group, aralkyl group and substituted aralkyl group. The aliphatic group may be branched or may form a ring. The number of carbon atoms in the aliphatic group is preferably 1 to 20, and more preferably 1 to 16. The aryl moiety of the aralkyl or substituted aralkyl group is preferably phenyl or naphthyl, and more preferably phenyl. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl group, benzyl group, 2-phenethyl group, vinyl group and allyl group.

In the present specification, the aromatic group refers to an aryl group and substituted aryl group. The aryl group is preferably phenyl or naphthyl, and more preferably phenyl. The number of carbon groups in the aromatic group is preferably 6 to 20, and more preferably 6 to 16. Preferable examples of the aromatic group include phenyl, p-tolyl, p-methoxyphenyl, o-chlorophenyl and m-(3-sulfopropylamino)phenyl.

The heterocyclic group includes a heterocyclic group having a substituent group and an unsubstituted heterocyclic group. The heterocyclic group may be condensed with an aliphatic group, aromatic ring or another heterocyclic ring. The heterocyclic group is preferably a 5- or 6-membered heterocyclic group. Examples of the substituent group includes an aliphatic group, halogen atom, alkyl or aryl sulfonyl group, acyl group, acylamino group, sulfamoyl group, carbamoyl group and ionic hydrophilic group. Examples of the heterocyclic group include a 2-pyridyl group, 2-thienyl group, 2-thiazolyl group, 2-benzothiazolyl group, 2-benzoxazolyl group and 2-furyl group.

The alkyl or aryl sulfonyl group includes an alkyl or aryl sulfonyl group having a substituent group and an unsubstituted alkyl or aryl sulfonyl group. Examples of the alkyl or aryl sulfonyl group include a methylsulfonyl group and phenylsulfonyl group.

The alkyl or aryl sulfinyl group includes an alkyl or aryl sulfinyl group having a substituent group and an unsubstituted alkyl or aryl sulfinyl group. Examples of the alkyl or aryl sulfinyl group include a methylsulfinyl group and phenylsulfinyl group.

The acyl group includes an acyl group having a substituent group and an unsubstituted acryl group. The acyl group is preferably a $C_{1-20}$ acyl group. Examples of the substituent group include an ionic hydrophilic group. Examples of the acyl group include an acetyl group and benzoyl group.

The halogen atom includes a fluorine atom, chlorine atom and bromine atom.

The amino group includes amino groups substituted with an alkyl group, aryl group or heterocyclic group, and the alkyl group, aryl group and heterocyclic group may further have substituent groups. The alkylamino group is preferably a $C_{1-20}$ alkylamino group. Examples of the substituent group include an ionic hydrophilic group. Examples of the alkylamino group include a methylamino group and diethylamino group.

The arylamino group includes an arylamino group having a substituent group and an unsubstituted arylamino group. The arylamino group is preferably a $C_{6-20}$ arylamino group. Examples of the substituent group include a halogen atom and ionic hydrophilic group. Examples of the arylamino group include a phenylamino group and 2-chlorophenylamimo group.

The heterocyclic amino group includes a heterocyclic amino group having a substituent group and an unsubstituted heterocyclic amino group. The heterocyclic amino group is preferably a $C_{2-20}$ heterocyclic amino group. Examples of the substituent group include an alkyl group, halogen atom and ionic hydrophilic group.

The alkoxy group includes an alkoxy group having a substituent group and an unsubstituted alkoxy group. The alkoxy group is preferably a $C_{1-20}$ alkoxy group. Examples of the substituent group include an alkoxy group, hydroxyl group and ionic hydrophilic group. Examples of the alkoxy group include a methoxy group, ethoxy group, isopropoxy group, methoxyethoxy group, hydroxyethoxy group and 3-carboxypropoxy group.

The aryloxy group includes an aryloxy group having a substituent group and an unsubstituted aryloxy group. The aryloxy group is preferably a $C_{6-20}$ aryloxy group. Examples of the substituent group include an alkoxy group and ionic hydrophilic group. Examples of the aryloxy group include a phenoxy group, p-methoxyphenoxy group and o-methoxyphenoxy group.

The silyloxy group includes a silyloxy group substituted with a $C_{1-20}$ aliphatic group or an aromatic group. Examples of the silyloxy group include a trimethylsilyloxy and diphenylmethylsilyloxy.

The heterocyclic oxy group includes a heterocyclic oxy group having a substituent group and an unsubstituted heterocyclic oxy group. The heterocyclic oxy group is preferably a $C_{2-20}$ heterocyclic oxy group. Examples of the substituent group include an alkyl group, alkoxy group and ionic hydrophilic group. Examples of the heterocyclic oxy group include a 3-pyridyloxy group and 3-thienyloxy group.

The alkoxycarbonyloxy group includes an alkoxycarbonyloxy group having a substituent group and an unsubstituted alkoxycarbonyloxy group. The alkoxycarbonyloxy group is preferably an $C_{2-20}$ alkoxycarbonyloxy group. Examples of the alkoxycarbonyloxy group include a methoxycarbonyloxy group and isopropoxycarbonyloxy group.

The aryloxycarbonyloxy group includes an aryloxycarbonyloxy group having a substituent group and an unsubstituted aryloxycarbonyloxy group. The aryloxycarbonyloxy group is preferably a $C_{7-20}$ aryloxycarbonyloxy group. Examples of the aryloxycarbonyloxy group include a phenoxycarbonyloxy group.

The acylamino group includes an acylamino group having a substituent group and an unsubstituted acylamino group. The acylamino group is preferably a $C_{2-20}$ acylamino group. Examples of the substituent group include an ionic hydrophilic group. Examples of the acylamino group include an acetylamino group, propionylamino group, benzoylamino group, N-phenylacetylamino and 3,5-disulfobenzoylamino group.

The ureido group includes an ureido group having a substituent group and an unsubstituted ureido group. The ureido group is preferably a $C_{1-20}$ ureido group. Examples of the substituent group include an alkyl group and aryl group. Examples of the ureido group include a 3-methylureido group, 3,3-dimethylureido group and 3-phenylureido group.

The sulfamoylamino group includes a sulfamoylamino group having a substituent group and an unsubstituted sulfamoylamino group. Examples of the substituent group include an alkyl group. Examples of the sulfamoylamino group include an N,N-dipropylsulfamoylamino group.

The alkoxycarbonylamino group includes an alkoxycarbonylamino group having a substituent group and an unsubstituted alkoxycarbonylamino group. The alkoxycarbonylamino group is preferably a $C_{2-20}$ alkoxycarbonylamino group. Examples of the substituent group include an ionic hydrophilic group. Examples of the alkoxycarbonylamino group include an ethoxycarbonylamino group.

The alkyl or aryl sulfonylamino group includes an alkyl or aryl sulfonylamino group having a substituent group and an unsubstituted alkyl or aryl sulfonylamino group. The sulfonylamino group is preferably a $C_{1-20}$ sulfonylamino group. Examples of the substituent group include an ionic hydrophilic group. Examples of the sulfonylamino group include a methylsulfonylamino group, N-phenyl-methylsulfonylamino group, phenylsulfonylamino group, and 3-carboxyphenylsulfonylamino group.

The carbamoyl group includes a carbamoyl group having a substituent group and an unsubstituted carbamoyl group. Examples of the substituent group include an alkyl group. Examples of the carbamoyl group include a methylcarbamoyl group and dimethylcarbamoyl group.

The sulfamoyl group includes a sulfamoyl group having a substituent group and an unsubstituted sulfamoyl group. Examples of the substituent group include an alkyl group. Examples of the sulfamoyl group include a dimethylsulfamoyl group and di-(2-hydroxyethyl)sulfamoyl group.

The alkoxycarbonyl group includes an alkoxycarbonyl group having a substituent group and an unsubstituted alkoxycarbonyl group. The alkoxycarbonyl group is preferably a $C_{2-20}$ alkoxycarbonyl group. Examples of the substituent group include an ionic hydrophilic group. Examples of the alkoxycarbonyl group include a methoxycarbonyl group and ethoxycarbonyl group.

The acyloxy group includes an acyloxy group having a substituent group and an unsubstituted acyloxy group. The acyloxy group is preferably a $C_{1-20}$ acyloxy group. Examples of the substituent group include an ionic hydrophilic group. Examples of the acyloxy group include an acetoxy group and benzoyloxy group.

The carbamoyloxy group includes a carbamoyloxy group having a substituent group and an unsubstituted carbamoyloxy group. Examples of the substituent group include an alkyl group. Examples of the carbamoyloxy group include an N-methylcarbamoyloxy group.

The aryloxycarbonyl group includes an aryloxycarbonyl group having a substituent group and an unsubstituted aryloxycarbonyl group. The aryloxycarbonyl group is preferably a $C_{7-20}$ aryloxycarbonyl group. Examples of the substituent group include an ionic hydrophilic group. Examples of the aryloxycarbonyl group include a phenoxycarbonyl group.

The aryloxycarbonylamino group includes an aryloxycarbonylamino group having a substituent group and an unsubstituted aryloxycarbonylamino group. The aryloxycarbonylamino group is preferably a $C_{7-20}$ aryloxycarbonylamino group. Examples of the substituent group include an ionic hydrophilic group. Examples of the aryloxycarbonylamino group include a phenoxycarbonylamino group.

The alkyl, aryl or heterocyclic thio group includes an alkyl, aryl or heterocyclic thio group having a substituent group and an unsubstituted alkyl, aryl or heterocyclic thio group. The alkyl, aryl or heterocyclic thio group is preferably the one having 1 to 20 carbon atoms. Examples of the substituent group include an ionic hydrophilic group. Examples of the alkyl, aryl or heterocyclic thio group include a methylthio group, phenylthio group and 2-pyridylthio group.

In the invention, the dye represented by the general formula (M-I) is preferably a dye represented by the following general formula (M-II):

General Formula (M-II)

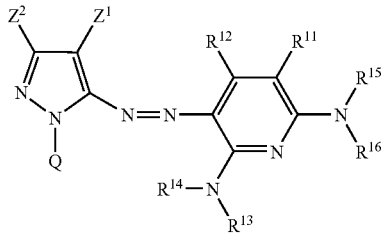

In the general formula (M-II), $z^1$ represents an electron-withdrawing group having a Hammett's substituent constant $\sigma_p$ value of 0.20 or more. $Z^1$ is preferably an electron-withdrawing group having a $\sigma_p$ value of 0.30 or more, more preferably an electron-withdrawing group having a $\sigma_p$ value of 0.45 or more, and still more preferably an electron-withdrawing group having a $\sigma_p$ value of 0.60 or more, provided that the $\sigma_p$ value is desirably not higher than 1.0. Preferable examples of the substituent group include electron-withdrawing substituent groups described later; in particular, $Z^1$ is preferably a $C_{2-20}$ acyl group, $C_{2-20}$ alkyloxycarbonyl group, nitro group, cyano group, $C_{1-20}$ alkylsulfonyl group, $C_{6-20}$ arylsulfonyl group, $C_{1-20}$ carbamoyl group or $C_{1-20}$ halogenated alkyl group, more preferably a cyano group, $C_{1-20}$ alkylsulfonyl group or $C_{6-20}$ arylsulfonyl group, and most preferably a cyano group.

$R^{11}$, $R^{12}$, $R^{15}$ and $R^{16}$ have the same meanings as defined in the general formula (M-I). $R^{13}$ and $R^{14}$ each independently represent a hydrogen atom, aliphatic group, aromatic group, heterocyclic group, acyl group, alkoxycarbonyl group, aryloxycarbonyl group, carbamoyl group, alkyl or aryl sulfonyl group, or sulfamoyl group. In particular, a hydrogen atom, aromatic group, heterocyclic group, acyl group, and alkyl or aryl sulfonyl group are preferable, and a hydrogen atom, aromatic group and heterocyclic group are particularly preferable. $Z^2$ represents a hydrogen atom, aliphatic group, aromatic group or heterocyclic group. Q represents a hydrogen atom, aliphatic group, aromatic group or heterocyclic group. In particular, Q is preferably a group consisting of non-metal atoms necessary for forming a 5- to 8-membered ring. The 5- to 8-membered ring may be substituted, may be a saturated ring or may have an unsaturated bond. In particular, the 5- to 8-membered ring is preferably an aromatic group or heterocyclic group. The non-metal atom is preferably a nitrogen atom, oxygen atom, sulfur atom or carbon atom. Preferable examples of the 5- to 8-membered ring include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzimidazole ring, oxazole ring, benzoxazole ring, thiazole ring, benzothiazole ring, oxane ring, sulfolane ring and thian ring.

Each group in the general formula (M-II) may further have a substituent group. When each group has a substituent group, the substituent group includes the substituent groups in the general formula (M-I), the groups enumerated in G, $R^{11}$ and $R^{12}$, and ionic hydrophilic groups.

The electron-withdrawing group having a Hammett's substituent constant $\sigma_p$ value of 0.60 or more includes a cyano group, nitro group, alkylsulfonyl group (for example a methanesulfonyl group), an arylsulfonyl group (for example a benzenesulfonyl group), etc.

The electron-withdrawing group having a Hammett's substituent constant $\sigma_p$ value of 0.45 or more includes those described above and an acyl group (for example an acetyl group), an alkoxycarbonyl group (for example a dodecyloxycarbonyl group), an aryloxycarbonyl group (for example, m-chlorophenoxycarbonyl), an alkylsulfinyl group (for example, n-propylsulfinyl), an arylsulfinyl group (for example phenylsulfinyl group), a sulfamoyl group (for example, N-ethylsulfamoyl group, N,N-dimethylsulfamoyl), a halogenated alkyl group (for example, trifluoromethyl), etc.

The electron-withdrawing group having a Hammett's substituent constant $\sigma_p$ value of 0.30 or more includes those described above and an acyloxy group (for example, acetoxy), a carbamoyl group (for example, N-ethylcarbamoyl, N,N-dibutylcarbamoyl), a halogenated alkoxy group (for example, trifluoromethyloxy), a halogenated aryloxy group (for example, pentafluorophenyloxy), a sulfonyloxy group (for example, a methylsulfonyloxy group), a halogenated alkthio group (for example, difluoromethylthio), an aryl group substituted with two or more electron-withdrawing groups each having a Hammett's substituent constant $\sigma_p$ value of 0.15 or more (for example, 2,4-dinitrophenyl, pentachlorophenyl), and a heterocyclic ring (for example, 2-benzoxazolyl, 2-benzothiazolyl, 1-phenyl-2-benzimidazolyl), etc. The electron-withdrawing group having a Hammett's substituent constant $\sigma_p$ value of 0.20 or more includes those described above and halogen atoms.

In the azo dye represented by the general formula (M-I), the combination of substituent groups $R^{15}$ and $R^{16}$ is particularly preferably a hydrogen atom, alkyl group, aryl group, heterocyclic group, sulfonyl group and acyl group, more preferably a hydrogen group, aryl group, heterocyclic group and sulfonyl group, and most preferably a hydrogen atom, aryl group and heterocyclic group. However, $R^{15}$ and $R^{16}$ cannot simultaneously be hydrogen atoms.

G preferably represents a hydrogen atom, halogen atom, alkyl group, hydroxyl group, amino group or acylamino group, more preferably a hydrogen atom, halogen atom, amino group or acylamino group, and most preferably a hydrogen atom, amino group or acylamino group.

A preferably represents a pyrazole ring, imidazole ring, isothiazole ring, thiadiazole ring or benzothiazole ring, more preferably a pyrazole ring or isothiazole ring, and most preferably a pyrazole ring.

$B^1$ and $B^2$ each represent $-CR^{11}=$ and $-CR^{12}=$, and preferably $R^{11}$ and $R^{12}$ each independently represent a hydrogen atom, alkyl group, halogen atom, cyano group, carbamoyl group, carboxyl group, hydroxy group, alkoxy group or alkoxycarbonyl group, and more preferably a hydrogen atom, alkyl group, carboxyl group, cyano group or carbamoyl group.

The cyan dye is preferably a dye represented by the following general formula (C-I):

General Formula (C-I)

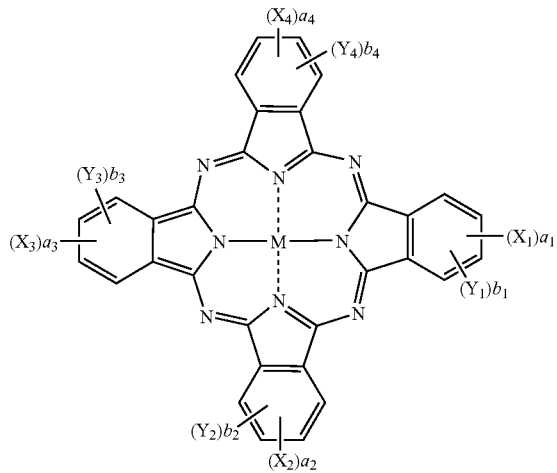

In the general formula (C-I), $X_1$, $X_2$, $X_3$ and $X_4$ each independently represent an electron-withdrawing group having a $\sigma_p$ of 0.40 or more. $Y_1$, $Y_2$, $Y_3$ and $Y_4$ each independently represent a monovalent substituent group. M represents a hydrogen atom, a metal element or an oxide thereof, or a hydroxide or a halide thereof. $a_1$ to $a_4$ and $b_1$ to $b_4$ represent the number of substituent groups $X_1$ to $X_4$ and $Y_1$ to $Y_4$ respectively. $a_1$ to $a_4$ each independently represent an integer from 0 to 4, and $b_1$ to $b_4$ each independently represent an integer from 0 to 4. The sum of $a_1$ to $a_4$ is 2 or more, preferably 3 or more, and most preferably $a_1=a_2=a_3=a_4=1$.

When the dye is a water-soluble dye, the dye preferably has an ionic hydrophilic group as a substituent group at any position on $X_1$, $X_2$, $X_3$, $X_4$, $Y_1$, $Y_2$, $Y_3$ and $Y_4$. The ionic hydrophilic group as a substituent group includes a sulfo group, carboxyl group, phosphono group and quaternary ammonium group.

The phthalocyanine dye represented by the general formula (C-I) is more preferably a phthalocyanine dye whose structure is represented by the following general formula (C-II). The phthalocyanine dye represented by the general formula (C-II) is described in more detail.

General Formula (C-II)

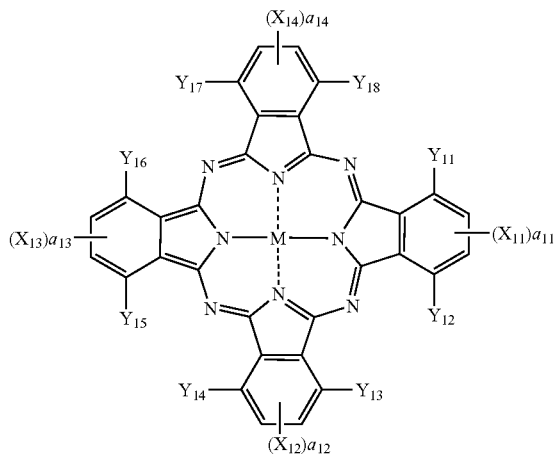

In the general formula (C-II), $X_{11}$ to $X_{14}$ each independently represent $-SO-Z$, $-SO_2-Z$, $-SO_2NR_1R_2$, sulfo group, $-CONR_1R_2$ or $-CO_2R_1$. $Y_{11}$ to $Y_{18}$ each independently represent a monovalent substituent group. M represents a hydrogen atom, a metal atom or its oxide, hydroxide or halide. $a_{11}$ to $a_{14}$ each represent the number of substituent groups $X_{11}$ to $X_{14}$ respectively and independently denote 1 or 2.

Z groups independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

In the general formula (C-II), $a_{11}$ to $a_{14}$ independently denote 1 or 2, particularly preferably $4 \leq a_{11}+a_{12}+a_{13}+a_{14} \leq 6$, and more preferably $a_{11}=a_{12}=a_{13}=a_{14}=1$.

$X_{11}$, $X_{12}$, $X_{13}$ and $X_{14}$ may represent the same substituent group, or $X_{11}$, $X_{12}$, $X_{13}$ and $X_{14}$ may be partially different substituent groups (e.g. $-SO_2-Z$ groups different from one another in the group represented by Z) or different substituent groups such as $-SO_2-Z$ and $-SO_2NR_1R_2$.

The following combination of substituent groups on the phthalocyanine dye represented by the general formula (C-II) is particularly preferable.

$X_{11}$ to $X_{14}$ each independently represent preferably $-SO-Z$, $-SO_2-Z$, $-SO_2NR_1R_2$ or $CONR_1R_2$, more preferably $-SO_2-Z$ or $SO_2NR_1R_2$, and most preferably $-SO_2-Z$.

Preferably, Z groups independently represent a substituted or unsubstituted alkyl group, a substituted or unsubstituted aryl group, or a substituted or unsubstituted heterocyclic group, among which a substituted alkyl group, a substituted aryl group and a substituted heterocyclic group are most preferable. For improving dye solubility and ink stability, Z is substituted preferably with a substituent group containing an asymmetric carbon atom (that is, the dye is used as a racemate). For facilitating association and improving fastness, Z is substituted preferably with a substituent group containing a hydroxyl group, ether group, ester group, cyano group, amido group or sulfonamido group.

Preferably, $R^1$ and $R^2$ each independently represent a hydrogen atom, a substituted or unsubstituted alkyl group, a substituted or unsubstituted aryl group, or a substituted or unsubstituted heterocyclic group, among which a hydrogen atom, a substituted alkyl group, a substituted aryl group and a substituted heterocyclic group are most preferable. It is however not preferable that $R^1$ and $R^2$ are simultaneously hydrogen atoms. For improving dye solubility and ink stability, $R^1$ and $R^2$ are substituted preferably with a substituent group containing an asymmetric carbon atom (that is, the dye is used as a racemate). For facilitating association and improving fastness, $R^1$ and $R^2$ are substituted preferably with a substituent group containing a hydroxyl group, ether group, ester group, cyano group, amido group or sulfonamido group.

Each of $Y_{11}$ to $Y_{18}$ represents preferably a hydrogen atom, halogen atom, alkyl group, aryl group, cyano group, alkoxy group, amido group, ureido group, sulfonamido group, carbamoyl group, sulfamoyl group, alkoxycarbonyl group, carboxyl group or sulfo group, more preferably a hydrogen atom, halogen atom, cyano group, carboxyl group or sulfo group, and most preferably a hydrogen atom. $a_{11}$ to $a_{14}$ each independently represent 1 or 2, and more preferably all of the $a_{11}$ to $a_{14}$ represent 1. M represents a hydrogen atom, a metal element or its oxide, hydroxide or halide, more preferably Cu, Ni, Zn or Al, and most preferably Cu.

When the phthalocyanine dye represented by the above-mentioned (C-I) or (C-II) is water-soluble, it preferably has an ionic hydrophilic group. The ionic hydrophilic group includes a sulfo group, carboxyl group, phosphono group and quaternary ammonium group. The ionic hydrophilic group is preferably a carboxyl group, phosphono group or sulfo group, and more preferably a carboxyl group or sulfo group. The carboxyl group, phosphono group and sulfo group may be in a salt form, and examples of salt-forming counter ions include ammonium ion, alkali metal ion (for example, lithium ion, sodium ion and potassium ion) and organic cation (for example, tetramethyl ammonium ion, tetramethyl guanidiumion and tetramethyl phosphonium). The counter ion is preferably an alkali metal salt, and particularly a lithium salt is preferable for raising dye solubility and improving ink stability.

The number of ionic hydrophilic groups is preferably 2 or more per molecule of the phthalocyanine dye. Particularly the number of sulfo groups and/or carboxyl groups is preferably 2 or more per molecule of the phthalocyanine dye.

The compound represented by the general formula (C-II) is preferably a compound wherein at least one substituent group is a preferable group mentioned above, more preferably a compound wherein two or more substituent groups are preferable groups mentioned above, and most preferably a compound wherein all substituent groups are preferable groups mentioned above.

It is preferable that the phthalocyanine dye preferably used in the invention has a chemical structure wherein at least one electron-withdrawing group such as a sulfinyl group, sulfonyl group and sulfa moyl group is introduced into each of four benzene rings in phthaloc yanine such that the sum of $\sigma_p$ value of such substituent groups in the phthalocyanine skeleton is 1.6 or more.

The phthalocyanine derivative represented by the general formula (C-I) is generally a mixture of analogues which are inevitably different in the substituent groups Xn (n=1 to 4) and Ym (m=1 to 4) and in the number of introduced substituent groups, depending on the synthesis process, and thus a mixture of these analogues is often expressed statistically on average. In the invention, it was found that when a mixture of these analogues is classified into the following 3 types, a specific mixture is particularly preferable. That is, the mixture of the phthalocyanine dye analogues represented by the general formulae (C-I) and (C-II) is classified into the following 3 types depending on the positions of substituent groups.

(1) Derivatives substituted at the β-position: the phthalocyanine dye having specific substituent groups at the 2- and/or 3-positions, 6- and/or 7-positions, 10- and/or 11-positions, and 14- and/or 15-positions.

(2) Derivatives substituted at the α-position: the phthalocyanine dye having specific substituent groups at the 1- and/or 4-positions, 5- and/or 8-positions, 9- and/or 12-positions, and 13- and/or 16-positions.

(3) Derivatives substituted at the α- and β-positions: the phthalocyanine dye having specific substituent groups at random at the 1- to 16-positions.

When the phthalocyanine dye derivatives different in structure (particularly with respect to the positions of substituent groups) are described in the specification, the above-described derivatives substituted at the β-position, derivatives substituted at the α-position and derivatives substituted at the α- and β-positions are used.

The phthalocyanine derivatives used in the invention can be synthesized by a combination of methods described or referred to in Phthalocyanines—Chemistry and Functions—(pp. 1-62) coauthored by Shirai & Kobayashi and published by I.P.C and in Phthalocyanines—Properties and Applications—(pp. 1-54) coauthored by C. C. Leznoff & A. B. P. Lever and published by VCH, or by their analogous methods.

As described in WO 00/17275, WO 00/08103, WO 00/08101, WO 98/41853 and JP-A No. 10-36471, the compounds represented by the general formula (C-I) in the invention can be synthesized, for example, thorough conversion of unsubstituted phthalocyanine compounds into their corresponding sulfonated derivatives, sulfonyl chloride derivatives and amidated derivatives. In this case, sulfonation can occur in any positions of the phthalocyanine nucleus, and regulation of the number of sulfo groups introduced is also difficult. Accordingly, when sulfo groups are introduced under such reaction conditions, the positions and number of sulfo groups introduced into the product cannot be specified, thus inevitably giving a mixture of compounds different in the number and positions of the substituent groups. Accordingly, when such a mixture is used as the starting material to synthesize the compound of the invention, the number and positions of sulfamoyl substituent groups on the heterocyclic ring cannot be specified, and thus the compound of the invention is obtained as a mixture of compounds substituted at the α- and β-positions, containing several kinds of compounds different in the number and positions of the substituent groups.

As described above, when a larger number of electron-withdrawing groups such as sulfamoyl groups are introduced into the phthalocyanine nucleus, oxidation potential is rendered higher, and ozone resistance is increased. According to the synthesis methods described above, the number of electron-withdrawing groups introduced is low, that is, contamination with phthalocyanine dyes poorer in oxidation potential is inevitable. Accordingly, synthesis methods capable of suppressing formation of compounds poorer in oxidation potential are used more preferably in order to improve ozone resistance.

On the other hand, the phthalocyanine compound represented by the general formula (C-II) can be obtained by reacting a phthalonitrile derivative (compound P) of the formula below and/or a diiminoisoindoline derivative (compound Q) with a metal derivative of the general formula (C-III) below. Alternatively, the phthalocyanine compound can be derived from a tetrasulfophthalocyanine compound obtained by reacting a 4-sulfophthalic acid derivative (compound R) of the formula below with a metal derivative of the general formula (C-III) below.

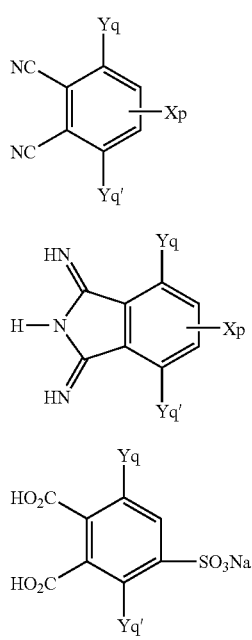

Compound P

Compound Q

Compound R

In each of the formulae, Xp corresponds to $X_{11}$, $X_{12}$, $X_{13}$ or $X_{14}$ in the general formula (C-II), and Yq and Yq' each correspond to $Y_{11}$, $Y_{12}$, $Y_{13}$, $Y_{14}$, $Y_{15}$, $Y_{16}$, $Y_{17}$ or $Y_{18}$ in the general formula (C-II).

M—(Y)$_d$  General formula (C-III):

In the general formula (C-III), M is the same as M in the general formula (C-II), and Y represents a monovalent or divalent ligand such as a halogen atom, acetate anion, acetyl acetonate or oxygen, and d is an integer from 1 to 4.

According to the synthesis method described above, a specific number of desired substituent groups can be introduced. In particular, when a large number of electron-withdrawing groups are to be introduced for increasing oxidation potential as required in the invention, the above synthesis method is very superior to the method of synthesizing the compounds represented by the general formula (C-I).

The thus obtained phthalocyanine compounds represented by the general formula (C-II) are usually a mixture of compounds represented by the general formulae (a)-1 to (a)-4 below, which are isomers with respect to the positions of Xp groups, that is, derivatives substituted at the β-position.

General Formula (a)-1

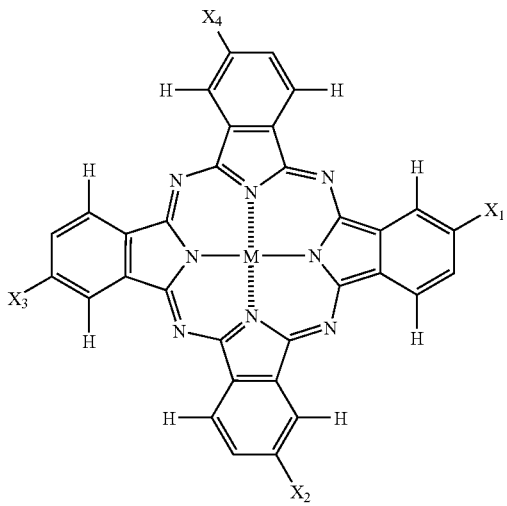

General Formula (a)-2

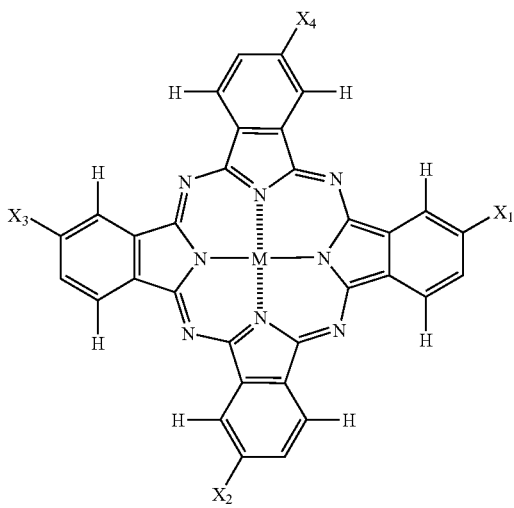

General Formula (a)-3

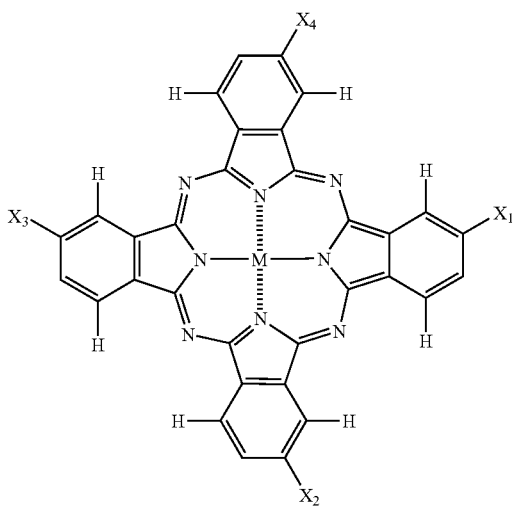

General Formula (a)-4

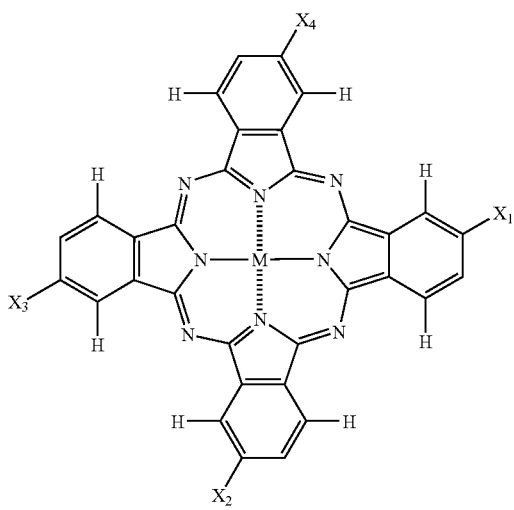

In the method described above, every Xp is the same group, phthalocyanine dyes substituted at the β-position wherein $X_{11}$, $X_{12}$, $X_{13}$ and $X_{14}$ are identical substituent groups can be obtained. On the other hand, when a combination of different groups is used as Xp, a dye having substituent groups which are of the same type but are partially different or a dye having different substituent groups can be synthesized. Among the dyes of the general formula (C-II), the dyes having different electron-withdrawing substituent groups are particularly preferably used to control the solubility and association of the dyes and the stability of ink with time.

In the invention, it is found very important for oxidation potential to be higher than 0.8 V (vs SCE) for improvement of fastness in any substitution types, and the significance of the effect cannot be predicted from the prior art described above. The dyes substituted at the β-position tend to be superior to the dyes substituted at the α- and β-positions in respect of hue, light fastness, and ozone gas resistance, but the reason for this is unrevealed.

The phthalocyanine dyes represented by the general formulae (C-I) and (C-II) can be synthesized according to the above-mentioned patents, and these dyes can be synthesized for example by methods described in JP-A Nos. 2002-302623, 2002-294097, 2002-249677 and 2003-012952. However, the starting materials, dye intermediates and synthesis route are not limited thereto.

The potential oxidation of the magenta dye and/or cyan dye used in the invention is characterized by being higher than 0.8 V (vs SCE). The phthalocyanine widely used as the cyan dye forms an aggregate and can thus achieve fastness even if its oxidation potential is somewhat low. However, on the other hand, the magenta dye does not form an aggregate, and should thus have higher oxidation potential than that of the cyan dye in order to improve fastness.

Hereinafter, preferable examples of the dyes that can be used in the invention are shown. These examples are only intended to specifically describe the invention and should not be construed to limit the invention, The oxidation potential of dye is shown in parentheses.

First, examples of the yellow dye (Y-1 to Y-35) usable in the invention are shown below:

Y-1

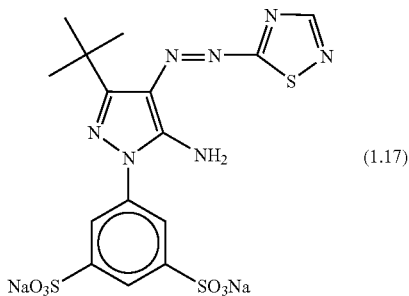

(1.17)

Y-2

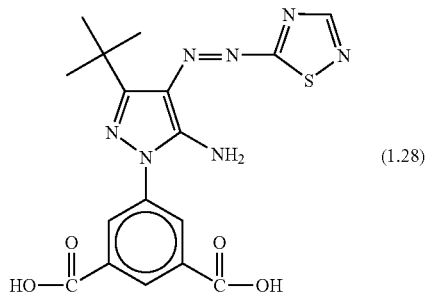

(1.28)

-continued
Y-3
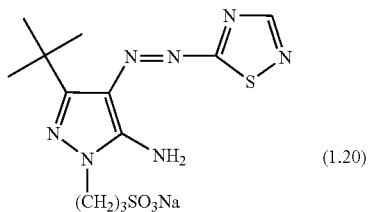
(1.20)
Y-4
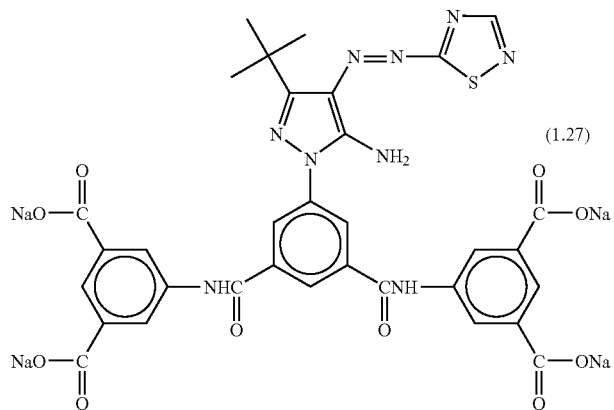
(1.27)
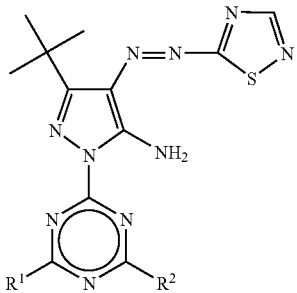
| Compound No. | R[1] | R[2] | Oxidation Potential (V) |
|---|---|---|---|
| Y-5 | 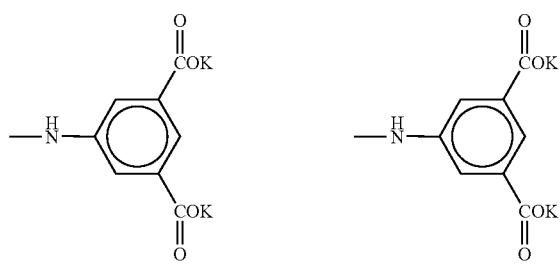 | | 1.37 |
| Y-6 | —NH(CH$_2$)$_2$SO$_3$Li | —NH(CH$_2$)$_2$SO$_3$Li | 1.34 |
| Y-7 | 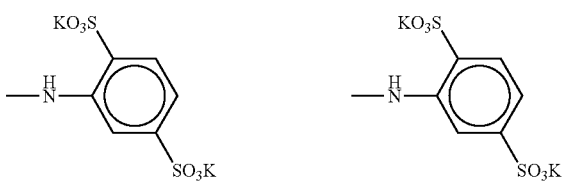 | | 1.35 |

-continued
| | | | |
|---|---|---|---|
| Y-8 | —NH—C₆H₄—SO₃Na | 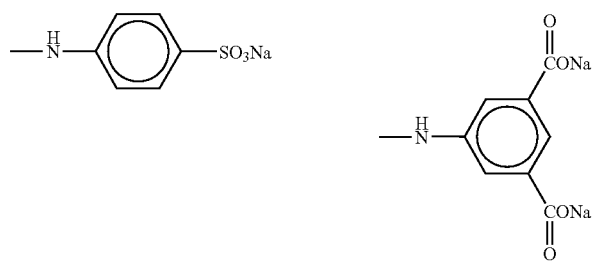 | 1.36 |
| Y-9 | —NH(CH₂)₂SO₃Li | | 1.35 |
| Y-10 | 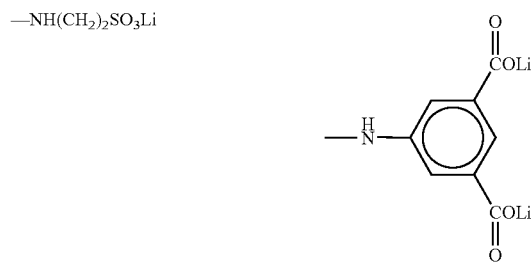 | | 1.39 |
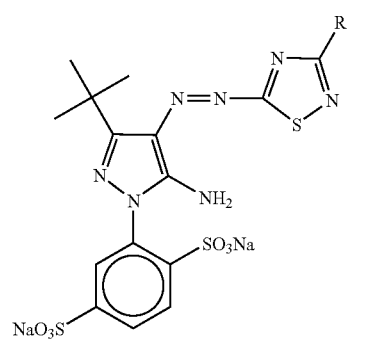
Y-11 R = —S(CH₂)₂SO₃Na (1.20)
Y-12 R = —Me (1.19)
Y-13 R = —H (1.20)
Y-14 R = —Ph (1.18)
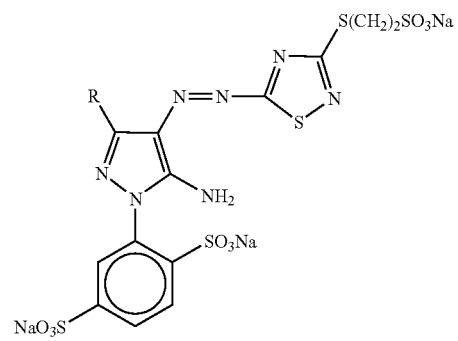
Y-15 R = —Ph (1.16)
Y-16 R = —OC₂H₅ (1.16)

-continued
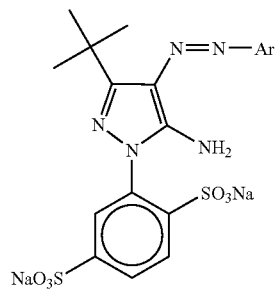
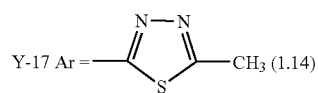
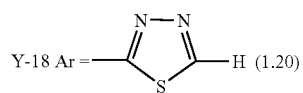
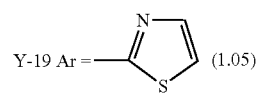
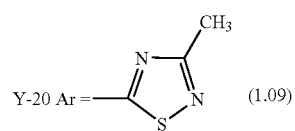
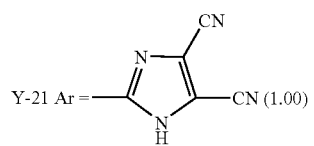
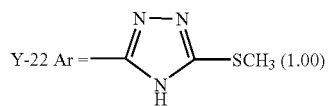

-continued
Y-23
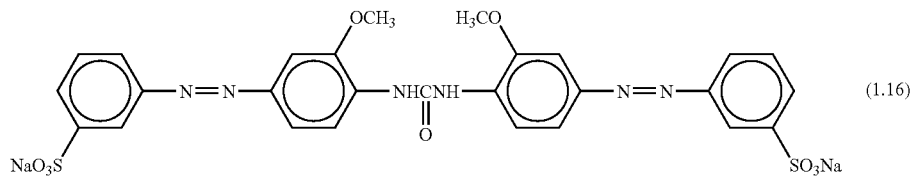
(1.16)
Y-24
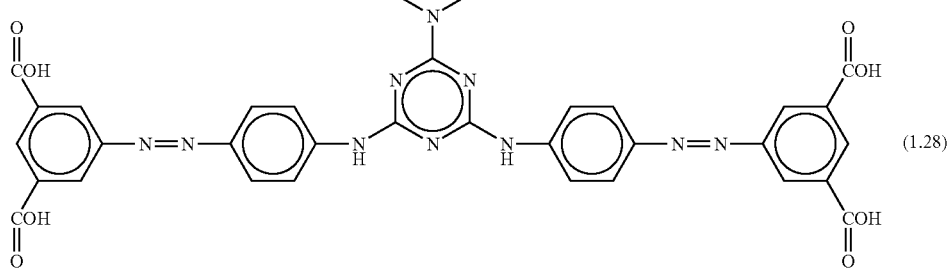
(1.28)
Y-25
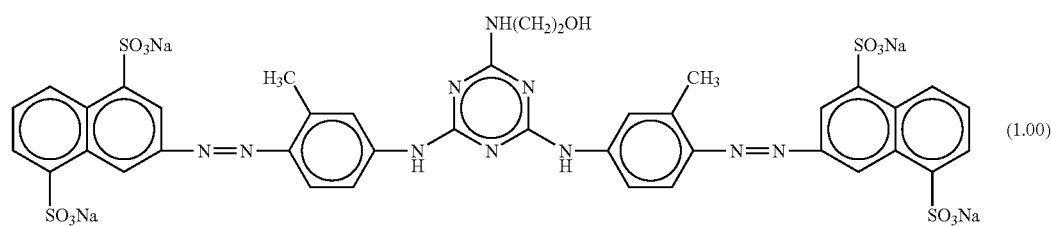
(1.00)
Y-26
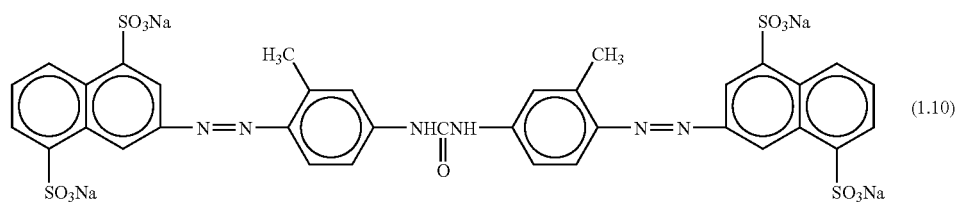
(1.10)

Y-27
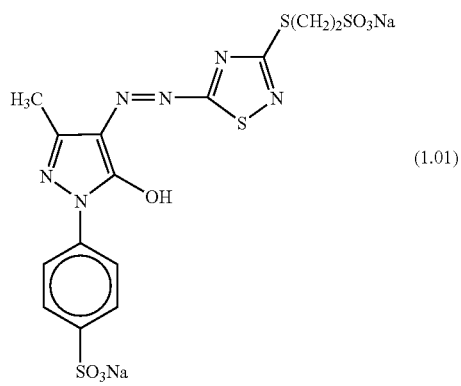
(1.01)
Y-28
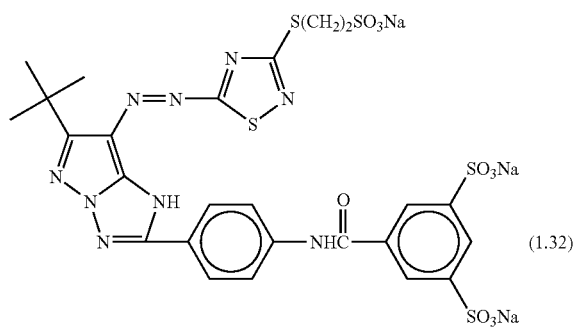
(1.32)
Y-29
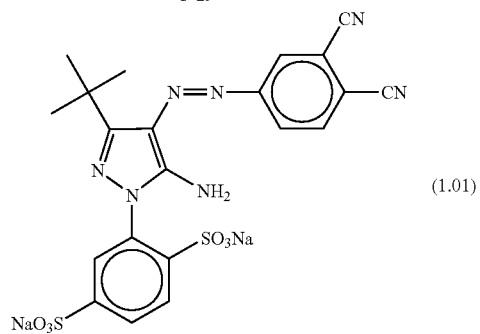
(1.01)
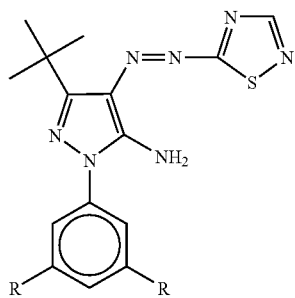
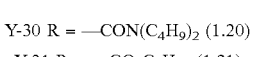
Y-30 R = —CON(C₄H₉)₂ (1.20)
Y-31 R = —CO₂C₈H₁₇ (1.21)

-continued
Y-32
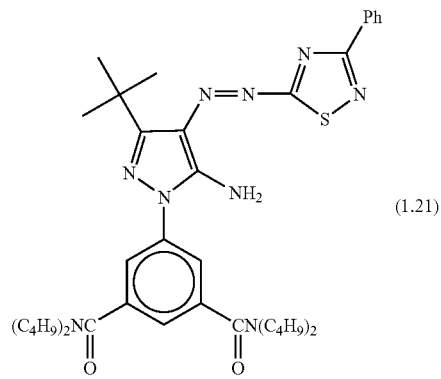
(1.21)
Y-33
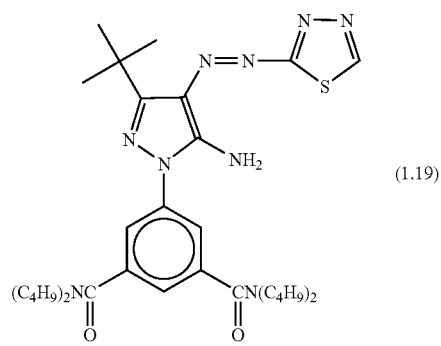
(1.19)
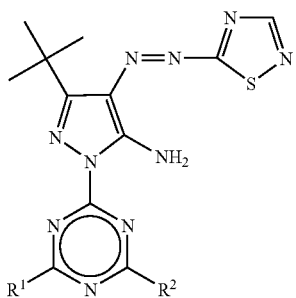
Y-34
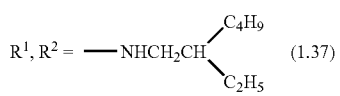
(1.37)
Y-35
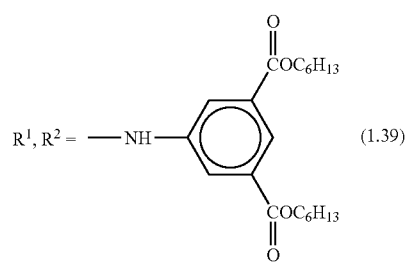
(1.39)

Next, examples (M-1 to M-26) of the magenta dye usable in the invention are shown.
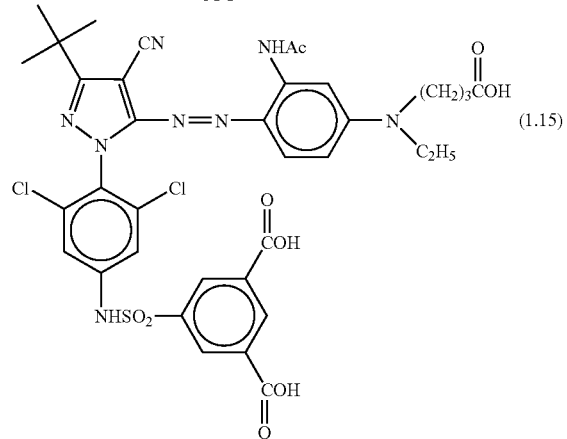
M-1 (1.15)
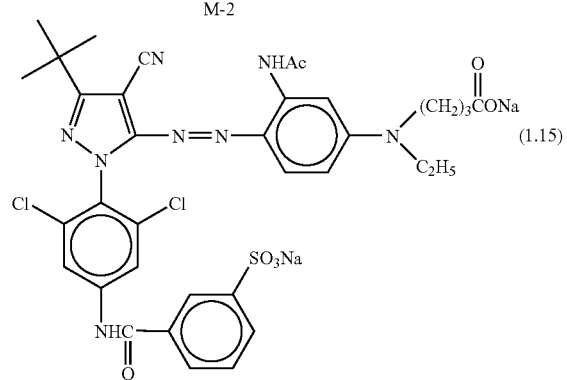
M-2 (1.15)
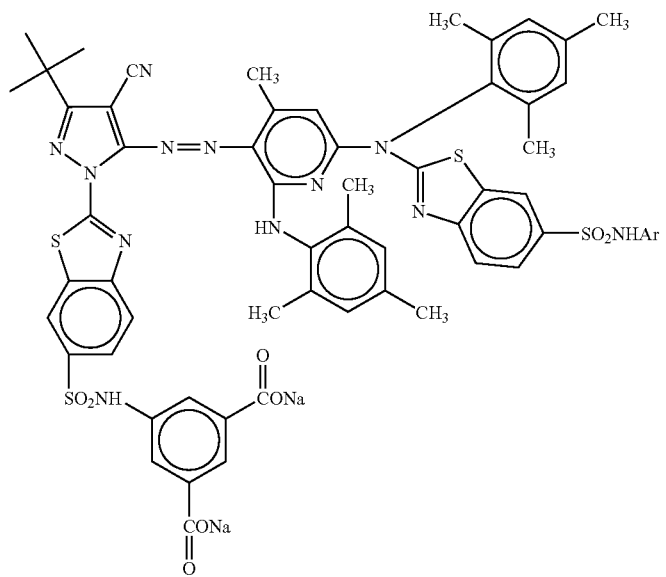

-continued
M-3 Ar = 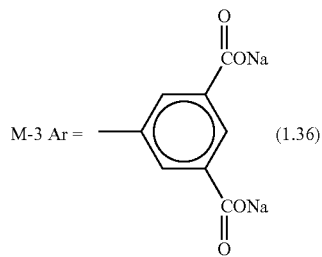 (1.36)
M-4 Ar = 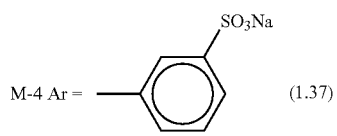 (1.37)
M-5 Ar = 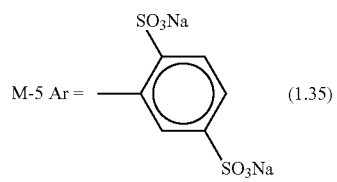 (1.35)
M-6
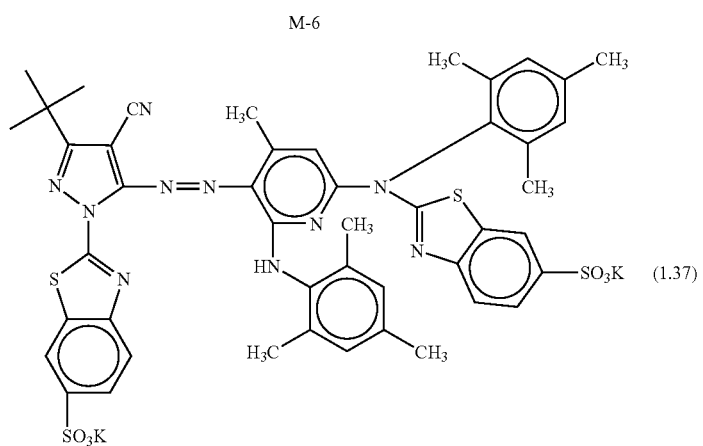 (1.37)
M-7
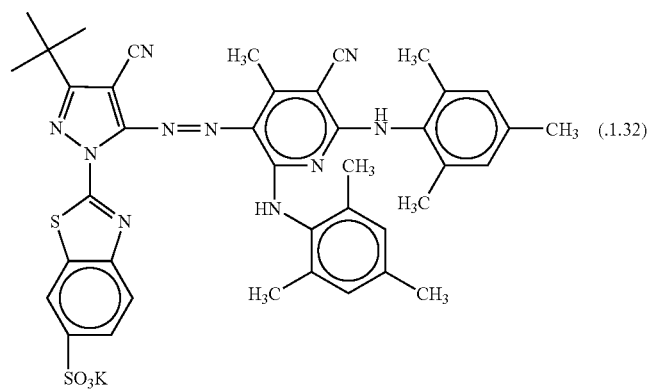 (.1.32)

-continued
M-8
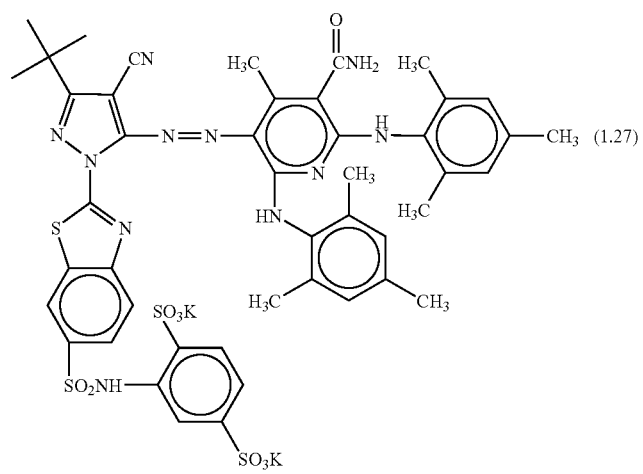
(1.27)
M-9
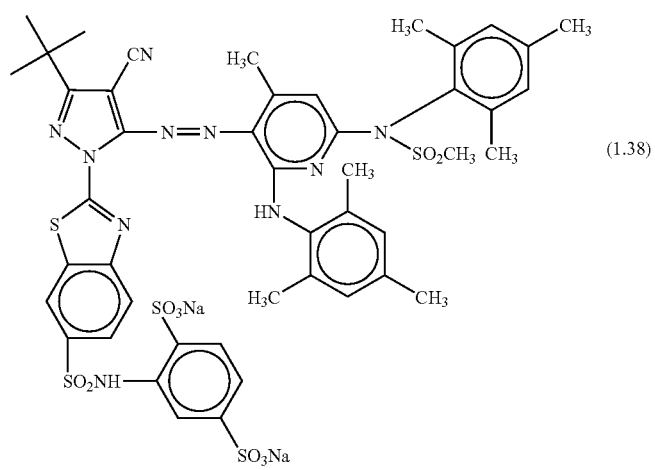
(1.38)
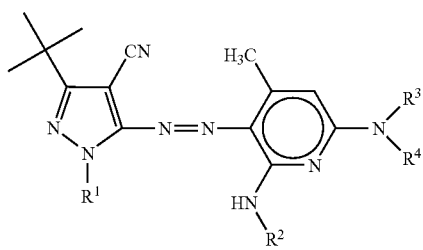
| Compound No. | R¹ | R² | R³ | R⁴ | Oxidation Potential (V) |
|---|---|---|---|---|---|
| M-10 | 2-benzothiazolyl-6-SO₃K | 2,3,5-trimethyl-6-SO₃K-phenyl | 2-benzothiazolyl-6-SO₃K | 2,3,5-trimethyl-6-SO₃K-phenyl | 1.38 |

| | | | | | |
|---|---|---|---|---|---|
| M-11 | (2-methylbenzothiazole-6-SO₃Na) | (2,3-dimethyl-SO₃Na-benzene) | (2-methylbenzothiazole-6-SO₃Na) | (2,3-dimethyl-SO₃Na-benzene) | 1.39 |
| M-12 | (2-methylbenzothiazole) | (3,4,5-trimethyl-SO₃K-benzene) | (2-methylbenzothiazole) | (3,4,5-trimethyl-SO₃K-benzene) | 1.40 |
| M-13 | (6-Cl-2-methylbenzothiazole) | (2-OCH₃-4-methyl-SO₃K-benzene) | (2-methylbenzothiazole-6-SO₃K) | (2-OCH₃-4-methyl-SO₃K-benzene) | 1.39 |
| M-14 | (5-NO₂-2-methylbenzothiazole) | (3,4-dimethyl-SO₃K-benzene) | (2-methylbenzothiazole-6-SO₃K) | (2-OCH₃-4-methyl-SO₃K-benzene) | 1.40 |
| M-15 | (2-methylbenzothiazole) | (2,3,5-trimethyl-SO₃K-benzene) | (2-methylbenzothiazole) | (2,3,5-trimethyl-SO₃K-benzene) | 1.37 |
| M-16 | (2-methylbenzothiazole-6-SO₃Na) | (2,3,5-trimethyl-SO₃Na-benzene) | (2-methylbenzothiazole-6-SO₃Na) | (2,3,5-trimethyl-SO₃Na-benzene) | 1.36 |
| M-17 | (2-methylbenzothiazole) | (3,4-dimethyl-SO₃Li-benzene) | (2-methylbenzothiazole) | (3,4-dimethyl-SO₃Li-benzene) | 1.38 |
| M-18 | (2-methylbenzoxazole) | (2,3,5-trimethyl-SO₃Li-benzene) | (2-methylbenzoxazole) | (2,3,5-trimethyl-SO₃Li-benzene) | 1.35 |
| M-19 | (2-methylbenzoxazole-6-SO₃Li) | (2,3,5-trimethyl-SO₃Li-benzene) | (2-methylbenzoxazole-6-SO₃Li) | (2,3,5-trimethyl-SO₃Li-benzene) | 1.37 |

-continued
| | | | | | |
|---|---|---|---|---|---|
| M-20 | 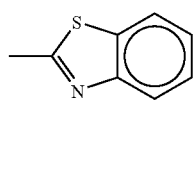 | 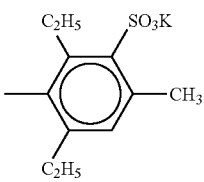 | —SO$_2$CH$_3$ | 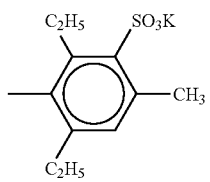 | 1.38 |
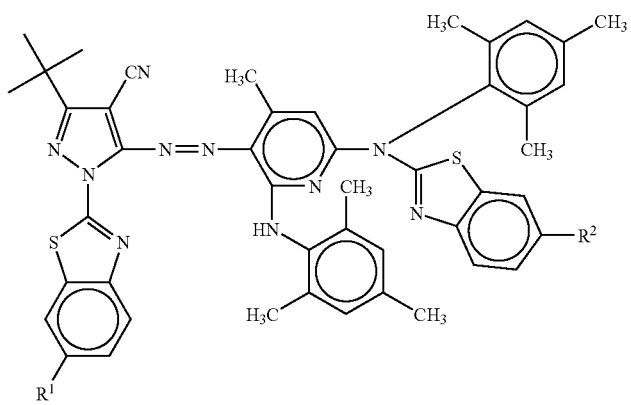
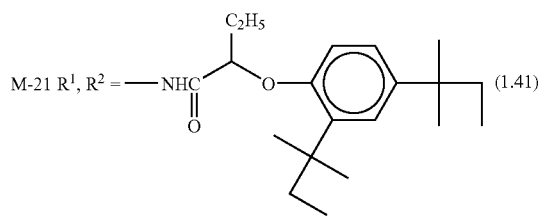
M-21 R$^1$, R$^2$ = (1.41)
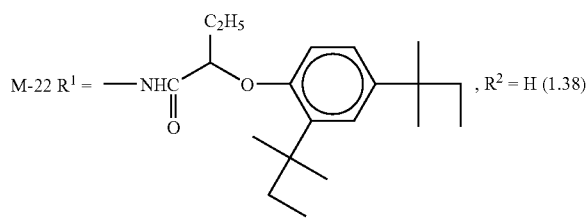
M-22 R$^1$ = , R$^2$ = H (1.38)
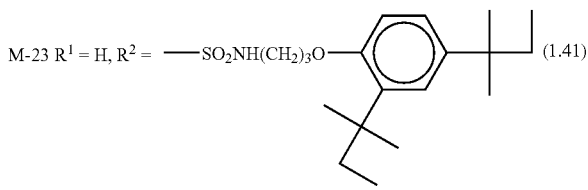
M-23 R$^1$ = H, R$^2$ = —SO$_2$NH(CH$_2$)$_3$O— (1.41)
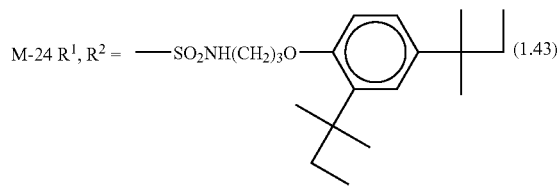
M-24 R$^1$, R$^2$ = —SO$_2$NH(CH$_2$)$_3$O— (1.43)

-continued
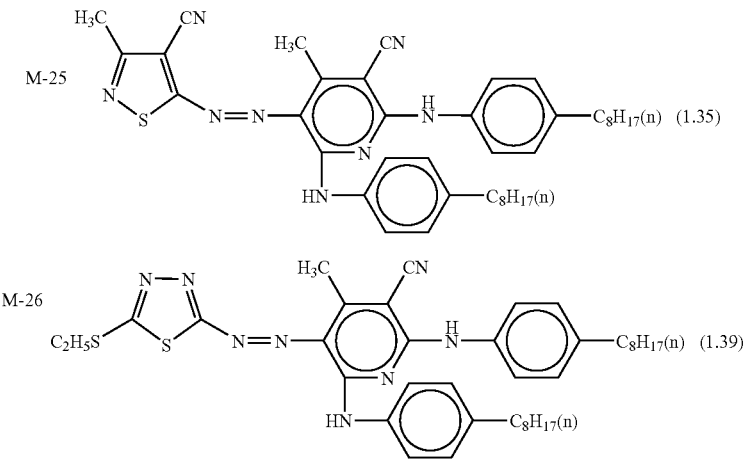
Next, examples (C-1 to C-50) of the cyan dye usable in the invention are shown.
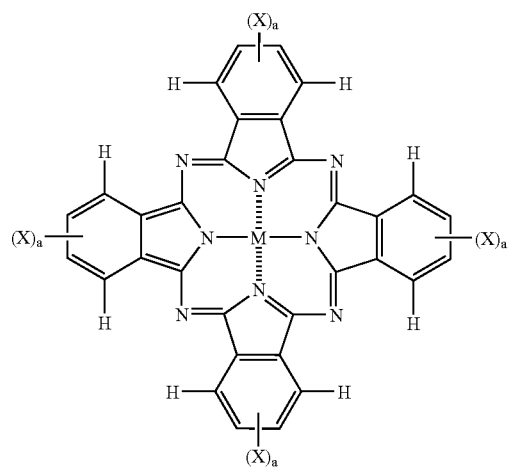
| Compound No. | M | X ($\sigma_p$ value) | a | Oxidation potential (V) |
|---|---|---|---|---|
| C-1 | Cu | —SO$_2$NH—〔phenyl〕—NHCO—〔phenyl〕—SO$_3$Na (0.65) | 1 | 1.24 |
| C-2 | Cu | —SO$_2$N(CH$_3$)—〔phenyl〕—SO$_3$Na (0.65) | 1 | 1.19 |
| C-3 | Cu | —SO$_2$NH—CH$_2$CH$_2$—SO$_3$K (0.65) | 1 | 1.18 |

-continued

| | | | | |
|---|---|---|---|---|
| C-4 | Cu | —SO₂NH−(CH₂)₃−N(CH₂CH₂OH)₂ · HCl (0.65) | 1 | 1.29 |
| C-5 | Cu | —SO₂NH−CH₂CH₂−OC₂H₅ (0.65) | 1 | 1.23 |
| C-6 | Cu | —SO₂NH−(3,5-di-CO₂Na-C₆H₃) (0.65) | 1 | 1.21 |
| C-7 | Cu | —SO₂NH−CH₂CH₂−CO₂K (0.65) | 1 | 1.19 |
| C-8 | Cu | —SO₂(CH₂)₃SO₂NH−C₆H₄−SO₃K (0.77) | 1 | 1.35 |
| C-9 | Cu | —SO₂−(6-SO₃K-benzothiazol-2-yl) (—) | 1 | 1.36 |
| C-10 | Cu | —SO₂−(CH₂)₃−SO₃Na (0.77) | 2 | 1.39 |
| C-11 | Cu | —SO₂−(CH₂)₃−SO₃Li | 1 | 1.29 |
| C-12 | Cu | —SO₂−(CH₂)₃−SO₃K | 1 | 1.29 |
| C-13 | Cu | —SO₂−C₆H₄−O−(CH₂)₄−SO₃K (0.68) | 1 | 1.29 |
| C-14 | Cu | —SO₂−(2-CO₂Na-C₆H₄) (0.68) | 1 | 1.27 |

-continued

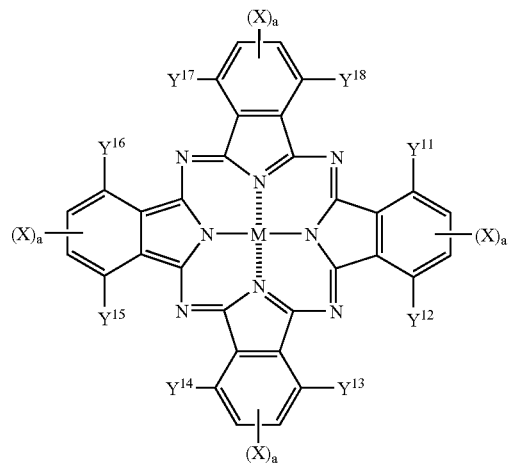

In the table, groups in each parenthesis, that is,
(Y11, Y12), (Y13, Y14), (Y15, Y16) and (Y17, Y18) are not shown in a fixed order.

| Compound No. | M | X ($\sigma_p$ value) | $Y^{11}, Y^{12}$ | $Y^{13}, Y^{14}$ | $Y^{15}, Y^{16}$ | $Y^{17}, Y^{18}$ | a | Oxidation potential (V) |
|---|---|---|---|---|---|---|---|---|
| C-15 | Cu | —SO$_2$NH—C$_6$H$_4$—NHSO$_2$—C$_6$H$_4$—SO$_3$K (0.65) | H, Cl | H, Cl | H, Cl | H, Cl | 1 | 1.24 |
| C-16 | Cu | —SO$_2$—(CH$_2$)$_3$—SO$_3$K (0.77) | H, Cl | H, Cl | H, Cl | H, Cl | 1 | 1.38 |

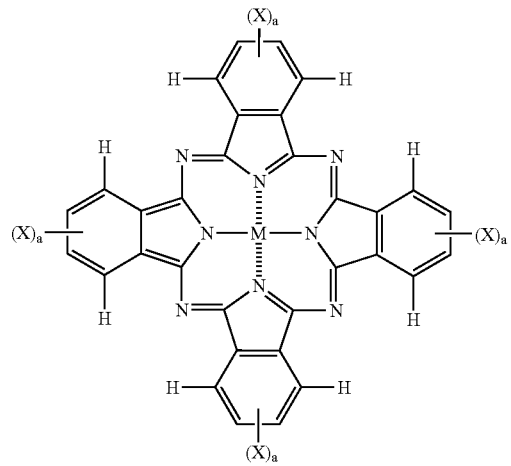

| Compound No. | M | X ($\sigma_p$ value) | a | Oxidation potential (V) |
|---|---|---|---|---|
| C-17 | Cu | —SO$_2$NH—C$_6$H$_4$—C$_8$H$_{17}$-n (0.65) | 1 | 1.23 |
| C-18 | Cu | —SO$_2$NH—C$_6$H$_3$(CO$_2$C$_6$H$_{13}$-n)$_2$ (0.65) | 1 | 1.25 |

-continued

| | | | | |
|---|---|---|---|---|
| C-19 | Cu | —SO₂NH—C(CH₃)₂—CH₂—C(CH₃)₃  (0.65) | 1 | 1.22 |
| C-20 | Cu | —SO₂N(C₄H₉-n)(C₆H₅)  (0.65) | 1 | 1.21 |
| C-21 | Cu | —SO₂NH-(4-Br-3-t-Bu-pyrazol-5-yl)  (0.65) | 1 | 1.25 |
| C-22 | Cu | —SO₂(CH₂)₃SO₂NH(CH₂)₃OCH(CH₃)₂ | 1 | 1.27 |
| C-23 | Cu | —SO₂-(2-OC₄H₉-5-t-C₈H₁₇-C₆H₃)  (0.68) | 1 | 1.28 |
| C-24 | Cu | —SO₂(CH₂)₃CO₂CH(CH₃)CH₂OCH₃ | 1 | 1.29 |
| C-25 | Cu | —SO₂—C₁₂H₂₅-n (0.77) | 1 | 1.28 |
| C-26 | Cu | —SO₂—(CH₂)₂NHCOCH(C₂H₅)(C₄H₉)  (0.77) | 1 | 1.28 |
| C-27 | Cu | —SO₂—(CH₂)₂CO₂C₆H₁₃-n (0.77) | 1 | 1.31 |
| C-28 | Cu | —SO₂—C₈H₁₇-n (0.77) | 2 | 1.36 |

Cu—Pc—(SO₂R¹)ₘ (SO₂R²)ₙ

| Compound No. | R¹ ($\sigma_p$) | R² ($\sigma_p$) | m:n | Oxidation potential (V) |
|---|---|---|---|---|
| C-29 | —C₁₂H₂₅(n) (0.77) | —C₈H₁₇(n) | 1:3 | 1.28 |
| C-30 | —C₈H₁₇(n) (0.77) | —C₆H₄—OC₄H₉(n) (0.68) | 2:2 | 1.29 |
| C-31 | —(CH₂)₂CO₂C₆H₁₃(n) (0.77) | —(2-OC₄H₉-5-CH₃-C₆H₃) (0.68) | 1:3 | 1.30 |

-continued

| Compound No. | R¹ (σ_p) | R² (σ_p) | m:n | Oxidation potential (V) |
|---|---|---|---|---|
| C-32 | 2-methyl-4-($C_8H_{17}(t)$)-1-($OC_4H_9$)-phenyl (0.68) | 4-$OCH_3$-3-methylphenyl (0.68) | 3:1 | 1.32 |
| C-33 | 4-$C_{12}H_{25}$-phenyl (0.68) | —$C_4H_9(n)$ (0.77) | 2:2 | 1.30 |
| C-34 | 4-$C_{12}H_{25}$-phenyl | —$C_4H_9(n)$ | 1:3 | 1.30 |

$$Cu-Pc-(SO_2R^1)_m \left(SO_2N\begin{matrix}R^3\\R^4\end{matrix}\right)_n$$

| Compound No. | R¹ (σ_p) | —N(R³)(R⁴) (σ_p) | m:n | Oxidation potential (V) |
|---|---|---|---|---|
| C-35 | —$C_8H_{17}(n)$ (0.77) | —NHCH$_2$CH($C_4H_9(n)$)($C_2H_5$) (0.65) | 3:1 | 1.29 |
| C-36 | —$C_6H_{17}(n)$ | —N($C_8H_{13}(n)$)$_2$ (0.65) | 1:3 | 1.25 |
| C-37 | —$C_8H_{17}(n)$ | —NH(CH$_2$)$_3$O-(3,5-di-t-butylphenyl) (0.65) | 3:1 | 1.28 |
| C-38 | 2-methyl-4-($C_8H_{17}(t)$)-1-($OC_4H_9$)-phenyl (0.68) | —NH(CH$_2$)$_2$OC$_2$H$_5$ (0.65) | 1:3 | 1.26 |
| C-39 | 2-methyl-4-($C_8H_{17}(t)$)-1-($OC_4H_9$)-phenyl | —NHCH$_2$CO$_2$C$_8$H$_{17}(n)$ (0.65) | 2:2 | 1.28 |

$$Cu-Pc-(SO_2R^1)_m(SO_2R^2)_n$$

| Compound No. | R¹ (σ_p) | R² (σ_p) | m:n | Oxidation potential (V) |
|---|---|---|---|---|
| C-40 | —(CH$_2$)$_3$SO$_3$Li | —(CH$_2$)$_3$SO$_2$NHCH$_2$CH(OH)CH$_3$ | 3:1 | 1.31 |
| C-41 | —(CH$_2$)$_3$SO$_3$Li | —(CH$_2$)$_3$SO$_2$NHCH$_2$CH(OH)CH$_3$ | 2:2 | 1.31 |
| C-42 | —(CH$_2$)$_3$SO$_3$Li | —(CH$_2$)$_3$SO$_3$NH(CH$_2$)$_2$O(CH$_2$)$_2$OH | 2:2 | 1.30 |

-continued

| | | | | |
|---|---|---|---|---|
| C-43 | —(CH$_2$)$_3$SO$_3$K | [methylbenzene with CO$_2$K] | 1:3 | 1.32 |
| C-44 | —(CH$_2$)$_3$SO$_3$K | [methylbenzene with CO$_2$K] | 3.5:0.5 | 1.30 |
| C-45 | —(CH$_2$)$_2$NHCO(CH$_2$)$_2$CO$_2$Na (0.77) | —(CH$_2$)$_3$SO$_3$Na (0.77) | 2:2 | 1.30 |
| C-46 | —(CH$_2$)$_2$NHCO(CH$_2$)$_2$CO$_2$Na | —(CH$_2$)$_3$SO$_3$Na | 1:3 | 1.30 |
| C-47 | —(CH$_2$)$_2$NHSO$_2$—[benzene with CO$_2$Na] (0.77) | —(CH$_2$)$_3$SO$_3$Na | 1:3 | 1.31 |
| C-48 | —(CH$_2$)$_2$N(CH$_2$CO$_2$Na)$_2$ | —(CH$_2$)$_3$SO$_3$Na | 2:2 | 1.32 |

$$Cu-Pc-(SO_2R^1)_m \left(SO_2N\begin{matrix}R^3\\R^4\end{matrix}\right)_n$$

| Compound No. | R$^1$ | —N(R$^3$)(R$^4$) ($\sigma_p$) | m:n | Oxidation potential (V) |
|---|---|---|---|---|
| C-49 | —(CH$_2$)$_3$SO$_3$K | —NH(CH$_2$)$_2$SO$_3$K (0.65) | 3:1 | 1.29 |
| C-50 | —(CH$_2$)$_3$SO$_3$K | —NH(CH$_2$)$_2$SO$_3$K | 2:2 | 1.28 |

Other compounds usable in the invention include, but are not limited to, those described in JP-A Nos. 2002-294097, 2002-249677, 2002-256167, 2002-275386, 2003-012952, 2001-279145, and 2002-309116. The respective compounds described above can be easily synthesized by methods described in the patent applications mentioned here.

(Ink for Ink Jet Recording)

The ink set for ink jet recording in the invention comprises, as minimum elements, a yellow ink containing at least one yellow dye, a magenta ink containing at least one magenta dye and a cyan ink containing at least one cyan dye. As the dye contained in each ink, any one of the various dyes mentioned above can be used. Each ink is usually prepared by dissolving and/or dispersing the dye in a lipophilic medium or an aqueous medium. An aqueous ink using the aqueous medium is preferable for the working atmosphere and for saving resources.

In addition to the dyes, various additives can be added in such a range that the effect of the invention is not deteriorated. The additives include known additives such as a drying inhibitor (wetting agent), an anti-fading agent, an emulsion stabilizer, a permeation accelerator, a UV absorber, a preservative, an anti-fungus agent, a pH controlling agent, a surface tension controlling agent, a defoaming agent, a viscosity controlling agent, a dispersant, a dispersion stabilizer, a rust preventive and a chelating agent. When the ink is a water-soluble ink, these additives are added directly to the ink. When the oil-soluble dye is used in the form of a dispersion, generally a dye dispersion is first prepared and then the additives are added to the dispersion, or the additives may be added to an oil phase or an aqueous phase at the time of preparation.

The drying inhibitor is preferably used in order to prevent clogging due to drying of the ink for ink jet recording in an ink nozzle in an ink jet recording system.

The drying inhibitor is preferably a water-soluble organic solvent having a lower vapor pressure than that of water. Examples thereof include polyvalent alcohols such as ethylene glycol, propylene glycol, diethylene glycol, polyethylene glycol, thiodiglycol, dithiodiglycol, 2-methyl-1,3-propane diol, 1,2,6-hexane triol, acetylene glycol derivatives, glycerin and trimethylol propane, polyvalent alcohol lower alkyl ethers such as ethylene glycol monomethyl (or ethyl) ether, diethylene glycol monomethyl (or ethyl) ether and triethylene glycol monoethyl (or butyl) ether, heterocyclic rings such as 2-pyrrolidone, N-methyl-2-pyrrolidone, 1,3-dimethyl-2-imidazolidinone and N-ethyl morpholine, and sulfur-containing compounds such as sulfolane, dimethyl sulfoxide and 3-sulfolene, multifunctional compounds such as diacetone alcohol and diethanolamine, and urea derivatives.

Among these compounds, polyvalent alcohols such as glycerine and diethylene glycol are preferable. These drying agents may be used alone or as a mixture of two or more thereof. These drying agents are contained preferably in an amount of 10 to 50% by mass in the ink.

The permeation accelerator is preferably used for the purpose of sufficiently permeating the ink for ink jetting into paper. Examples of the permeation accelerator include alcohols such as ethanol, isopropanol, butanol, di(tri)ethylene glycol monobutyl ether and 1,2-hexane diol and nonionic surfactants such as sodium laurylsulfate and sodium oleate. The permeation accelerator is used usually in an amount of 5 to 30% by mass in the ink in order to achieve a sufficient effect, desirably in an amount in such a range as not to cause print blurring or print-through.

The UV absorber is used for the purpose of improving the shelf stability of images. Examples of the UV absorber include benzotriazole compounds described in JP-A Nos. 58-185677, 61-190537, 2-782, 5-197075 and 9-34057, benzophenone compounds described in JP-A Nos. 46-2784, 5-194483 and USP No. 3214463, cinnamic acid compounds described in JP-B Nos. 48-30492, 56-21141 and JP-A No. 10-88106, triazine compounds described in JP-A Nos. 4-298503, 8-53427, 8-239368, 10-182621 and Japanese Patent Application National Publication (Laid-Open) No. 8-501291, compounds described in Research Disclosure No. 24239, and compounds such as stilbene and benzoxazole compounds absorbing ultraviolet rays to emit fluorescence, that is, fluorescent brighteners.

The anti-fading agent is used for the purpose of improving the shelf stability of images. Examples of the anti-fading agent include various organic or metal complex anti-fading agents. The organic anti-fading agent includes hydroquinones, alkoxy phenols, dialkoxy phenols, phenols, anilines, amines, indanes, chromans, alkoxy anilines, thioethers, thioureas and heterocyclic rings (for example, compounds described in JP-A Nos. 2002-36717, 2002-86904, etc.), and the metal complex includes a nickel complex and a zinc complex. Specifically, it is possible to employ compounds described in patents cited in No. VII, items I to J, in Research Disclosure (RD) No. 17643, RD No. 15162, left column on page 650 in RD No. 18716, page 527 in RD No. 36544, page 872 in RD No. 307105, and RD No. 15162, and compounds of general formulae and typical compounds described on pp. 127-137 in JP-A No. 62-215272.

The anti-fungus agent includes sodium dehydroacetate, sodium benzoate, sodium pyridinethion-1-oxide, ethyl p-hydroxybenzoate, 1,2-benzoisothiazolin-3-one and salts thereof. These compounds are used in 0.02 to 1.00% by mass based on the ink.

As the pH controlling agent, a neutralizing agent (organic base, inorganic alkali) can be used. For the purpose of improving the shelf stability of the ink for ink jetting, the pH controlling agent is added preferably so as to control the pH of the ink for ink jetting in the range of 6 to 10, and more preferably in the range of 7 to 10.

The surface tension controlling agent includes nonionic, cationic or anionic surfactants. The surface tension of the ink for ink jetting in the invention is preferably 25 to 70 mPa·s, and more preferably 25 to 60 mN/m. The viscosity of the ink for ink jetting in the invention is preferably 30 mPa·s or less. The viscosity is more preferably 20 mPa·s or less.

Preferable examples of the surfactant include anionic surfactants such as fatty acid salts, alkyl sulfates, alkyl benzene sulfonates, alkyl naphthalene sulfonates, dialkyl sulfosuccininates, alkyl phosphates, naphthalene sulfonate-formalin condensates and polyoxyethylene alkyl sulfates, and nonionic surfactants such as polyoxyethylene alkyl ethers, polyoxyethylene alkyl allyl ether, polyoxyethylene fatty esters, sorbitan fatty esters, polyoxyethylene sorbitan fatty esters, polyoxyethylene alkyl amines, glycerin fatty esters, oxyethylene oxypropylene block copolymers, etc. Acetylene-based polyoxyethylene oxide surfactants SURFYNOLS (Air Products & Chemicals) are also preferably used. Amine oxide-based surfactants such as N,N-dimethyl-N-alkyl amine oxide, or quaternary ammonium salt-containing betaine-based amphoteric surfactants such as N,N-dimethyl-N-lauryl-carbomethyl ammonium are also preferable. Surfactants described on pp. 37 to 38 in JP-A No. 59-157,636 and in Research Disclosure No. 308119 (1989) can also be used.

As the defoaming agent, fluorine or silicone compounds or chelating agents such as EDTA can be used as necessary.

When the dye in the invention is oil-soluble, the method of dispersing the dye in an aqueous medium includes, preferably, dispersing fine colored particles containing the dye and an oil-soluble polymer in an aqueous medium as shown in JP-A Nos. 11-286637, 2001-240763, 2001-262039 and 2001-247788, or dispersing, in an aqueous medium, the dye in the invention dissolved in a high-boiling organic solvent as shown in JP-A Nos. 2001-262018, 2001-240763, 2001-335734 and 2002-080772. The method of dispersing the dye in the invention in an aqueous medium, the oil-soluble polymer used, the high-boiling organic solvent, additives, and the amounts thereof, which are described in these patent documents, can be preferably used.

Alternatively, the solid dye may be dispersed to form fine particles. When dispersing the dye, a dispersant and a surfactant can be used. As the dispersing device, a simple stirrer, an impeller stirring system, an in-line stirring system, a mill system (for example, a colloid mill, ball mill, sand mill, attritor, roll mill, agitator mill, etc.), a supersonic system, a high-pressure emulsification dispersing system (high-pressure homogenizer, for example a commercial apparatus such as a Gaulin homogenizer, microfluidizer, DeBEE2000 or the like) can also be used. The methods of preparing the ink for ink jet recording are described in detail not only in the above-mentioned patent applications but also in JP-A Nos. 5-148436, 5-295312, 7-97541, 7-82515, 7-118584, 11-286637 and 2001-271003, and these methods can be used in preparation of the ink for ink jet recording in the invention.

As the aqueous medium, a mixture comprising water as a major component and if necessary a water-miscible organic solvent can be used. Examples of the water-miscible organic solvent include alcohols (for example, methanol, ethanol, propanol, isopropanol, butanol, isobutanol, sec-butanol, t-butanol, pentanol, hexanol, cyclohexanol and benzyl alcohol), polyvalent alcohols (for example, ethylene glycol, diethylene glycol, triethylene glycol, polyethylene glycol, propylene glycol, dipropylene glycol, polypropylene glycol, butylene glycol, hexane diol, pentane diol, glycerin, hexane triol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethylene imine and tetramethyl propylene diamine) and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). The water-miscible organic solvents can be used as a mixture of two or more thereof.

The inks used in the ink set of the invention preferably contain dyes in an amount of 0.1 to 20 parts by mass based on 100 parts by mass of the inks. The yellow or cyan ink may be composed of two or more dyes. The magenta ink may be composed of two or more dyes if the oxidation potential is higher than 0.8 V. When the ink is composed of two or more dyes, the total content of the dyes is desirably in the above range.

For the purpose of high-quality image in recent years, the yellow, magenta or cyan ink is composed of two or more inks different in dye concentration, and in the invention, the dyes used in dark and pale inks desirably have an oxidation potential higher than 0.8 V.

When two or more different inks are used as inks of the same hue, the concentration of one ink is preferably 0.05 to 0.5 times as high as that of the concentration of the other ink(s).

The ink set of the invention is used in formation of full-color images, and an additional black ink can also be used to control the tone of color. The usable black material includes disazo, triazo and tetraazo dyes and carbon black dispersions.

Hereinafter, the embodiments of the invention are described.

A first embodiment of the invention provides an ink jet recording medium comprising a support and an ink receiving layer disposed on the support, wherein the ink receiving layer comprises a complex formed from a metal with a valence of two or more and an acidic group-containing compound having a substituent group containing a nitrogen atom, an oxygen atom or a sulfur atom.

A second embodiment of the invention provides the ink jet recording medium of the first embodiment, wherein the acidic group-containing compound is represented by the general formula (I):

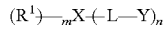  General Formula (I)

wherein $R^1$ represents one selected from the group consisting of a hydrogen atom, an aliphatic group, an aromatic group, a heterocyclic group, —$COR^2$ and —$SO_2R^3$ wherein $R^2$ and $R^3$ each independently represent an aliphatic group, an aromatic group or a heterocyclic group; X represents one selected from the group consisting of —N<, —O—, —S—, —SO— and —$SO_2$—; Y represents an acidic group; L represents a divalent linking group; m and n each independently denote an integer; and when X is one selected from the group consisting of —O—, —S—, —SO— or —$SO_2$—, (m+n) is 2, and when X is —N<, (m+n) is 3 or 4 provided that when (m+n) is 4, the nitrogen atom in general formula (I) is a quaternary ammonium cation, and either one of the acidic groups in general formula (I) is an anion in a dissociated state, or one of $R^1$ groups has an anionic group.

A third embodiment of the invention provides the ink jet recording medium of the first or second embodiment, wherein the metal with a valence of two or more is at least one selected from aluminum, titanium and zirconium.

A fourth embodiment of the invention provides the inkjet recording medium of any one of the first to third embodiments, wherein the complex formed from the acidic group-containing compound and the metal is contained in the ink receiving layer in an amount of 0.01 to 20 g/m².

A fifth embodiment of the invention provides the ink jet recording medium of any one of the first to fourth embodiments, wherein the ink receiving layer further comprises a water-soluble resin.

A sixth embodiment of the invention provides the ink jet recording medium of the fifth embodiment, wherein the water-soluble resin is at least one selected from the group consisting of polyvinyl alcohol resin, cellulose resin, ether linkage-containing resin, carbamoyl group-containing resin, carboxyl group-containing resin, and gelatin.

A seventh embodiment of the invention provides the ink jet recording medium of the fifth or sixth embodiment, wherein the ink receiving layer comprises a crosslinking agent capable of crosslinking the water-soluble resin.

An eighth embodiment of the invention provides the ink jet recording medium of any one of the first to seventh embodiments, wherein the ink receiving layer further comprises particles.

A ninth embodiment of the invention provides the ink jet recording medium of the eighth embodiment, wherein the particles are at least one selected from the group consisting of silica particles, colloidal silica, alumina particles and pseudo-boehmite.

A tenth embodiment of the invention provides the ink jet recording medium of the eighth embodiment, wherein the particles are fumed silica particles, and are used in the ink receiving layer as an aqueous fumed silica dispersion containing the fumed silica and a dispersant.

An eleventh embodiment of the invention provides the ink jet recording medium of any one of the first to tenth embodiments, wherein the ink receiving layer further comprises a mordant.

A twelfth embodiment of the invention provides the ink jet recording medium of any one of the first to eleventh embodiments, wherein the ink receiving layer is produced by crosslinking and curing a coating layer formed by applying a coating solution containing at least particles and a water-soluble resin, and the crosslinking and curing is carried out by adding a crosslinking agent to at least one of the coating solution and a basic solution having pH exceeding 7 and then applying the basic solution to the coating layer either (1) at the same time that the coating solution is applied to form the coating layer or (2) in the course of drying the coating layer formed by applying the coating solution before the coating layer exhibits a decreasing rate of drying.

A thirteen embodiment of the invention provides an ink jet recording method which comprises forming an image with an ink set comprising, as minimum constituent elements, a yellow ink containing at least one yellow dye, a magenta ink containing at least one magenta dye and a cyan ink containing at least one cyan dye, on the ink jet recording medium of any one of the first to twelfth embodiments, wherein an oxidation potential of at least one of the magenta dye and the cyan dye is higher than 0.8 V (vs SCE).

EXAMPLES

Hereinafter, the present invention is described in more detail by reference to the Examples, but the invention should not be construed to be limited to the Examples. In the Examples, the terms "parts" and "%" refer to "parts by mass" and "% by mass" respectively unless otherwise specified.

(Preparation of a Support)

Wood pulp composed of 100 parts of LBKP was beaten with a double disk refiner to a Canadian freeness of 300 ml, and 0.5 part of epoxylated behenic amide, 1.0 part of anion polyacrylamide, 0.1 part of polyamide polyamine epichlorohydrin and 0.5 part of cation polyacrylamide, all of which are expressed in terms of the ratio thereof on an absolutely dry mass basis to the pulp, were added to the pulp and weighed with a fourdrinier machine to prepare a base paper of 170 g/m².

To control surface sizing of the base paper, the base paper was impregnated with 4% aqueous solution of polyvinyl alcohol containing 0.04% fluorescent whitening agent (Whitex BB, Sumitomo Chemical Co., Ltd.) so that the base paper has the fluorescent whitening agent in an amount of 0.5 g/m² based on an absolutely dry mass. After being dried, the base paper was calendered to provide the base paper whose density was controlled to be 1.05 g/ml.

The wire surface (reverse surface) of the resultant base paper was subjected to corona discharge treatment and then coated with high-density polyethylene having a thickness of 19 μm by a melt extrusion machine, to form a resin layer having a matted surface (hereinafter, the surface of the resin layer is referred to as "reverse surface"). The resin layer of this reverse surface was further subjected to corona discharge treatment. Then, as an antistatic finish, the reverse surface of the resin layer was coated with a dispersion containing aluminum oxide (Alumina Sol 100, manufactured by Nissan Chemical Industries, Ltd.) and silicon dioxide (Snowtex O, manufactured by Nissan Chemical Industries, Ltd.) dispersed in the ratio of 1:2 (ratio by mass) in water, to obtain the resin layer having the antistatic agent in an amount of 0.2 g/m² on a dry mass basis.

Further, the felt surface (obverse surface), i.e. the side where the resin layer was not arranged, was subjected to corona discharge treatment, and then low-density polyethylene having a MRF (melt flow rate) of 3.8, containing 10% (relative to polyethylene) anatase type titanium dioxide, a very small amount of ultramarine and 0.01% fluorescent whitening agent was melt-extruded to a thickness of 29 μm onto the felt surface to form a highly gloss thermoplastic resin layer on the obverse surface of the base paper (hereinafter, this highly glossy surface is referred to as "obverse surface"), whereby a desired support was prepared.

Example 1

(Preparation of Ink Receiving Layer Coating Solution (A1))

In the composition shown below, (1) fine particles of fumed silica, (2) deionized water and (3) Chemistat 7005 were mixed, and the mixture was dispersed by a dispersing machine KD-P (manufactured by Shinmaru Enterprises Corporation). Then, (4) the complex of the invention was added thereto, and the mixture was further dispersed with the dispersing machine KD-P. Then, a mixture of (5) polyvinyl alcohol, (6) boric acid, (7) polyoxyethylene lauryl ether and (8) deionized water was added thereto to prepare the ink receiving layer coating solution (A1).

The ratio by mass of the fine silica particles/the water-soluble resin (PB ratio=(1)/(5)) was 4.5/1, and the pH value of the ink receiving layer coating solution (A1) was acidic at pH 3.5.

| <Composition of the ink receiving layer coating solution (A1)> | |
|---|---|
| (1) Fine particles of fumed silica (fine inorganic particles) (Reolosil QS-30 with an average primary particle diameter of 7 nm, manufactured by Tokuyaka Co. Ltd.) | 10.0 parts |
| (2) Deionized water | 51.6 parts |
| (3) Chemistat 7005 (40% aqueous solution) (dispersant manufactured by Sanyo Chemical Industries, Ltd.) | 1.2 parts |
| (4) Reactant of $C_{12}H_{25}N(CH_2COOH)_2$ and aluminium chloro hydrate (basicity 83%) in a molar ratio of 1:1 (complex of the invention) | 1.0 Part |
| (5) 8% aqueous polyvinyl alcohol (water-soluble resin) (PVA 124, degree of saponification 98.5%, degree of polymerization 2400 manufactured by Kuraray Co., Ltd.) | 27.8 parts |
| (6) Boric acid (crosslinking agent) | 0.4 part |
| (7) Polyoxyethylene lauryl ether (surfactant) (Emulgen 109P, 10% aqueous solution, HLB 13.6, manufactured by Kao Corporation) | 1.2 parts |
| (8) Deionized water | 32.0 parts |

(Preparation of Ink Jet Recording Sheet)

After the obverse surface of the support was subjected to corona discharge treatment, the ink receiving layer coating solution (A1) obtained above was applied in an amount of 200 ml/m² onto the obverse surface of the support by an extrusion die coater (coating step), and dried at 80° C. with a hot-air dryer (at a rate of 3 to 8 m/sec) until the solid content of the coating layer was reduced to 20%. Just after the coating layer showed a constant rate of drying for this period, the support was dipped in a mordant coating solution (B1) having the following composition for 30 seconds, to make the coating solution adhere to the coating layer in an amount of 20 g/m² (step of applying the mordant solution), and then dried at 80° C. for 10 minutes (drying step). The inkjet recording sheet (1) of the invention provided with the ink receiving layer having a thickness of 32 μm after drying was thus formed.

| <Composition of the mordant coating solution (B1)> | |
|---|---|
| (1) Boric acid (crosslinking agent) | 0.65 part |
| (2) 20% aqueous solution of Polyallylamine PAA-03 (mordant manufactured by Nittobo) | 12.5 parts |
| (3) Deionized water | 72.0 parts |
| (4) Ammonium chloride (surface pH controlling agent) | 0.8 part |
| (5) Polyoxyethylene lauryl ether (surfactant) (Emulgen 109P, 2% aqueous solution, HLB 13.6, manufactured by Kao Corporation) | parts |
| (6) MEGAFACE F1405 (10% aqueous solution) (fluorine surfactant manufactured by Dainippon Ink and Chemicals, Inc.) | 2.0 parts |

Example 2

A comparative ink jet recording sheet (2) was prepared in the same manner as in Example 1 except that 1.0 part of the reactant (4) (complex of the invention) in the composition of the ink receiving layer coating solution (A1) was not used.

Example 3

A comparative ink jet recording sheet (3) was prepared in the same manner as in Example 1 except that 1.0 part of the reactant (4) (complex of the invention) in the composition of the ink receiving layer coating solution (A1) was changed to 1.0 part of 40% aqueous solution of aluminium chloro hydrate ($Al_2(OH)_5Cl$) (basicity 83%).

Example 4

A comparative ink jet recording sheet (4) was prepared in the same manner as in Example 1 except that 1.0 part of the reactant (4) (complex of the invention) in the composition of the ink receiving layer coating solution (A1) was changed to 0.65 part of $C_{12}H_{25}N(CH_2COOH)_2$.

Example 5

An ink jet recording sheet (5) of the invention was prepared in the same manner as in Example 1 except that 1.0 part of the reactant (4) (complex of the invention) in the composition of the ink receiving layer coating solution (A1) was changed to 1.0 part of a reactant of N-hydroxyethyldiiminoacetic acid and aluminium chloro hydrate (basicity 83%) in a molar ratio of 2:1 (complex of the invention).

Example 6

An ink jet recording sheet (6) of the invention was prepared in the same manner as in Example 1 except that 1.0 part of the reactant (4) (complex of the invention) in the composition of the ink receiving layer coating solution (A1) was changed to 1.5 parts of a reactant of $C_{14}H_{29}N(CH_2COOH)_2$ and zirconium oxychloride in a molar ratio of 2:1 (complex of the invention).

Example 7

An ink jet recording sheet (7) of the invention was prepared in the same manner as in Example 1 except that 1.0 part of the reactant (4) (complex of the invention) in the composition of the ink receiving layer coating solution (A1) was changed to 1.0 part of a reactant of N-hydroxyethyldiethyliminoacetic acid and zirconium oxychloride in a molar ratio of 2:1 (complex of the invention).

Example 8

An ink jet recording sheet (8) of the invention was prepared in the same manner as in Example 1 except that 1.0 part of the reactant (4) (complex of the invention) in the composition of the ink receiving layer coating solution (A1) was changed to 1.5 parts of a reactant of $C_{12}H_{25}N(CH_2CO_2Na)CH_2CO_2H$ and aluminium chloro hydrate in a molar ratio of 1:10 (basicity 83%).

Example 9

An ink jet recording sheet (9) of the invention was prepared in the same manner as in Example 1 except that 1.0 part of the reactant (4) (complex of the invention) in the composition of the ink receiving layer coating solution (A1) was changed to 1.2 parts of a reactant of $C_{12}H_{25}N^+(CH_3)_2CH_2CO_2^-$ and aluminium chloro hydrate in a molar ratio of 1:8 (basicity 83%).

Example 10

An ink jet recording sheet (10) of the invention was prepared in the same manner as in Example 1 except that 1.0 part of the reactant (4) (complex of the invention) in the composition of the ink receiving layer coating solution (A1) was changed to 2.0 parts of a reactant of $C_{16}H_{33}N(CH_2CH_2COOH)_2$ and aluminium chloro hydrate in a molar ratio of 1:4 (basicity 83%).

Example 11

An ink jet recording sheet (11) of the invention was prepared in the same manner as in Example 1 except that 1.2 parts of the dispersant Chemistat 7005 (3) in the composition of the ink receiving layer coating solution (A1) were not used.

Example 12

An ink jet recording sheet (12) of the invention was prepared in the same manner as in Example 1 except that 1.2 parts of the dispersant Chemistat 7005 (3) in the composition of the ink receiving layer coating solution (A1) were changed to 1.0 part of a dispersant Sharol DC-902P (3) (51% aqueous solution, I/O value of 2.5, manufactured by Dai-ichi Kogyo Seiyaku Co., Ltd.).

Example 13

An ink jet recording sheet (13) of the invention was prepared in the same manner as in Example 1 except that 1.0 part of the reactant (4) (complex of the invention) in the composition of the ink receiving layer coating solution (A1) was changed to 1.0 part of zirconium glycinate (complex of the invention).

Example 14

An ink jet recording sheet (14) of the invention was prepared in the same manner as in Example 1 except that 1.0 part of the reactant (4) (complex of the invention) in the composition of the ink receiving layer coating solution (A1) was changed to 1.0 part of zirconium glycolate (complex of the invention).

(Evaluation Test)

The ink jet recording sheets obtained above were evaluated for image blurring, light fastness and gloss in the following manner. The results are shown in Table 1 below.

(1) Image Blurring Test

Each ink jet recording sheet was introduced into a paper feeder of an ink jet printer PM-950C (manufactured by Seiko Epson Corporation) and used to print check patterns (3 cm×3 cm check pattern of 4 squares) at 1-mm intervals with a black ink for PM-950C, and this image sample was stored in the environment of a temperature of 25° C. and 90% RH (relative humidity) for 72 hours. Then, blurring of the black ink at the intervals (that is, on the white background portion) was observed with the naked eye. The evaluation was carried out according to the following criteria. "A" was given when the increase in density of the black ink on the white background portion just after printing was 0.01 or less on Bk filter in status A, "B" was given when the increase was 0.01 to 0.05, and "C" was given when the increase was 0.05 or more.

(2) Light Fastness Test

Each ink jet recording sheet was introduced into a paper feeder of an ink jet printer PM-950C (manufactured by Seiko Epson Corporation) and used to print a magenta solid image which was then irradiated, through a filter cutting ultraviolet rays of wavelengths of 365 nm or less, with light from a lamp in Xenon Weather-O-meter Ci65A (manufactured by ATLAS) in the environment of a temperature of 25° C. and 32% RH (relative humidity) for 3.8 hours, and then the lamp was turned off, the recording sheet was left in the environment of a temperature of 20° C. and 91% RH (relative humidity) for 1 hour; this cycle was repeatedly carried out for 168 hours. The density of the magenta image before and after this test was measured with a reflective densitometer Xrite 938 (manufactured by X-rite Inc.), and the remaining magenta in the image was calculated and evaluated according to the following criteria. Further, the discoloration of the magenta image before and after the test was confirmed with the naked eye.

[Criteria]
A: Density remaining rate of the magenta image exceeded 90%.
B: Density remaining rate of the magenta image was 80 to 90%.
C: Density remaining rate of the magenta image was 70 to 80%.
D: Density remaining rate of the magenta image was less than 70%.

(3) Evaluation of Gloss

Each ink jet recording sheet was introduced into a paper feeder of an ink jet printer PM-950C (manufactured by Seiko Epson Corporation) and used to print a 3 cm×3 cm solid square image with a black ink for PM-950C. The gloss of the printed black image was observed with the naked eye and evaluated according to the following criteria.

[Criteria]
○: Good qualities with high gloss.
Δ: Slightly poor in gloss.
X: Poor in gloss.

TABLE 1

| Ink Jet recording sheet | Blurring with black ink | Light fastness of magenta | Gloss | Remarks |
|---|---|---|---|---|
| Example 1 | A | A | ○ | Invention |
| Example 2 | C | D | ○ | Comparative example |
| Example 3 | C | B | ○ | Comparative example |
| Example 4 | A | D | ○ | Comparative example |
| Example 5 | A | A | ○ | Invention |
| Example 6 | A | B | ○ | Invention |
| Example 7 | A | B | ○ | Invention |
| Example 8 | A | A | ○ | Invention |
| Example 9 | A | A | ○ | Invention |
| Example 10 | A | A | ○ | Invention |
| Example 11 | A | A | Δ | Invention |
| Example 12 | B | A | ○ | Invention |
| Example 13 | A | B | ○ | Invention |
| Example 14 | A | B | ○ | Invention |

From the results in Table 1, it was revealed that the ink jet recording sheets of the invention comprising the complex formed from a metal with a valence of two or more and an acidic group-containing compound having a substituent group containing a nitrogen atom, an oxygen atom or a sulfur atom (Examples 1 and 5 to 14) were ink jet recording sheets excellent in image blurring and light fastness with less image blurring with the black ink after storage in the high-humidity environment while maintaining a high degree of remaining magenta in the image after the cycle test involving xenon irradiation in the high-humidity environment. Further, the ink jet recording sheets of the invention were excellent in ink absorptivity.

On the other hand, the comparative ink jet recording sheets (Examples 2 to 4) not containing the complex of the invention were inferior in image blurring and light fastness with image blurring and low image density after the test.

Example 15

(Preparation of Aqueous Inks)

Deionized water was added to the materials shown below to provide 1 L dispersion which was then stirred for 1 hour under heating at 30 to 40° C. Thereafter, the mixture was adjusted to pH 9 with 10 mol/L KOH and filtered under suction through a microfilter having an average pore diameter of 0.25 μm to prepare a light magenta ink.

| | |
|---|---|
| Magenta dye represented by the structural formula (T-1) below | 7.5 g/L |
| Diethylene glycol | 50 g/L |
| Urea | 10 g/L |
| Glycerin | 200 g/L |
| Triethylene glycol monobutyl ether | 120 g/L |
| 2-Pyrrolidone | 20 g/L |
| Triethanolamine | 6.9 g/L |
| Benzotriazole | 0.08 g/L |
| SURFYNOL 465 (surfactant manufactured by Air Products Japan) | 10.5 g/L |
| PROXEL XL-2 (disinfectant manufactured by ICI Japan) | 3.5 g/L |

A magenta ink, light cyan ink, cyan ink, yellow ink and black ink were prepared in the same manner except that the type of dye and additives were changed. The resulting inks were used to prepare an ink set (101) having the composition shown in Table 2.

TABLE 2

(Composition of ink set 101)

| | Light magenta | Magenta | Light cyan | Cyan | Yellow | Black |
|---|---|---|---|---|---|---|
| Dye (g/l) | T-1 (7.5) | T-1 (30.0) | T-2 (8.75) | T-2 (35.0) | T-3 (29.0) | T-4(20.0) T-5(20.0) T-6(20.0) T-3(21.0) |
| Diethylene glycol (g/l) | 50 | 80 | 170 | 110 | 90 | 10 |
| Urea (g/l) | 10 | 70 | — | — | — | — |
| Glycerin (g/l) | 200 | 150 | 170 | 150 | 150 | 160 |

TABLE 2-continued (Composition of ink set 101)

|  | Light magenta | Magenta | Light cyan | Cyan | Yellow | Black |
|---|---|---|---|---|---|---|
| Triethylene glycol monobutyl ether (g/l) | 120 | 120 | 130 | 130 | 130 | — |
| Diethylene glycol monobutyl ether (g/l) | — | — | — | — | — | 110 |
| 2-Pyrrolidone (g/l) | 20 | — | — | — | — | 50 |
| SURFYNOL 465 (g/l) | 10.5 | 10 | 9.8 | 10.5 | — | — |
| SURFYNOL STG (g/l) | — | — | — | — | 8.5 | 9.8 |
| Triethanolamine (g/l) | 6.9 | 7 | 6 | 6 | 0.9 | 15 |
| Benzotriazole (g/l) | 0.08 | 0.07 | 0.08 | 0.08 | — | 0.06 |
| Proxel XL2 (g/l) | 3.5 | 1.5 | 1.1 | 1.2 | 1.5 | 1.1 |

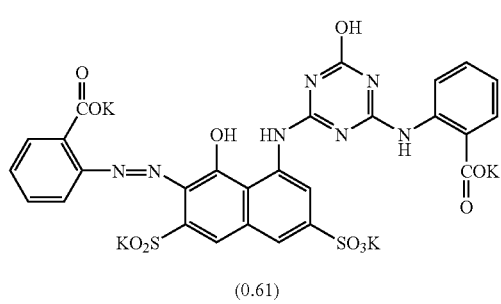

(T-1)
(0.61)

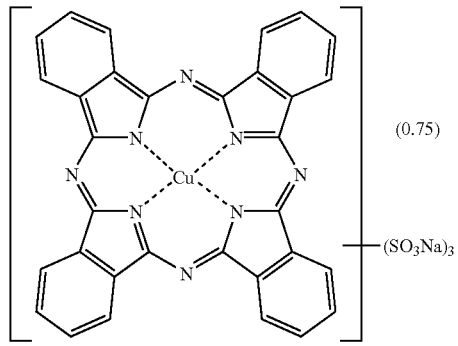

(T-2)
(0.75)

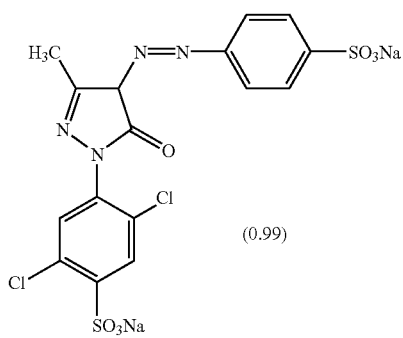

(T-3)
(0.99)

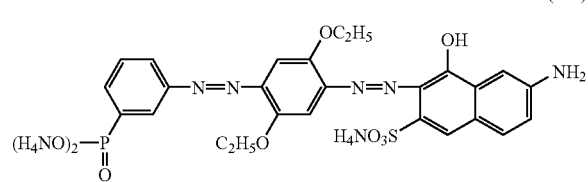

(T-4)

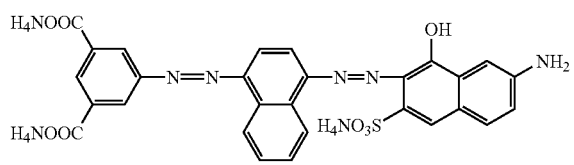

(T-5)

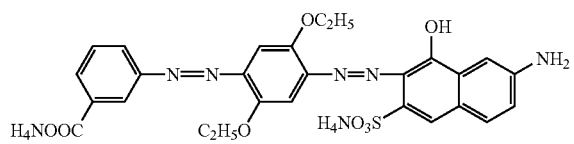

(T-6)

Ink sets (102 to 106) were prepared in the same manner for the ink set (101) except that the dyes for light magenta, magenta, light cyan, cyan and yellow were changed to the dyes shown in Table 3. When the dyes were changed with other dyes, they were exchanged in equimolar amounts, and the dye concentration in each ink was controlled such that the permeation concentration of the ink was identical with that of the ink set (101). When dyes were simultaneously used, the dyes were used in equimolar amounts.

TABLE 3

| Ink set | Light magenta | Magenta | Light cyan | Cyan | Yellow |
|---|---|---|---|---|---|
| 101 | T-1 | T-1 | T-2 | T-2 | T-3 |
| 102 | T-1 | T-1 | C-10 | C-10 | T-3 |
| 103 | M-11 | M-11 | T-2 | T-2 | T-3 |
| 104 | M-11 | M-11 | C-10 | C-10 | T-3 |
| 105 | M-10 | M-10 | C-40 | C-40 | Y-4 |
| 106 | M-6 | M-3 | C-42 | C-40 | Y-24 Y-25 |

(Preparation of an Ink Receiving Layer Coating Solution (A2))

In the composition shown below, (1) fine particles of fumed silica were mixed with (2) deionized water and (3) a dispersant (Sharol DC-902P) and then dispersed by a dispersing machine KD-P (manufactured by Shinmaru Enterprises Corporation), and then (4) the complex of the invention and (5) aqueous boric acid were added thereto, and the mixture was stirred at a rate of 2000 rpm for 10 minutes with a dissolver, and then (6) polyvinyl alcohol was added thereto and stirred at a rate of 2000 rpm for 10 minutes. A solution containing (7) a surfactant and (8) deionized water was added thereto and stirred at a rate of 2000 rpm for 5 minutes to prepare the desired ink receiving layer coating solution (A2).

<Composition of the ink receiving layer coating solution (A2)>

| | |
|---|---|
| (1) Fine particles of fumed silica (Reolosil QS-30 having an average primary particle diameter of 7 nm, manufactured by Tokuyama Co., Ltd.) | 10 parts |
| (2) Deionized water | 51.6 parts |
| (3) Dispersant (Sharol DC-902P, 51% aqueous solution, manufactured by Dai-ichi Kogyo Seiyaku Co., Ltd.) | 1 part |
| (4) Reactant (complex of the invention) of $C_{12}H_{25}N^+(CH_3)_2CH_2COO^-$ and aluminium chloro hydrate (basicity 83%) in a molar ratio of 1:4 | 1 part |
| (5) Aqueous boric acid (5% aqueous solution, crosslinking agent) | 8 parts |
| (6) Polyvinyl alcohol (8% aqueous solution, water-soluble resin) (PVA235, degree of saponification 88 mol %, degree of polymerization 3500, manufactured by Kuraray Co., Ltd.) | 27.8 parts |
| (7) Surfactant (Olfin PD-101 manufactured by Nisshin Chemicals Co., Ltd.) | 0.1 part |
| (8) Deionized water | 25.6 parts |

(Preparation of an Ink Jet Recording Sheet)

After the obverse surface of the support was subjected to corona discharge treatment, the ink receiving layer coating solution (A2) obtained above was applied in an amount of 200 ml/m² onto the obverse surface of the support by an extrusion die coater (coating step), and dried at 80° C. with a hot-air dryer (at a rate of 3 to 8 m/sec) until the solid content of the coating layer was reduced to 20%. Just after the coating layer showed a constant rate of drying for this period, the support was dipped in a mordant coating solution (B2) having the following composition for 30 seconds, to make the coating solution adhere to the coating layer in an amount of 20 g/m² (step of applying the mordant solution), and then dried at 80° C. for 10 minutes (drying step). The ink jet recording sheet (15) of the invention provided with the ink receiving layer having a thickness of 32 μm after drying was thus formed.

<Composition of the mordant coating solution (B2)>

| | |
|---|---|
| (1) Boric acid (crosslinking agent) | 0.65 part |
| (2) Ammonium zirconium carbonate (Zircosol AC-7, 28% aqueous solution, manufactured by Daiichi Kigenso Kagaku Kogyo Co., Ltd.) | 6.5 parts |
| (3) Ammonium carbonate | 6.0 parts |
| (4) Deionized water | 83.8 parts |
| (5) MEGAFACE F1405 (fluorine surfactant manufactured by Dainippon Ink and Chemicals, Inc.) | 0.2 part |

Example 16

A comparative ink jet recording sheet (16) was prepared in the same manner as in Example 15 except that 1 part of the reactant (4) (complex of the invention) in the composition of the ink receiving layer coating solution (A2) was not used.

(Image Recording and Evaluation)

Each of the ink sets (101 to 106) obtained above was introduced into a cartridge of an ink jet printer PM-900C (manufactured by Seiko Epson Corporation) and used to print images on the ink jet recording sheets (15 to 16), and evaluated in the following manner. The results are shown in Table 4 below.

(1) Light Fastness Test

Each ink jet recording sheet was introduced into a paper feeder of an ink jet printer PM-950C (manufactured by Seiko Epson Corporation) and used to print a magenta solid image which was then irradiated, through a filter cutting ultraviolet rays of wavelengths of 365 nm or less, with light from a lamp in Xenon Weather-O-meter Ci65A (manufactured by ATLAS) in the environment of a temperature of 25° C. and 32% RH (relative humidity) for 3.8 hours, and then the lamp was turned off, the recording sheet was left in the environment of a temperature of 20° C. and 91% RH (relative humidity) for 1 hour; this cycle was repeatedly carried out for 168 hours. The density of the magenta image before and after this test was measured with a reflective densitometer Xrite 938 (manufactured by X-rite Inc.), and the remaining magenta in the image was calculated and evaluated according to the following criteria. Further, the discoloration of the magenta image before and after the test was confirmed with the naked eye.

[Criteria]

AA: Density remaining rate of the magenta image exceeded 95%.

A: Density remaining rate of the magenta image was 90 to 95%.

B: Density remaining rate of the magenta image exceeded was 80 to 90%.

C: Density remaining rate of the magenta image exceeded was 70 to 80%.

D: Density remaining rate of the magenta image exceeded less than 70%.

TABLE 4

| Ink set | Ink Jet recording sheet | Light fastness of magenta | Remarks |
|---|---|---|---|
| 101 | (15) | A | Invention |
| 102 | (16) | C | Comparative example |
| 103 | (15) | AA | Invention |
| 104 | (15) | AA | Invention |
| 105 | (15) | AA | Invention |
| 106 | (15) | AA | Invention |

As shown in Table 4, it was revealed that the ink jet recording method using the ink jet recording sheet (15) of the invention, as compared with the method using the comparative ink jet recording sheet (16), can be used to form an image excellent in light fastness. It was also found that an image excellent in coloration density, ink absorptivity and gloss with less blurring with time can be obtained according to the ink jet recording method of the invention.

The heterocyclic oxycarbonyl group includes a heterocyclic oxycarbonyl group having a substituent group and an unsubstituted heterocyclic oxycarbonyl group. The heterocyclic oxycarbonyl group is preferably a $C_{2-20}$ heterocyclic oxycarbonyl group. Examples of the substituent group include an ionic hydrophilic group. Examples of the heterocyclic oxycarbonyl group include a 2-pyridyloxycarbonyl group.

The heterocyclic sulfonylamino group includes a heterocyclic sulfonylamino group having a substituent group and an unsubstituted heterocyclic sulfonylamino group. The heterocyclic sulfonylamino group is preferably a $C_{1-12}$ heterocyclic sulfonylamino group. Examples of the substituent group include an ionic hydrophilic group. Examples of the heterocyclic sulfonylamino group include a 2-thiophenesulfonylamino group and 3-pyridinesulfonylamino group.

The heterocyclic sulfonyl group includes a heterocyclic sulfonyl group having a substituent group and an unsubstituted heterocyclic sulfonyl group. The heterocyclic sulfonyl group is preferably a $C_{1-20}$ heterocyclic sulfonyl group. Examples of the substituent group include an ionic hydrophilic group. Examples of the heterocyclic sulfonyl group include a 2-thiophenesulfonyl group and 3-pyridinesulfonyl group.

The heterocyclic sulfinyl group includes a heterocyclic sulfinyl group having a substituent group and an unsubstituted heterocyclic sulfinyl group. The heterocyclic sulfinyl group is preferably a $C_{1-20}$ heterocyclic sulfinyl group. Examples of the substituent group include an ionic hydrophilic group. Examples of the heterocyclic sulfinyl group include a 4-pyridinesulfinyl group.

What is claimed is:

1. An ink jet recording medium comprising a support and an ink receiving layer disposed on the support, wherein the ink receiving layer comprises a complex formed from a metal with a valence of two or more and an acidic group-containing compound having a substituent group containing a nitrogen atom, an oxygen atom or a sulfur atom, wherein the acidic group-containing compound is represented by the general formula (IV):

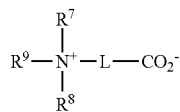

General Formula (IV)

wherein $R^7$, $R^8$ and $R^9$ each independently represent an aliphatic group, an aromatic group or a heterocyclic group; and L represents a divalent linking group, and wherein the ink receiving layer further comprises a mordant.

2. The ink jet recording medium of claim 1, wherein the acidic group-containing compound is represented by the following general formula (I):

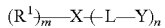

General Formula (I)

wherein $R^1$ represents one selected from the group consisting of a hydrogen atom, an aliphatic group, an aromatic group, a heterocyclic group, —$COR^2$ and —$SO_2R^3$ wherein $R^2$ and $R^3$ each independently represent an aliphatic group, an aromatic group or a heterocyclic group; X represents one selected from the group consisting of —N<, —O—, —S—, —SO— and —$SO_2$—; Y represents an acidic group; L represents a divalent linking group; m and n each independently denote an integer; and when X is one selected from the group consisting of —O—, —S—, —SO— and —$SO_2$—, (m+n) is 2, and when X is —N<, (m+n) is 3 or 4 provided that when (m+n) is 4, the nitrogen atom in general formula (I) is a quaternary ammonium cation, and either one of the acidic groups in general formula (I) is an anion in a dissociated state, or one of $R^1$ groups has an anionic group.

3. The ink jet recording medium of claim 1, wherein the acidic group-containing compound is represented by the following general formula (II):

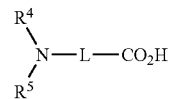

General Formula (II)

wherein $R^4$ and $R^5$ each independently represent one selected from the group consisting of a hydrogen atom, an aliphatic group, an aromatic group, a heterocyclic group, —$COR^2$ and —$SO_2R^3$ wherein $R^2$ and $R^3$ each independently represent an aliphatic group, an aromatic group or a heterocyclic group; and L represents a divalent linking group.

4. The ink jet recording medium of claim 1, wherein the acidic group-containing compound is represented by the following general formula (III):

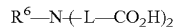

General Formula (III)

wherein $R^6$ represents one selected from the group consisting of a hydrogen atom, an aliphatic group, an aromatic group, a heterocyclic group, —$COR^2$ and —$SO_2R^3$ wherein $R^2$ and $R^3$ each independently represent an aliphatic group, an aromatic group or a heterocyclic group; and L represents a divalent linking group.

5. The ink jet recording medium of claim 1, wherein the metal is one selected from the group consisting of aluminum, titanium and zirconium.

6. The ink jet recording medium of claim 1, wherein the complex formed from the acidic group-containing compound and the metal is contained in the ink receiving layer in an amount of 0.01 to 20 g/m².

7. The ink jet recording medium of claim 1, wherein the ink receiving layer further comprises a water-soluble resin.

8. The ink jet recording medium of claim 7, wherein the water-soluble resin is at least one selected from the group consisting of polyvinyl alcohol resin, cellulose resin, ether linkage-containing resin, carbamoyl group-containing resin, carboxyl group-containing resin, and gelatin.

9. The ink jet recording medium of claim 7, wherein the ink receiving layer comprises a crosslinking agent capable of crosslinking the water-soluble resin.

10. The ink jet recording medium of claim 1, wherein the ink receiving layer further comprises particles.

11. The ink jet recording medium of claim 10, wherein the particles are at least one selected from the group consisting of silica particles, colloidal silica, alumina particles and pseudo-boehmite.

12. The ink jet recording medium of claim 10, wherein the particles are fumed silica particles, and are used in the ink receiving layer as an aqueous fumed silica dispersion containing the fumed silica and a dispersant.

13. The ink jet recording medium of claim 10, wherein the ink receiving layer further comprises a water-soluble resin, and a weight ratio of the particles to the water-soluble resin is in a range of 1.5:1 to 10:1.

14. The ink jet recording medium of claim 1, wherein the ink receiving layer is produced by crosslinking and curing a coating layer formed by applying a coating solution containing at least particles and a water-soluble resin, and the crosslinking and curing is carried out by adding a crosslinking agent to at least one of the coating solution and a basic solution having pH exceeding 7 and then applying the basic solution to the coating layer either (1) at the same time that the coating solution is applied to form the coating layer or (2) in the course of drying the coating layer formed by applying the coating solution before the coating layer exhibits a decreasing rate of drying.

15. An ink jet recording method comprising forming an image with an ink set comprising, as minimum constituent elements, a yellow ink containing at least one yellow dye, a magenta ink containing at least one magenta dye, and a cyan ink containing at least one cyan dye, on the ink jet recording medium of claim 1, wherein an oxidation potential of at least one of the magenta dye and the cyan dye is higher than 0.8 V (vs SCE).

16. The ink jet recording medium of claim 1, wherein the ink jet recording medium is a white recording sheet.

* * * * *